United States Patent [19]
Aoki et al.

[11] Patent Number: 5,156,243
[45] Date of Patent: Oct. 20, 1992

[54] OPERATION APPARATUS FOR VEHICLE AUTOMATIC TRANSMISSION MECHANISM

[75] Inventors: Hidemi Aoki, Higashihiroshima; Kouki Makino, Aki; Shigefumi Hirabayashi, Hiroshima; Takashi Tsuchida, Hiroshima; Kunihiko Matumura, Hiroshima; Osamu Michihira, Hiroshima; Ushio Sakurai, Houfu; Hisaaki Katsuki, Hiroshima; Katsumi Shiraishi, Hiroshima; Yasushi Kameyama, Hiroshima, all of Japan

[73] Assignee: Mazda Motor Corporation, Hiroshima, Japan

[21] Appl. No.: 612,447

[22] Filed: Nov. 14, 1990

[30] Foreign Application Priority Data

Nov. 15, 1989 [JP] Japan ................... 1-294784
Nov. 15, 1989 [JP] Japan ................... 1-294789
Nov. 6, 1990 [JP] Japan ................... 2-298876

[51] Int. Cl.$^5$ ............... B60K 20/00; F16H 59/08
[52] U.S. Cl. ..................... 192/4 A; 74/335; 74/473 SW; 200/61.54
[58] Field of Search ............ 74/335, 473 SW, 484 R; 200/61.54, 61.88; 180/336, 78; 192/4 A; 297/330

[56] References Cited

U.S. PATENT DOCUMENTS

| | | | |
|---|---|---|---|
| 2,161,778 | 6/1939 | Hey | 74/484 R |
| 2,297,884 | 10/1942 | Govoni | 74/484 R |
| 2,964,964 | 12/1960 | Craig | 74/335 X |
| 3,176,537 | 4/1965 | Zeigler | 180/78 X |
| 3,857,454 | 12/1974 | Kobayashi et al. | 180/78 |
| 3,901,097 | 8/1975 | Williams et al. | 74/475 |
| 3,942,614 | 3/1976 | Thompson | 193/4 A |
| 4,649,768 | 3/1987 | Kusaka et al. | 74/484 R |
| 4,649,775 | 3/1987 | Ootari | 74/335 X |
| 4,653,807 | 3/1987 | Hirose et al. | 297/330 X |

FOREIGN PATENT DOCUMENTS

| | | | |
|---|---|---|---|
| 250333 | 12/1987 | European Pat. Off. | 180/336 |
| 3421602 | 12/1985 | Fed. Rep. of Germany | |
| 63-37729 | 7/1988 | Japan | |
| 2039346 | 8/1980 | United Kingdom | 200/61.54 |
| 2081926 | 2/1982 | United Kingdom | |

*Primary Examiner*—Richard Lorence

[57] ABSTRACT

An operation apparatus for a vehicle automatic transmission mechanism includes an actuator for driving a hydraulic valve for switching a travel range of an automatic transmission mechanism, a control unit for controlling the actuator, and a transmission operation unit for outputting a range switching instruction to the control unit. In the preferred embodiment, the transmission operation unit includes a stroke contact type operation switch suitably mounted on a side surface of a steering column so that at least forward vehicle travel ranges can be switched by only a stretched finger of the hand of a vehicle driver who continues to maintain his grip on the steering wheel with the same hand. The operation switch can include either a rotary switch or slide switch mounted on the steering column. As an alternative embodiment, the operation switch can be an operation lever swingably arranged on the vehicle instrument panel opposing the steering wheel, but which can be operated so that at least the forward vehicle travel ranges can be switched by only a stretched finger of the vehicle driver's hand while the driver continues to maintain his grip on the wheel with the same hand.

57 Claims, 41 Drawing Sheets

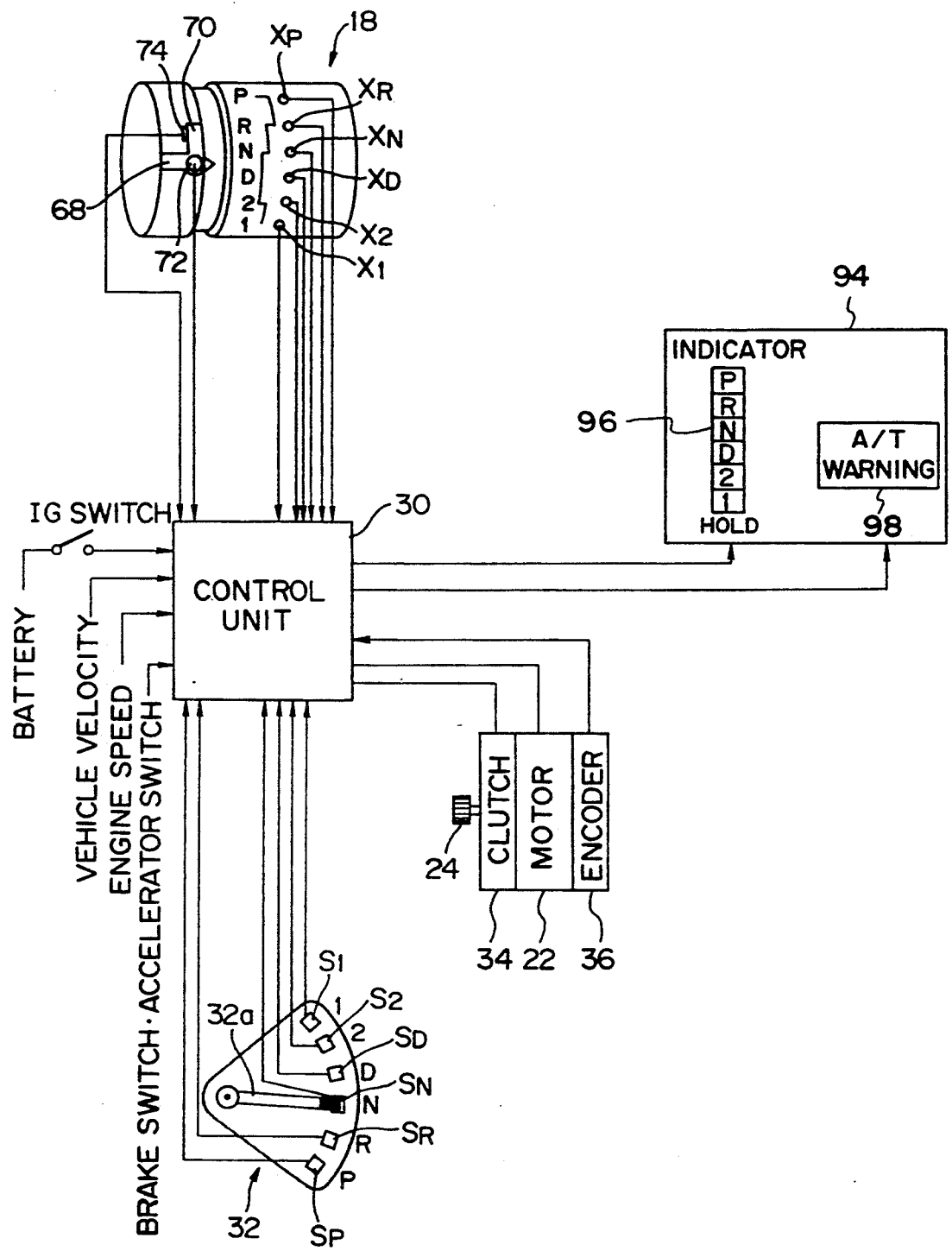
F I G. 2

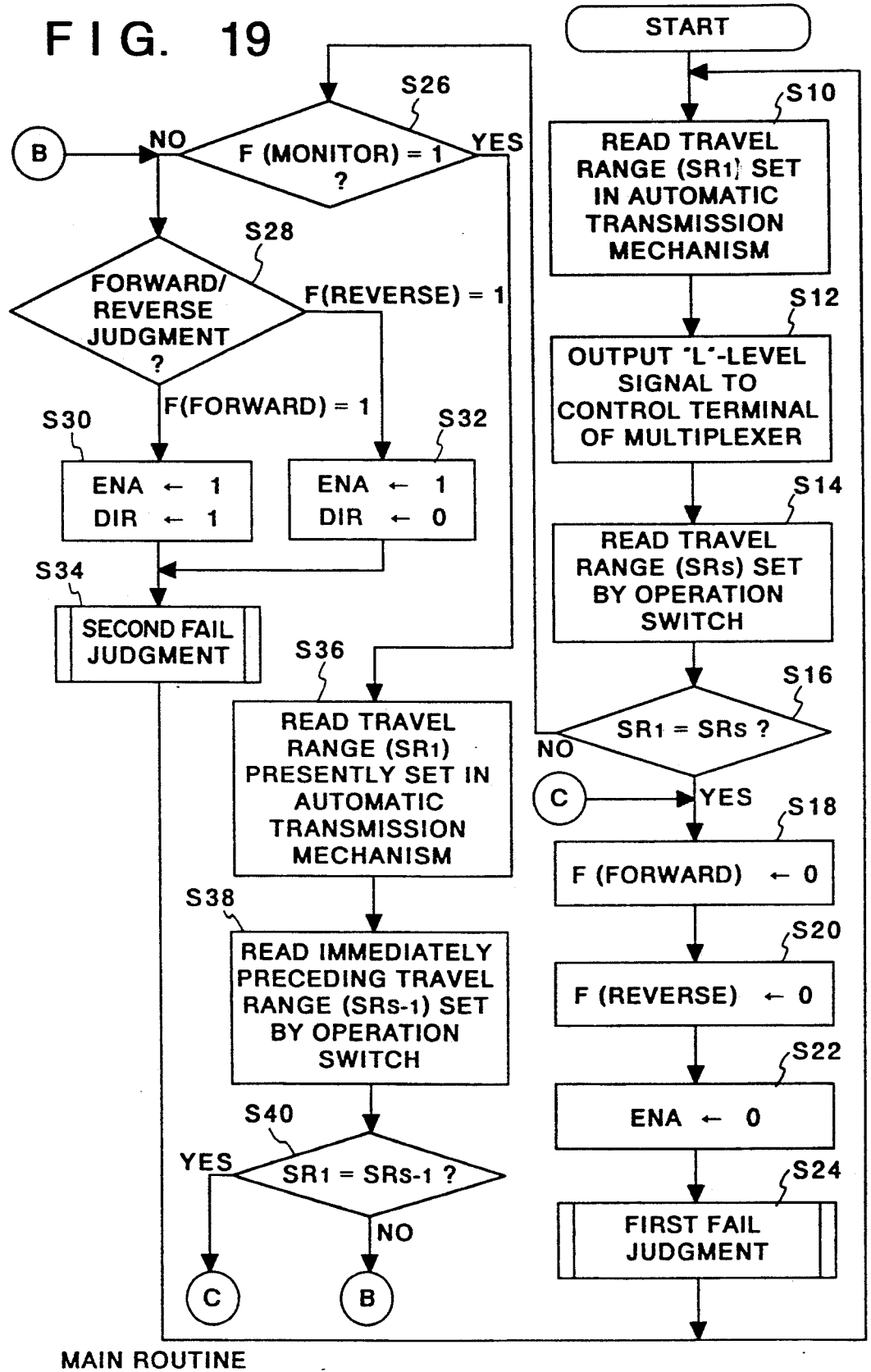

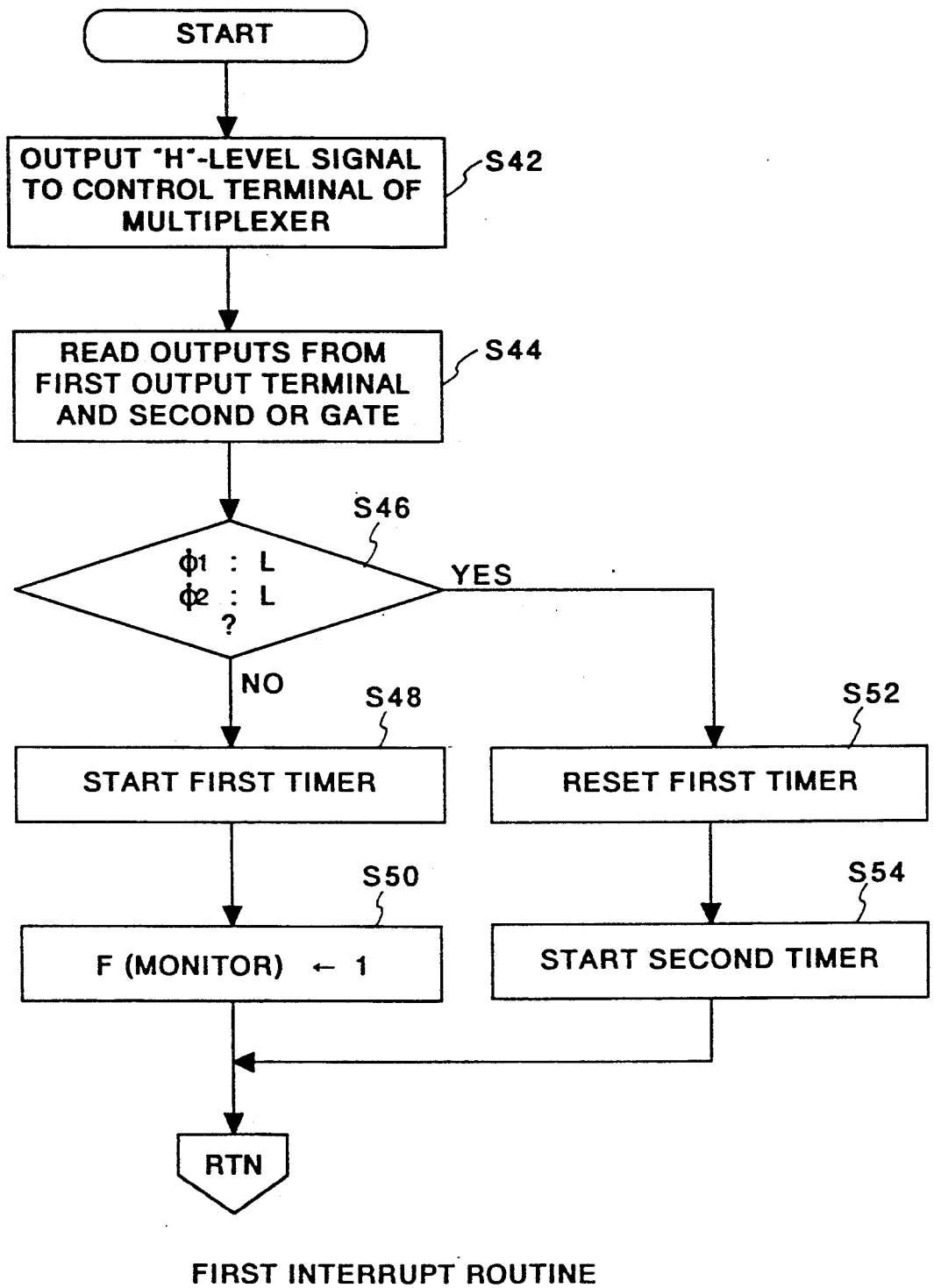
F I G. 20

FIG. 21  SECOND INTERRUPT ROUTINE

SUBROUTINE FOR FIRST
FAIL JUDGMENT (S24)

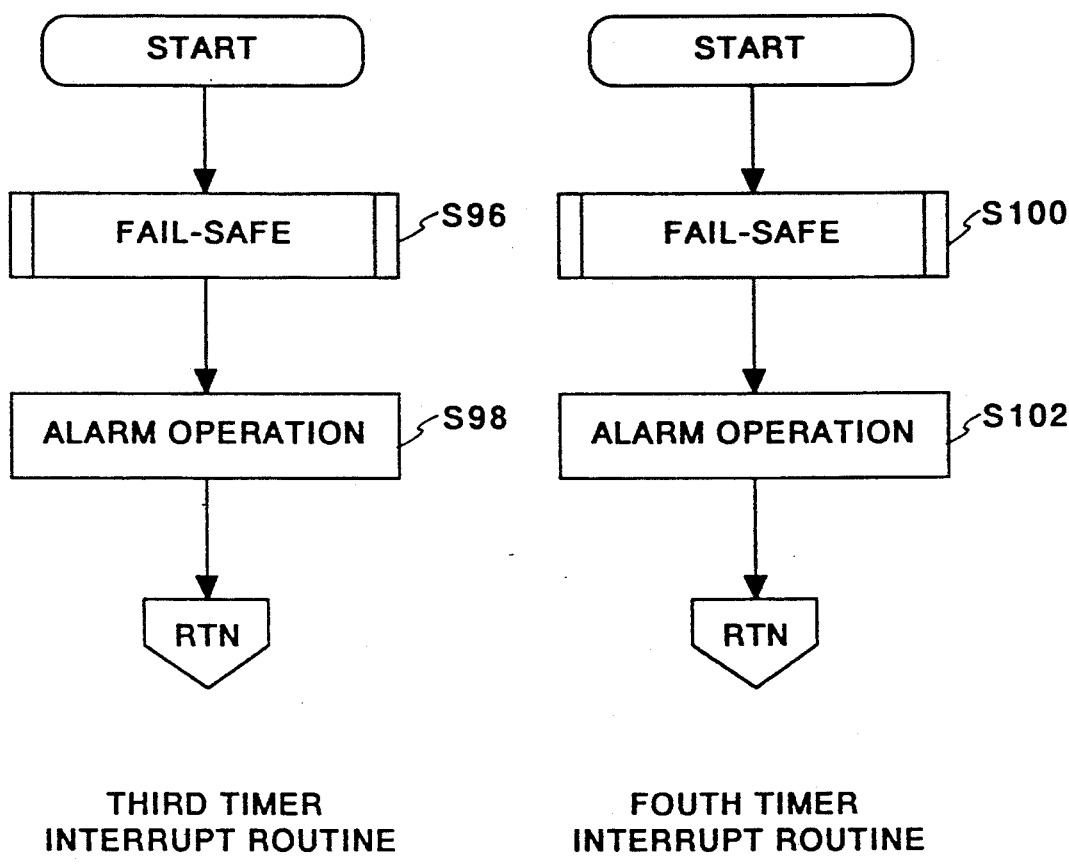
FIG. 26 — THIRD TIMER INTERRUPT ROUTINE
FIG. 27 — FOUTH TIMER INTERRUPT ROUTINE

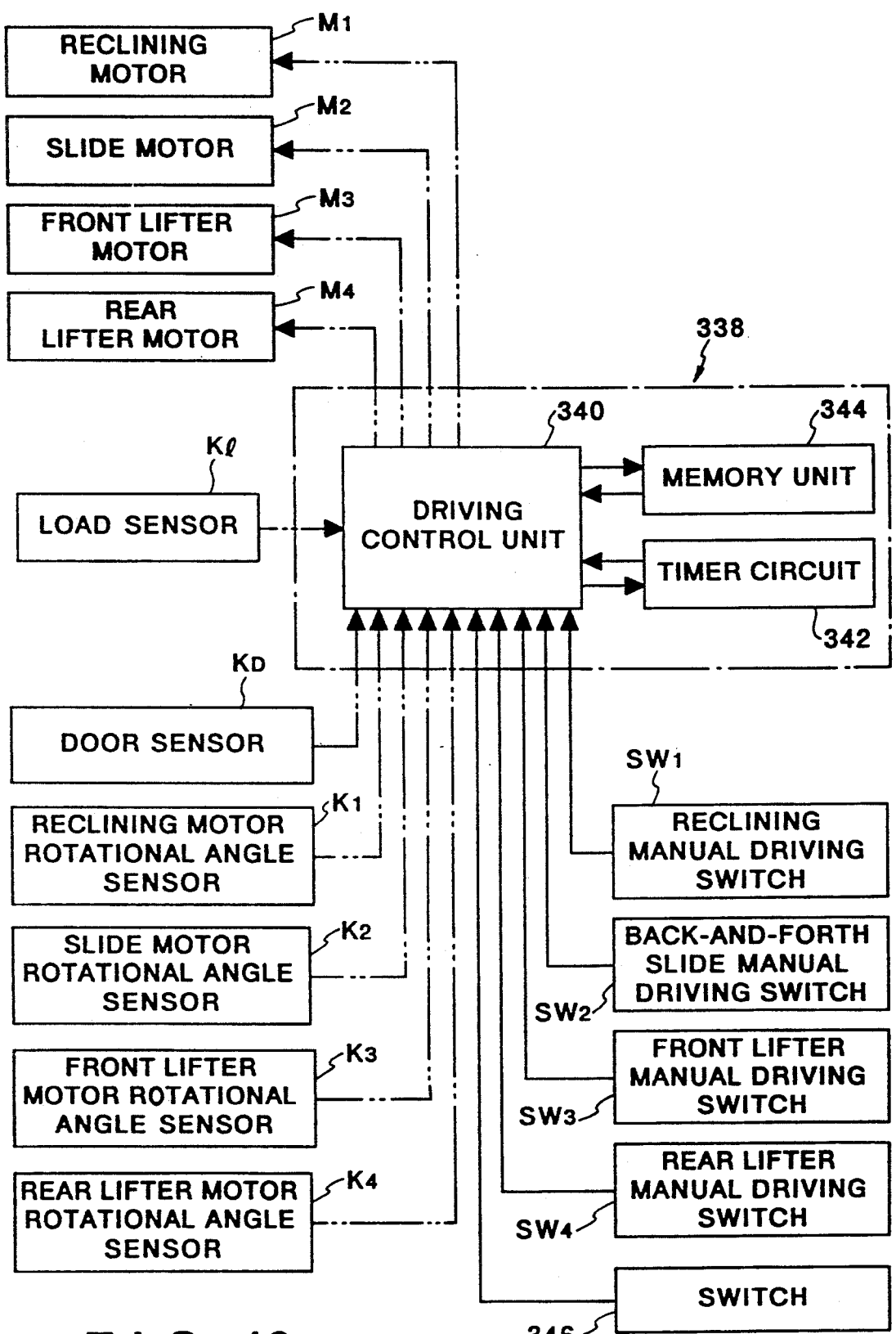
F I G. 48

OPERATION APPARATUS FOR VEHICLE AUTOMATIC TRANSMISSION MECHANISM

BACKGROUND OF THE INVENTION

The present invention relates to an operation apparatus for a vehicle automatic transmission mechanism, which comprises an actuator for driving a hydraulic valve for switching a travel range of the automatic transmission mechanism, and a transmission operation means for causing the actuator to execute a range switching operation.

A conventional operation apparatus for a vehicle automatic transmission mechanism comprises a select lever, as a manual transmission operation means, which is directly and mechanically connected to a hydraulic valve for switching a travel range of the automatic transmission mechanism, and is manually shifted by a driver. A driver shifts the select lever to a desired travel range position to switch a valve position of the hydraulic valve.

In a manual operation apparatus of this type, select levers are roughly classified into a floor type lever disposed between a driver's seat and a front passenger's seat, and a column type lever disposed on a sterring column.

In a conventional operation apparatus of an automatic transmission mechanism, when a travel range is to be switched, a driver must release his or her hand from a steering wheel, and regrips a select lever to shift it. On the other hand, upon switching of a shift position of a manual transmission mechanism, a driver must similarly release his hand from a steering wheel to regrip a shift lever.

In this manner, in order to perform a transmission operation (a travel range switching operation in an automatic transmission mechanism and a shift position switching operation in a manual transmission mechanism) in conventional transmission mechanisms regardless of an automatic or manual type, a driver must release one hand from a steering wheel to regrip a select or shift lever. During this interval, the driver grips the steering wheel with one hand, i.e., a single-hand driving state, and this state is not preferable in view of safety.

A driver tends to grow uneasy if he or she does not confirm a travel range position switched by himself or herself by visually observing an operation switch during driving of a vehicle. However, in a conventional automatic transmission mechanism comprising a floor type select lever, although a travel range indicator is provided to an instrument panel, it merely indicates a range position by an electrical signal in a strict sense, and a driver tends to shift his or her eye position from a front road to a select lever in a passenger room to confirm an indication position of the select lever disposed on the floor. Such a shift of an eye position can solve uneasiness of a driver but is not preferable from the viewpoint of safety driving.

When an operation range of another operation lever interferes with that of this operation switch, a driver must be careful not to operate another operation lever upon operation of this operation switch, and becomes careless of driving. It is not preferable in view of safety driving, either.

When a travel range is to be switched to a neutral range in a state wherein a travel range switching operation is performed among forward travel ranges, i.e., a forward drive range, a forward 2nd-speed range, and a forward 1st-speed range, if an operation force is too strong, a select lever may be erroneously set to a reverse range beyond the neutral range. In this manner, the reverse range is set by the automatic transmission mechanism during forward driving of a vehicle, which is undesirable.

Furthermore, when a forward travel range is set and a vehicle travels forward, if a body of a driver accidentally touches an operation switch due to immediate deceleration or abrupt braking, and a reverse range is erroneously set, it would also be undesirable.

In the above-mentioned manual operation apparatus, since the select lever and the hydraulic valve are directly and mechanically connected to each other via an arm, a link, and the like, a strong operation force is required to shift the select lever, and demand has arisen for an operation apparatus which requires only a light operation force.

In order to meet this demand, in recent years, for example, as disclosed in Japanese Patent Publication No. 63-37729, in an automatic transmission mechanism for a vehicle in which a hydraulic valve is controlled by a wire coupled to the hydraulic valve in a transmission to switch a travel range, a motorized range switching apparatus for driving the wire by a driving motor and operating the driving motor upon operation of an electrical switch has been proposed. According to the motorized range switching apparatus, a driver need only operate the electrical switch to switch the travel range through the driving motor. Thus, the driver can operate the electrical switch with a light operation force to instruct switching of the travel range.

However, in the conventional motorized range switching apparatus, a push-button switch is adopted as an electrical switch for instructing an operation of the driving motor. For this reason, when a driver switches a travel range position from a drive range to a 2nd-speed fixed range to perform a shift-down operation, he or she pays attention to the 2nd-speed fixed range switch to be pushed so as to prevent an erroneous operation. More specifically, in the conventional manual select lever, since all the travel range positions are linearly arranged like P-R-N-D-2-1, the select lever will never be directly shifted from the drive range position to the reverse range position. However, when the push-button switches are employed, if the reverse range switch is erroneously depressed during forward driving of a vehicle, a reverse travel state is set, it would be undesirable.

For this reason, a stroke contact type operation switch in which travel range positions to be set are sequentially juxtaposed along a predetermined path may be arranged as an electrical switch, thus reliably preventing erroneous depression. However, in the stroke contact type operation switch, when the operation switch is shifted to switch a travel range position, no target travel range position is specified at the beginning of the shift operation. When it is detected that the operation switch is stopped for a predetermined period of time, a travel range corresponding to the stop position is recognized as a target travel range to be selected. For this reason, when a travel range is to be changed based on this recognition result in practice in the automatic transmission mechanism, an actual change operation is started after the operation of the operation switch is completed, and an operation of the automatic transmission mechanism is considerably delayed. Thus, a driver undesirably feels uneasy.

In order to eliminate uneasiness, the following technique can be proposed. That is, when an operation switch is operated, its operation direction is detected, and a driving motor is driven according to the detected operation direction while a stop destination, i.e., a target travel range position is unknown, so that the travel range can be satisfactorily switched in response to an operation of the operation switch in the automatic transmission mechanism.

When the driving motor is driven according to an operation direction of the operation switch while a stop position is unknown, if the operation switch is held, for a long period of time, within a range which is set between adjacent operation range positions and in which a detection condition of a travel range is not established, the travel range of the automatic transmission mechanism may be undesirably set at a travel range position ahead of that to be set in the operation direction. In this manner, when a travel range of the automatic transmission mechanism is set at a travel range position different from that intended by a driver, this means that, for example, when a driver switches a travel range position from a forward 1st-speed range to a forward drive range, a reverse range or a parking range is undesirably set in the automatic transmission apparatus, and it is not preferable in terms of safety driving.

In the stroke contact type operation switch, when the operation switch is shifted to switch a travel range, the travel range in the automatic transmission mechanism must be precisely stopped at the travel range position switched by the operation switch. However, when a precise positioning operation cannot be executed in positioning/stop control, a problem on safety driving may be posed.

Furthermore, in the stroke contact type operation switch, when the operation switch is shifted to switch the travel range, the operation direction of the operation switch must coincide with the operation direction of the driving motor for switching the travel range in the automatic transmission mechanism. If a noncoincidence occurs, safety is impaired unless an error judgment is reliably performed.

Moreover, in the stroke contact type operation switch, when the operation switch is shifted to switch the travel range, if a driver continuously holds the operation switch at a halfway position, e.g., a position slightly offset from a position for setting a travel range, a reliable signal can no longer be output from the operation switch, and a travel range set by the operation switch cannot be determined for a long period of time, resulting in a problem on safety driving.

SUMMARY OF THE INVENTION

The present invention has been made in consideration of the above situation, and has as its object to provide an operation apparatus for a vehicle automatic transmission mechanism, which allows a vehicle to safely travel when a transmission operation is performed.

It is another object of the present invention to provide an operation apparatus for a vehicle automatic transmission mechanism, which can eliminate uneasiness of a driver and can allow a vehicle to safely travel when a transmission operation is performed.

It is still another object of the present invention to provide an operation apparatus for a vehicle automatic transmission mechanism, which allows a vehicle to safely travel when a transmission operation is performed.

It is still another object of the present invention to provide an operation apparatus for a vehicle automatic transmission mechanism, which allows a vehicle to safely travel while preventing an erroneous operation when a transmission operation is performed.

It is still another object of the present invention to provide an operation apparatus for a vehicle automatic transmission mechanism, which can perform a change operation in an automatic transmission mechanism without being delayed from an operation of an operation switch to attain a travel range switching operation free from a driver's uneasy feeling.

It is still another object of the present invention to provide an operation apparatus for a vehicle automatic transmission mechanism, which can perform a change operation in an automatic transmission mechanism without being delayed from an operation of an operation switch to attain a travel range switching operation free from a driver's uneasy feeling, and can assure a safety travel state.

It is still another object of the present invention to provide an operation apparatus for a vehicle automatic transmission mechanism, which can determine an abnormality when a precise positioning operation cannot be performed in the automatic transmission mechanism, thus improving safety.

It is still another object of the present invention to provide an operation apparatus for a vehicle automatic transmission mechanism, which can switch a travel range in the automatic transmission mechanism according to an operation direction of an operation switch, thus improving safety.

It is still another object of the present invention to provide an operation apparatus for a vehicle automatic transmission mechanism, which can reliably determine an abnormal operation of an operation switch to guarantee safety driving.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a diagram showing a connection state of a control system of a driving motor shown in FIG. 1;

FIG. 19 is a flow chart showing a sequence of a main routine of a CPU;

FIG. 20 is a flow chart showing a sequence of a first interrupt routine of the CPU;

FIGS. 24 through 27 are flow charts showing sequences of first through fourth timer interrupt routines of the CPU, respectively;

FIG. 48 is a block diagram showing an arrangement of a control system of the motorized driver's seat shown in FIG. 47.

DETAILED DESCRIPTION OF THE PREFERRED EMBODIMENTS

An arrangement of an embodiment of an operation apparatus for a vehicle automatic transmission mechanism according to the present invention will be described in detail below with reference to the accompanying drawings.

Figure 1:
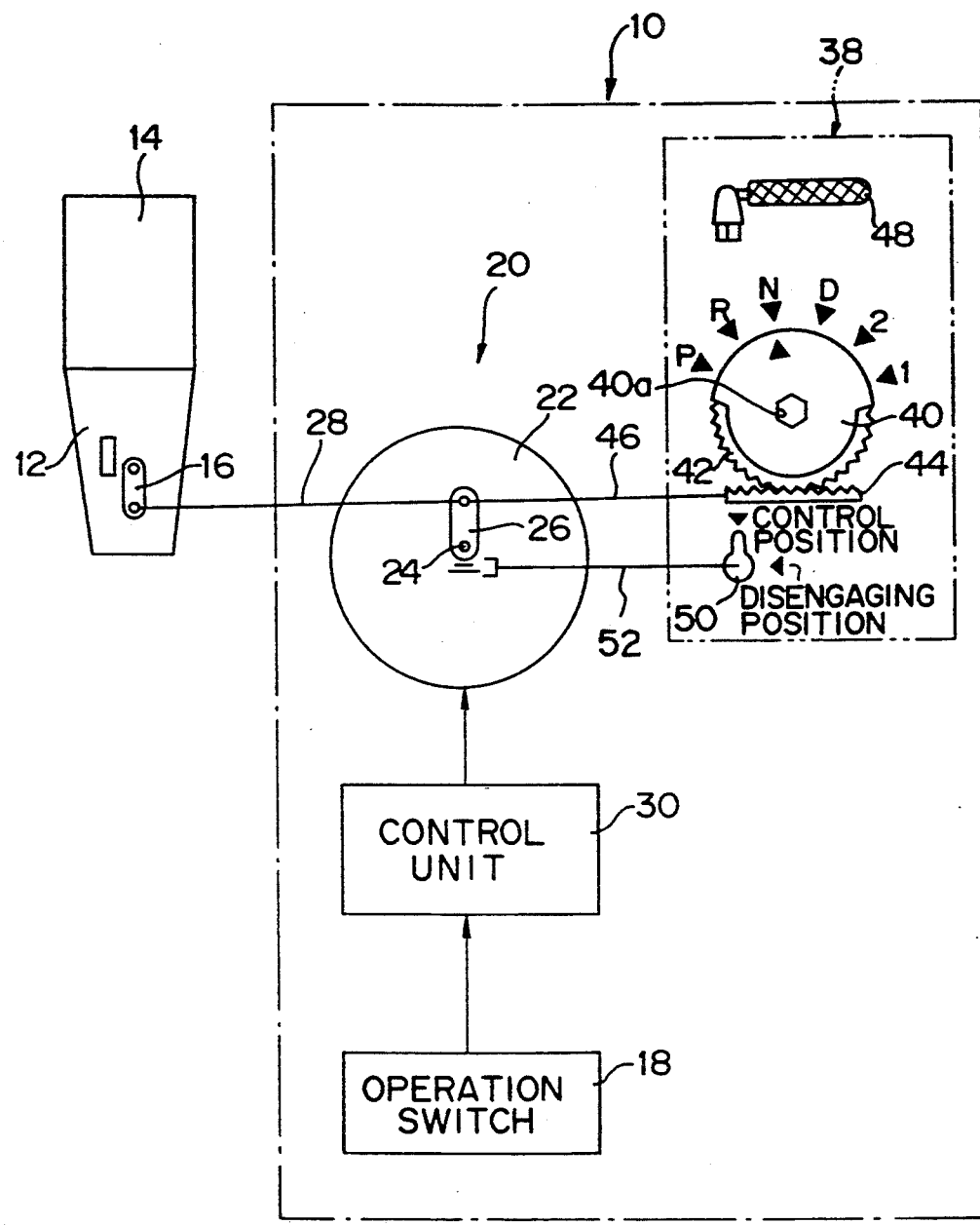
FIG. 1 is a schematic diagram showing an arrangement of a motorized travel range switching apparatus to which an embodiment of an operation apparatus for a vehicle automatic transmission mechanism according to the present invention is applied.

As shown in FIG. 1, an operation apparatus 10 of this embodiment is arranged so that a travel range of an automatic transmission mechanism 12 can be switched with a light operation force by utilizing an electric motor. The automatic transmission mechanism 12 transmits a driving force of an engine 14 to driving wheels (front wheels (not shown) in this embodiment). Since the automatic transmission mechanism 12 is of a conventional type which comprises a hydraulic valve 16 for switching a travel range, and its arrangement is known to those who are skilled in the art, a description thereof will be omitted herein.

The operation apparatus 10 of this embodiment comprises a motorized travel range switching apparatus (to be simply referred to as a range switching apparatus hereinafter) 20 for driving the above-mentioned hydraulic valve 16 by an electric motor in accordance with an operation of an operation switch (its detailed arrangement and mounting state will be described in detail later) 18 as the characteristic feature of the present invention, thereby switching a travel range. The range switching apparatus 20 comprises a reversible driving motor 22, a rotary arm 26 fixed to a driving shaft 24 of the driving motor 22 and having a predetermined radius, a coupling wire 28 for coupling the distal end of the rotary arm 26 and the hydraulic valve 16, and a control unit 30 for controlling a driving state of the driving motor 22 on the basis of a range switching instruction output from the operation switch 18.

The above-mentioned automatic transmission mechanism 12 comprises an inhibitor switch 32 indicating a switched travel range state in accordance with the switching state of the travel range by the hydraulic valve 16, as shown in FIG. 2. More specifically, the inhibitor switch 32 comprises contacts $S_P$, $S_R$, $S_N$, $S_2$, and $S_1$ respectively corresponding to a parking range "P", a reverse range "R", a neutral range "N", a forward drive range "D", a forward 2nd-speed range "2", and a forward 1st-speed range "1", and a swing lever 32a which is pivoted to be in selective contact with these contacts $S_P$, $S_R$, $S_N$, $S_D$, $S_2$, and $S_1$ in accordance with a range switching state of the hydraulic valve 16. The contacts $S_P$, $S_R$, $S_N$, $S_D$, $S_2$, and $S_1$ are connected to the control unit 30. The inhibitor switch 32 outputs an inhibitor signal to the control unit 30 from one of the contacts $S_P$, $S_R$, $S_N$, $S_D$, $S_2$, and $S_1$, which is in contact with the swing lever 32a.

The motor shaft (not shown) of the above-mentioned driving motor 22 is connected to the driving shaft 24 through a clutch mechanism 34, which is connected to the control unit 30 to be engaged/disengaged thereby. More specifically, the control state normally maintains the clutch mechanism 34 in an engaging state, so that the automatic transmission mechanism 12 is driven by the driving motor 22. As will be described later, when it is determined that a switching control operation of the control unit 30 fails, the control unit 30 disengages the clutch mechanism 34 in a fail-safe mode, so that the automatic transmission mechanism 12 is not driven by the driving motor 22.

Furthermore, the driving motor 22 is connected to a rotary encoder 36 for detecting a driving amount of the motor 22. The rotary encoder 36 is connected to the control unit 30, and outputs a detection result thereto. The control unit 30 receives an output result from the rotary encoder 36 to recognize a driving amount of the driving motor 22, in other words, a pivot position of the rotary arm 26.

On the other hand, the range switching apparatus 20 is connected to a manual driving mechanism 38 for manually switching the automatic transmission mechanism 12 when the control unit 30 malfunctions. The manual driving mechanism 38 comprises a pivot disc 40 which is pivotal about a pivot axis parallel to the above-mentioned driving shaft 24, a pinion gear 42 formed on the outer periphery of the pivot disc 40, a rack member 44 meshing with the pinion gear 42, and a first auxiliary coupling wire 46 for coupling the distal end of the rack member 44 and the rotary arm 26, as shown in FIG. 1. Note that the first auxiliary coupling wire 46 extends along the extending line of the above-mentioned coupling wire 28, so that the hydraulic valve 16 can be switched upon pivotal movement of the pivot disc 40.

A fitting hole 40a for receiving a wrench 48 as a slidable pivot member is formed in the central portion of the pivot disc 40. The pivot disc 40 can be manually pivoted to an arbitrary position through the wrench 48. When the pivot disc 40 is manually pivoted, if the clutch mechanism 34 is kept engaged, the driving motor 22 serves as a load, and the disc 40 cannot be easily pivoted. Therefore, a switching lever 50 for mechanically disengaging the clutch mechanism 34 is arranged. The switching lever 50 is connected to the clutch mechanism 34 via a second auxiliary wire 52. More specifically, when the switching lever 50 is set at a control position, the clutch mechanism 34 can be controlled by the control unit 30; when it is set at a disengaging position, the clutch mechanism 34 is mechanically disengaged.

Figure 3:
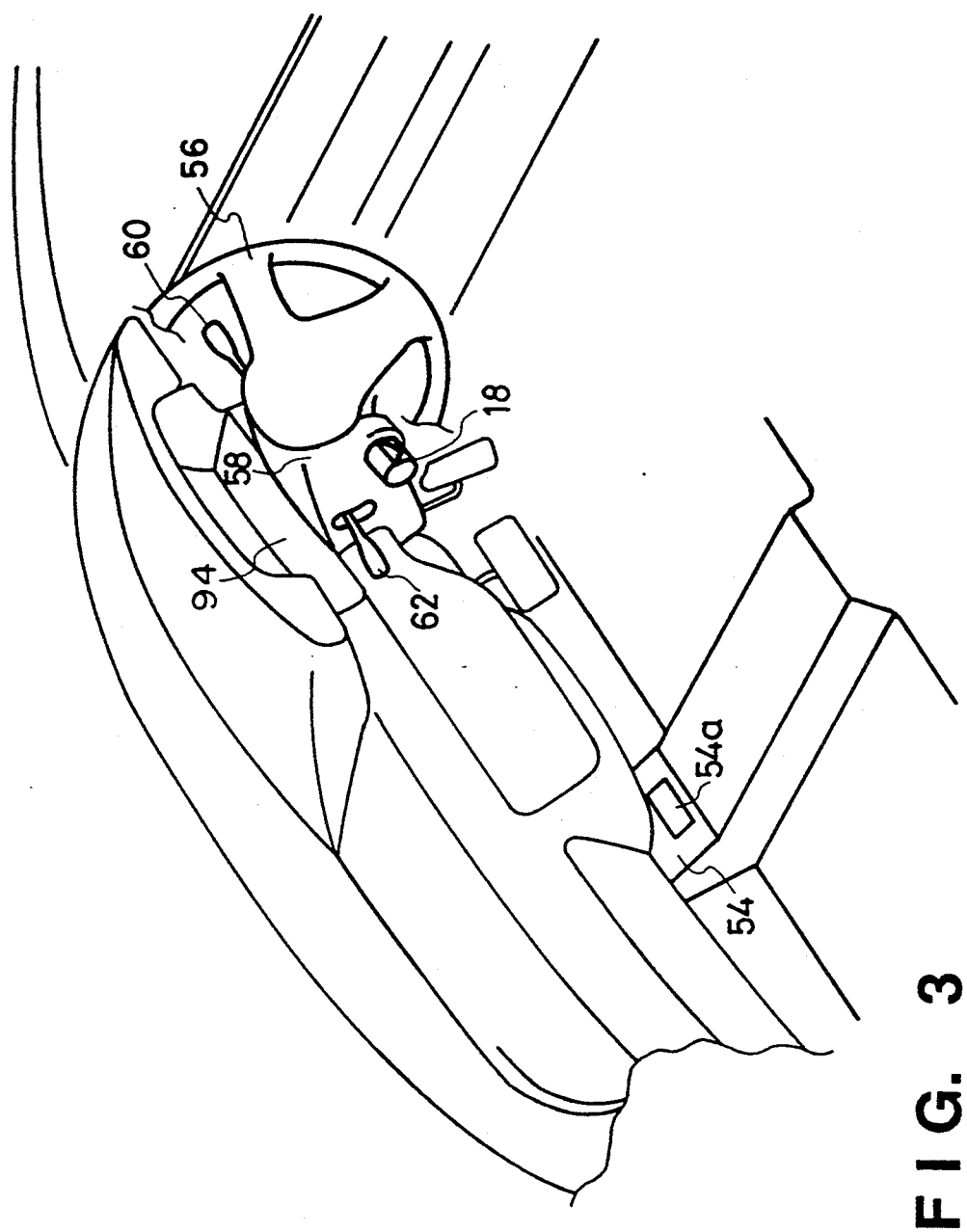
FIG. 3 is a perspective view showing arranging positions of an operation switch and a manual driving mechanism in a passenger room.

Note that the manual driving mechanism 38 is located inside the lower central portion of a cowl panel lower portion 54 for partitioning a passenger room and an engine room, as shown in FIG. 3, and when a lid member 54a attached here is removed, the pivot disc 40 is exposed. When the control unit 30 malfunctions, a driver removes this lid member 54a to access the pivot disc 40, and pivots the pivot disc 40 through the wrench 48, thereby directly and manually switching the automatic transmission mechanism 12.

The operation switch 18 serving as a transmission operation means as the characteristic feature of the present invention, for outputting a range switching instruction to the control unit 30 of the range switching apparatus 20 with the above arrangement will be described in detail below with reference to FIG. 3 and subsequent drawings.

As shown in FIG. 3, the operation switch 18 is disposed on a left side surface of a steering column 58 to which a steering wheel 56 is pivotally mounted in a passenger room, i.e., on a side opposite to a side of a direction indication lever 60 and on the same side as a wiper operation lever 62. The operation switch 18 comprises a so-called stroke contact type switch. More specifically, the operation switch 18 comprises a rotary switch which is mounted to be pivotal about a pivot shaft extending along a widthwise direction of a vehicle.

Figure 4:
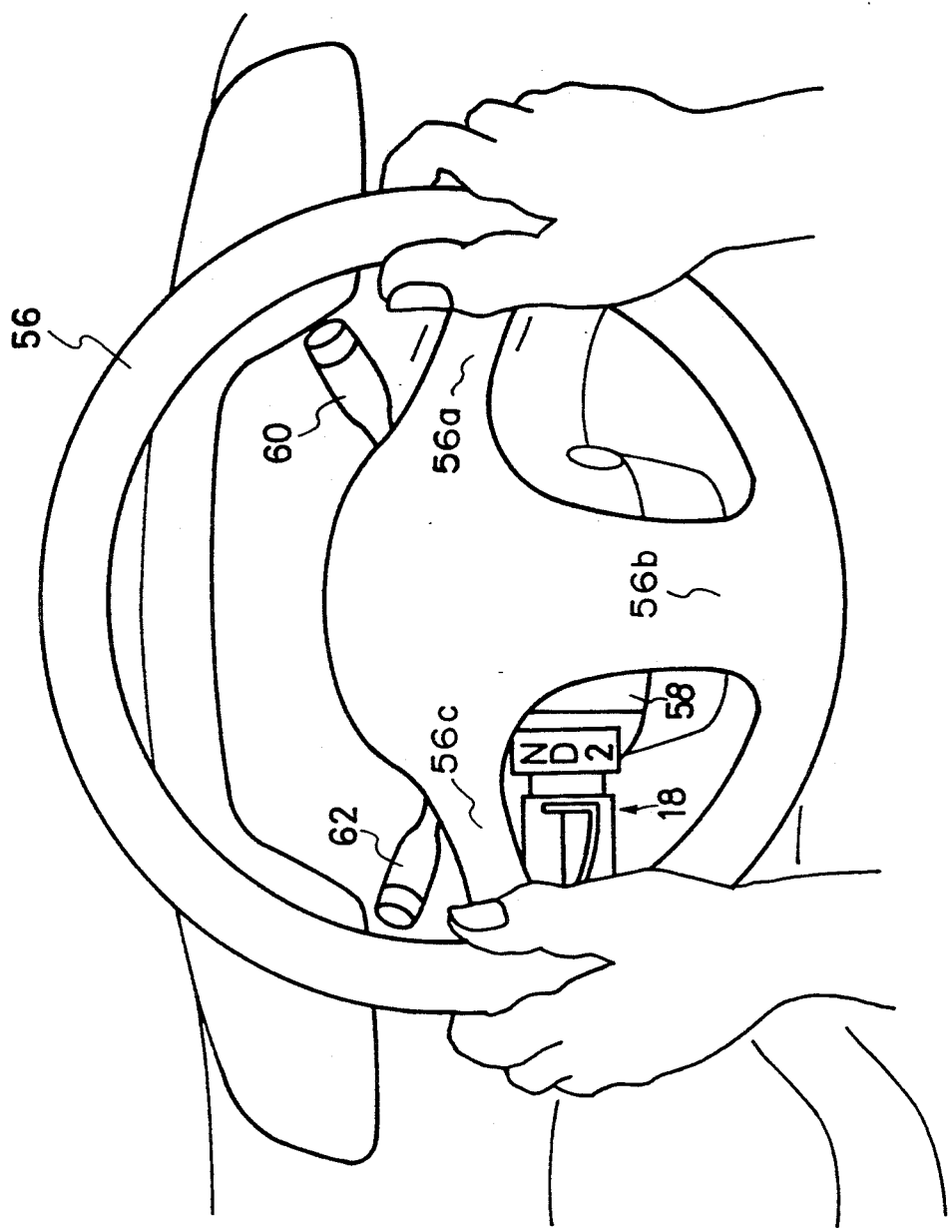
FIG. 4 is a front view showing an arranging state of the operation switch when viewed from a driver sitting at a driver's seat.

An arranging position of the operation switch 18 on the left side surface of the steering column 58 is set so that when a driver who sits at the driver's seat sees a front side while gripping two side portions corresponding to so-called 8 o'clock 20 minute positions of the steering wheel 56 at a substantially neutral position (i.e., a position where a rotational angle=0°) with his or her two hands, he or she can visually confirm the operation switch 18 through a space portion of the steering wheel 56, as shown in FIG. 4. The steering wheel 56 adopts a 3-spoke type to guarantee good visual confirmation. More specifically, the steering wheel 56 comprises three spokes 56a, 56b, and 56c extending along 3, 6, and 9 o'clock directions, respectively.

Figure 5:
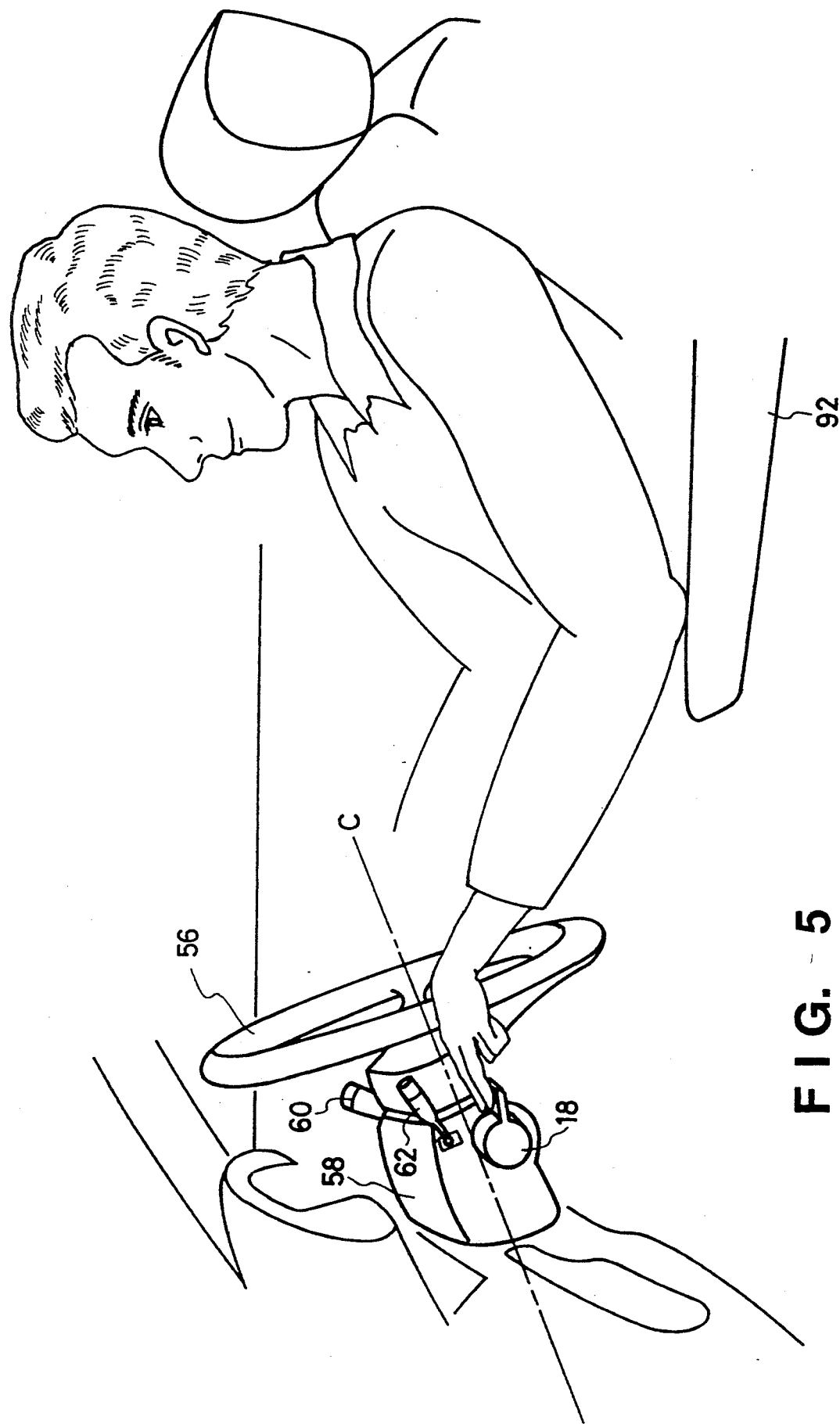
FIG. 5 is a side view showing an arranging state of the operation switch when viewed from a left side.

The positional relationship between the operation switch 18 and the wiper operation lever 62 is set as shown in FIG. 5. That is, the operation switch 18 is arranged on a driver-side lower portion of the left side surface of the steering column 58, while the wiper operation lever 62 is arranged on a driver-side upper portion of the left side surface of the steering column 58. In other words, the wiper operation lever 62 and the operation switch 18 are disposed to be vertically separated from each other to have a central line C in a direction of height of the steering column 58 as a boundary.

Figure 6:
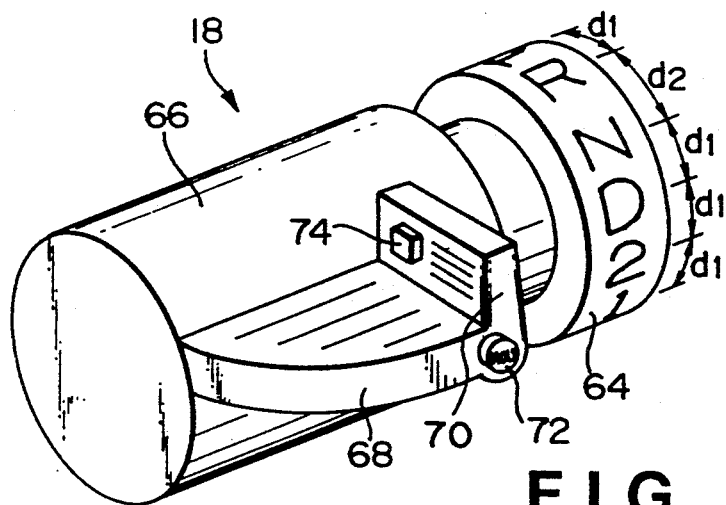
FIG. 6 is a perspective view showing an outer appearance of the operation switch.

As shown in FIG. 6, the operation switch 18 comprises an annular mounting ring 64 integrally fixed to the left side surface of the steering column 58, a switch main body 66 which is axially supported on the mounting ring 64 to be rotatable about an axis extending along the widthwise direction of the vehicle, and is supported to be able to be pushed in along its axial direction, a finger operation portion 68 which is integrally formed to project radially outwardly from an outer periphery of the switch main body 66 and to extend along the axial direction of the main body 66, and a push-in section 70 which is integrally formed to stand upright on an edge portion near the steering column 58 side of the finger operation portion 68 (i.e., to extend along the circumferential direction of the main body 66).

As can be seen from FIG. 6, a hold button 72 is disposed on the right edge (FIG. 6) of the front end face of the finger operation portion 68, and a mode switching button 74 for switching a switching mode of a travel range of the automatic transmission mechanism 12 is disposed on a deepest portion of the side surface of the push-in section 70.

When the hold button 72 is not depressed, a normal shift change state is defined, and when the hold button 72 is depressed, the automatic transmission mechanism is fixed at the 3rd speed in the forward drive range, and is fixed at the 2nd speed in the forward 2nd-speed range. When the mode switching button 74 is not depressed, a travel range switching mode in the automatic transmission mechanism 12 is set in a power mode (suitable for mountain path travel) which places an importance on a tough travel feeling, and when it is depressed, the switching mode is set in an economy mode (suitable for street travel) which places an importance on economy.

On the other hand, alphanumeric letters "P" indicating the parking range, "R" indicating the reverse range, "N" indicating the neutral range, "D" indicating the forward drive range, "2" indicating the forward 2nd-speed range, and "1" indicating the forward 1st-speed range are sequentially drawn clockwise on the outer peripheral surface of the above-mentioned mounting ring 64. In the operation switch 18, when the switch main body 66 is pivoted, a range switching instruction for defining a travel range set according to the pivot position is output. More specifically, the range switching instruction is output to achieve a travel range expressed by the alphanumeric letter located just aside the finger operation portion 68. That is, the finger operation portion 68 also serves as an index for indicating the presently set travel range.

As shown in FIG. 6, the alphanumeric letters "N", "D", "2", and "1" are sequentially aligned in a series state at equal small intervals $d_1$. However, the letter "R" is aligned to be separated from the letter "N" by an interval $d_2$ larger than the interval $d_1$, and the letter "P" is aligned to be separated from the letter "R" by the above-mentioned small interval $d_1$. The alphanumeric letters "N", "D", and "2" are arranged at positions where a driver who sits at the driver's seat can directly look at these letters to have the letter "D" at the center when he or she sees forward. In this manner, when a driver executes an operation for switching the travel range position among the neutral range "N", the forward drive range "D", and the forward 2nd-speed range "2", he or she can read the alphanumeric letter "N", "D", or "2" indicated by the finger operation portion 68 to instantaneously recognize which travel range is presently set. Thus, a driver can switch the travel range without anxiety.

As can be seen from FIG. 4, a driver cannot directly look at the letters "R" and "P". As will be described in detail later, when the switch main body 66 is merely pivoted, the travel range position cannot be shifted from the neutral range "N" to the reverse range "R", and the switch main body 66 must be axially pushed in to attain this shift operation. As a result, in a state wherein the switch main body 66 is pivoted to desirably switch the travel range position among the neutral range "N", the drive range "D", and the forward 2nd-speed range "2", the reverse range "R" can never be set due to its mechanism. Since the driver cannot directly look at the letters "R" and "P", he or she can also receive as a mental security the fact that the travel range position will never be shifted from the neutral range "N" to the reverse range "R". Thus, the driver can desirably switch the travel range position among the neutral range "N", the drive range "D", and the forward 2nd-speed range "2" without anxiety.

The internal structure of the operation switch 18 will be described in detail below with reference to FIGS. 7 through 10.

Figure 7:
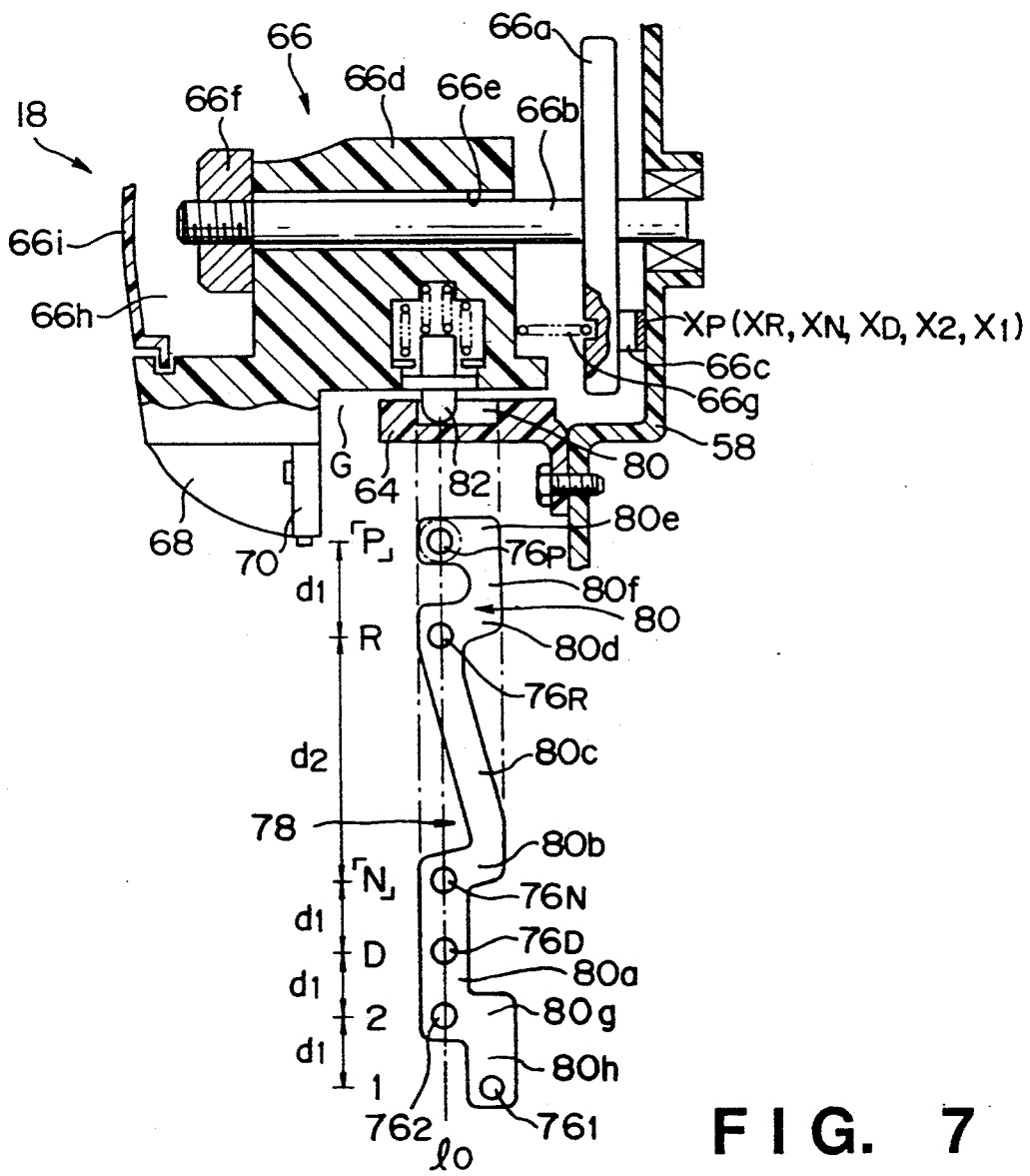
FIG. 7 is a sectional view showing an internal arrangement of the operation switch together with a formation pattern of a guide groove.

As shown in FIG. 7, the switch main body 66 of the operation switch 18 comprises a shaft portion 66b on which an outward flange portion 66a is integrally formed and which extends along the widthwise direction of the vehicle body. The shaft portion 66b is rotatably supported about its own central axis, and is inhibited from being axially moved. A contact rod 66c is mounted on the outer peripheral portion of the inward surface portion of the outward flange portion 66a to extend axially, i.e., to extend toward the surface of the steering column 58.

Contacts $X_P$, $X_R$, $X_N$, $X_D$, $X_2$, and $X_1$ corresponding to the parking range "P", the reverse range "R", the neutral range "N", the forward drive range "D", the forward 2nd-speed range "2", and the forward 1st-speed range "1" are mounted on the surface portion facing the outer flange portion 66a of the steering column along a rotational path of the contact rod 66c to be able to be in contact with the contact rod 66c in the same manner as the inhibitor switch 32 described above. These contacts $X_P$, $X_R$, $X_N$, $X_D$, $X_2$, and $X_1$ are disposed at positions according to the indication positions of the alphanumeric letters for respectively indicating the travel ranges drawn on the outer periphery of the mounting ring 64.

The contacts $X_P$, $X_R$, $X_N$, $X_D$, $X_2$, and $X_1$ are connected to the control unit 30. In this manner, in the operation switch 18, a corresponding range switching instruction is output, to the control unit 30, from one of the contacts $X_P$, $X_R$, $X_N$, $X_D$, $X_2$, and $X_1$, which is in contact with the contact rod 66c.

The switch main body 66 also comprises a movable portion 66d which is axially movably arranged on the shaft portion 66b. More specifically, an axial through hole 66e is formed in the movable portion 66d, and the shaft portion 66b extends outwardly through this through hole 66e, so that the movable portion 66d is movably supported along the extending direction of the shaft portion 66b. The above-mentioned finger operation portion 68 is integrally formed on the outer peripheral surface of the movable portion 66d. The inward edge portion of the movable portion 66d is formed to have a smaller diameter than that of its outward edge portion, and is stored in the above-mentioned ring-like mounting ring 64.

A locking nut 66f for inhibiting the movable portion 66d from being moved outwardly is threadably engaged with the outward edge portion of the shaft portion 66b. A coil spring 66g is interposed between the movable portion 66d and the outward flange portion 66a, and the movable portion 66d is always biased outwardly by the biasing force of the coil spring 66g. Thus, the movable portion 66d is in contact with the above-mentioned locking nut 66f and is elastically held in position unless an external force is applied thereto. In this manner, the switch main body 66 is normally biased outwardly, and when the above-mentioned push-in portion 70 is pushed axially inwardly, the switch main body 66 can be pushed axially inwardly against the biasing force of the coil spring.

A recess portion 66h for receiving the locking nut 66f described above is formed in the outer side surface of the movable portion 66d, and a blindfold plate 66i for closing the recess portion 66h to conceal the locking nut 66f is mounted.

The operation switch 18 comprises a detent mechanism 76 for, when the travel range is switched by pivoting the switch main body 66, precisely locking the pivot position at a corresponding travel range position, and also comprises a regulation mechanism 78 for regulating switching operations from the neutral range "N" to the reverse range "R" and between the reverse range "R" and the parking range "P" so that these switching operations cannot be attained by merely rotating the switch main body 66 without pushing it in axially inwardly.

For the detent mechanism 76 and the regulation mechanism 78, the outward edge of the above-mentioned mounting ring 64 extends to substantially the middle of the small-diameter portion of the movable portion 66d. For this reason, this outward edge forms a gap G with an end face of a stepped portion for defining the large-diameter portion of the movable portion 66d. The axial length of the gap G is set to be slightly larger than an axial push-in amount of the movable portion 66d, as will be described later. The regulation mechanism 78 comprises a guide groove 80 formed in the inner peripheral surface of the mounting ring 64, and one guide pin 82 which is elastically reciprocally mounted on the movable portion 66d so that its outward edge portion is fitted in and guided along the guide groove 80.

Figure 8:
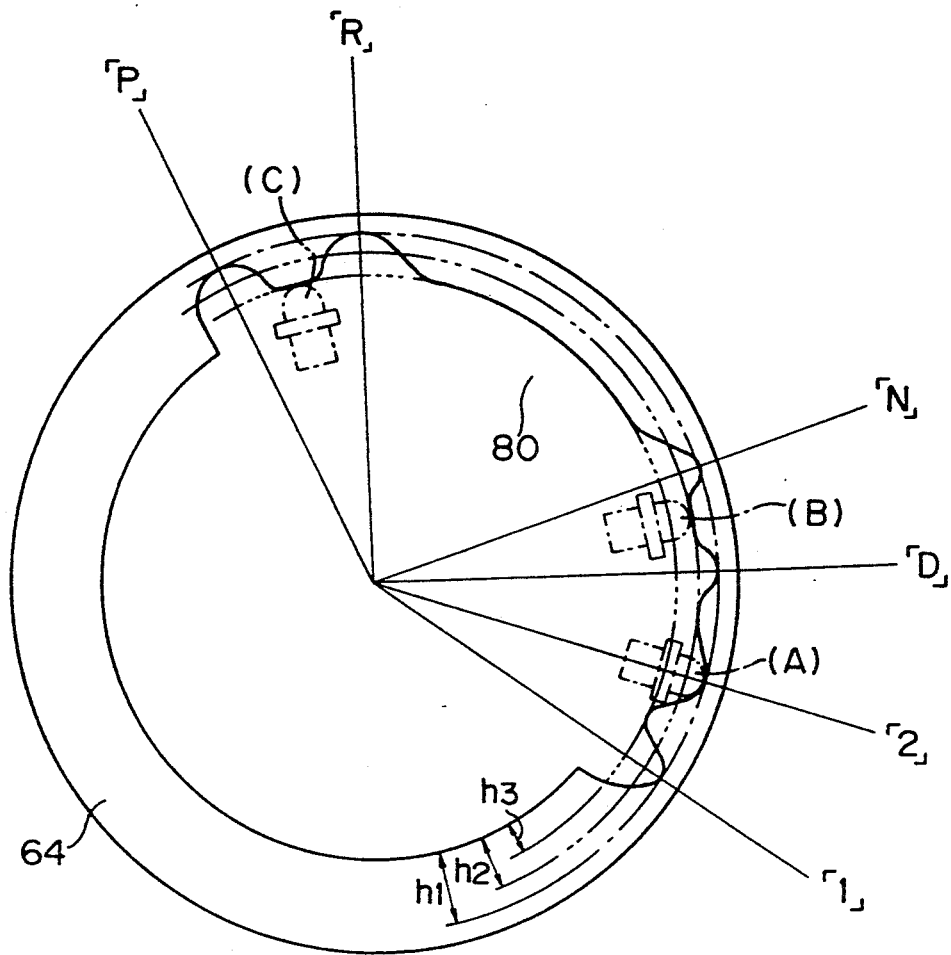
FIG. 8 is a sectional view showing a depth and shape of a guide groove formed in a mounting ring.

The guide groove 80 is formed to extend between the forward 1st-speed range "1" and the parking range "P", as shown in FIG. 8. When the guide pin 82 is fitted in the guide groove 80, the switch main body 66 is inhibited from being pivoted beyond the forward 1st-speed range "1" and the parking range "P". The above-mentioned detent mechanism 76 has detent holes $76_P$, $76_R$, $76_N$, $76_D$, $76_2$, and $76_1$ respectively corresponding to the parking range "P", the reverse range "R", the neutral range "N", the forward drive range "D", the forward 2nd-speed range "2", and the forward 1st-speed range "1" on the bottom surface of the guide groove 80 on the basis of the above-mentioned arranging relationship, as shown in FIG. 7. These detent holes $76_P$, $76_R$, $76_N$, $76_D$, $76_2$, and $76_1$ are set to be located on one axis $l_0$ extending along the circumferential direction of the mounting ring 64. The bottom surface of each of the detent holes $76_P$, $76_R$, $76_N$, $76_D$, $76_2$, and $76_1$ is set at a position entering radially outwardly from the inner peripheral surface of the mounting ring 64 by a first depth $h_1$, as shown in FIG. 8.

As shown in a lower portion of FIG. 7 in a state wherein a circumferential pattern is developed on a plane, the guide groove 80 is constituted in a continuous state by a linear groove portion 80a which is linearly formed to extend between the forward 2nd-speed range "2" and the neutral range "N" along the circumferential direction $l_0$, a first lateral groove portion 80b extending axially inwardly from the neutral range "N" at the upper end of the linear groove portion 80a (i.e., perpendicular to the linear groove portion 80a), an oblique groove portion 80c obliquely extending from the inward end of the first lateral groove portion 80b to the reverse range "R" with respect to the circumferential direction $l_0$, a second lateral groove portion 80d extending axially inwardly from the reverse range "R", a third lateral groove portion 80e extending axially inwardly from the parking range "P", a first coupling groove portion 80f extending along the circumferential direction $l_0$ to couple the inward ends of the second and third lateral groove portions 80d and 80e, a fourth lateral groove portion 80g extending axially inwardly from the forward 2nd-speed range "2" at the lower end of the above-mentioned linear groove portion 80a, and a second coupling groove portion 80h extending from the inward end of the fourth lateral groove portion 80g to the forward 1st-speed range "1" along the circumferential direction $l_0$.

The extending lengths of the first through third lateral groove portions 80b, 80d, and 80e are defined as an axial push-in amount of the above-mentioned switch main body 66, and are set to be equal to each other. Since the guide groove 80 is constituted as described above, the travel range switching operation from the forward 1st-speed range "1" to the neutral range "N" and the travel range switching operation from the reverse range "R" toward the forward 2nd-speed range "2" can be executed by only one-step operation, i.e., pivoting the switch main body 66. However, the travel range switching operation from the neutral range "N" to the parking range "P", the travel range switching operation between the parking range "P" and the reverse range "R", and the travel range switching operation from the forward 2nd-speed range "2" to the forward 1st-speed range "1" require two-step operations, i.e., can be executed by pivoting the switch main body 66 while the switch main body 66 is kept axially pushed in.

As a result, the travel range switching operations from the neutral range "N" to the reverse range "R" and between the reverse range "R" and the parking range "P" cannot be performed by only a pivot operation of the switch main body 66, and these switching operations can be reliably prevented from being accidentally performed, thus assuring a safety travel state.

As shown in FIG. 8, the depth of the guide groove 80 from the inner peripheral surface of the mounting ring 64 between the forward 2nd-speed range and the neutral range "N" is set to have a second depth $h_2$ slightly smaller than the first depth $h_1$ for defining the depth of the above-mentioned detent holes $76_P$, $76_R$, $76_N$, $76_D$, $76_2$, and $76_1$ from the inner peripheral surface of the mounting ring 64. On the other hand, the depth of the guide groove 80 between the forward 2nd-speed range "2" and the forward 1st-speed range "1" and the depth of the guide groove 80 between the neutral range "N" and the parking range "P" are set to have a third depth $h_3$ smaller than the above-mentioned second depth $h_2$.

As a result, as can be seen from FIG. 8, the substantial depth ($=h_1-h_3$) of each of the detent holes $76_1$, $76_P$, and $76_R$ corresponding to the forward 1st-speed range "1", the reverse range "R", and the parking range "P" is larger than the substantial depth ($=h_1-h_2$) of each of the detent holes $76_N$, $76_D$, and $76_2$ corresponding to the neutral range "N", the forward drive range "D", and the forward 2nd-speed range "2".

In this manner, according to this embodiment, since the guide pin 82 is fitted in the corresponding detent hole 76 at each travel range set position, an operation stop position can be determined, and a driver can recognize a stop state of the switch main body 66 operated by himself or herself by a touch based on detent feeling.

According to this embodiment, a rotation starting force necessary for starting pivotal movement of the switch main body 66 from a state wherein each of the forward 1st-speed range "1", the reverse range "R", and the parking range "P" is set is larger than a rotation starting force necessary for starting pivotal movement of the switch main body 66 from a state wherein each of the neutral range "N", the forward drive range "D", and the forward 2nd-speed range is set. In other words, a driver can perform the travel range switching operation among the neutral range "N", the forward drive range "D", and the forward 2nd-speed range "2" with a light pivot starting force. Meanwhile, when the driver switches the set state of the forward 1st-speed range "1", the reverse range "R", or the parking range "P" to another travel range, a strong pivot starting force is required to escape from the corresponding deep detent hole $76_1$, $76_N$, or $76_P$, thereby calling a driver's attention to whether or not this switching operation need be performed really. As a result, an erroneous operation can be prevented.

The guide pin 82 to be fitted in the guide groove 80 is integrally formed by a pin main body 82a whose projecting end portion has a round distal end, and an outward flange portion 82 formed at substantially the central portion in its axial direction, as shown in FIG. 7. The guide pin 82 is mounted in such a manner that its portion inwardly from the outward flange portion 82b is fitted in a recess portion 84 formed in the outer peripheral surface of the movable portion 66d. The recess portion 84 is defined by a recess main body 84a having a larger diameter than that of the outward flange portion 82b in its opening portion, and a small-diameter inward flange portion 84b which is formed at the opening portion of the recess main body 84a and is set to just receive the outward flange portion 82b. More specifically, the recess portion 84 comprises a stepped hole having a small-diameter opening portion.

The recess portion 84 stores a locking ring 86 which is in contact with the above-mentioned stepped portion (i.e., an inner end face of the inward flange portion 84b), and has a central opening for receiving a portion of the pin main body 82a inwardly from the outward flange portion 82b. On the other hand, the recess portion 84 stores a first coil spring 88 which is in contact with the inner end face of the guide pin 82 and biases it in a direction to project from the recess portion 84, and a second coil spring 90 which is in contact with the inner surface of the locking ring 86 and biases it against the stepped portion of the inward flange portion 84b in an independent state.

Figure 9:
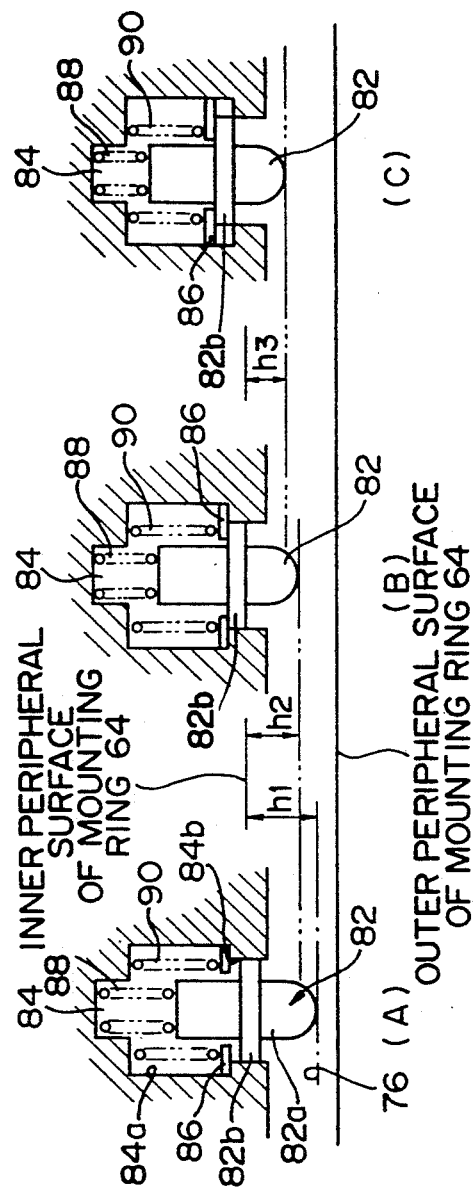
FIG. 9 is a sectional view showing push-in states of a guide pin.

As shown in (A) of FIG. 9, in a state wherein the guide pin 82 is fitted in the detent hole $76_1$, $76_2$, $76_D$, $76_N$, $76_R$, or $76_P$ and its position is locked, in other words, in a state wherein the distal end of the guide pin 82 is brought into contact with a surface having the depth $h_1$ from the inner peripheral surface of the mounting ring 64, the outward flange portion 82a of the guide pin 82 is set to be separated from the locking ring 86 contacting the stepped portion by a distance $(h_1 - h_2)$.

As a result, as shown in (B) of FIG. 9, in a state wherein the distal end of the guide pin 82 is in contact with the bottom surface of the guide groove 80 between the forward 2nd-speed range "2" and the neutral range "N", the guide pin 82 is pushed radially inwardly from a state wherein it is fitted in the detent hole $76_1$, $76_2$, $76_D$, $76_N$, $76_R$, or $76_P$ in the radial direction of the switch main body 66 by a distance $(h_1 - h_2)$.

In this push-in operation, the outward flange portion 82b is in contact with only the locking ring 86, and does not push it inwardly. As a result, a push-in force required for this push-in operation can be a force against the biasing force of the first coil spring 88 which is engaged with only the guide pin 82.

As shown in (C) of FIG. 9, in a state wherein the distal end of the guide pin 82 is in contact with the bottom surface of the guide groove 80 between the neutral range "N" and the parking range "P" and between the forward 2nd-speed range "2" and the forward 1st-speed range "1", the guide pin 82 is pushed inwardly from a state wherein it is fitted in the detent hole $76_1$, $76_2$, $76_D$, $76_N$, $76_R$, or $76_P$ in the radial direction of the switch main body 66 by a distance $(h_1 - h_3)$. As can be seen from the above description, since $(h_1 - h_3) > (h_1 - h_2)$, the outward flange portion 82b is in contact with the locking ring 86 to further push it inwardly in the push-in operation.

As a result, a push-in force required for this push-in operation must be a force against a total of the biasing force of the first coil spring 88 which is engaged with the guide pin 82, and the biasing force of the second coil spring 90 which is engaged with the locking ring 86.

In this manner, according to this embodiment, when the switch main body 66 is pivoted to switch the travel range between the forward 2nd-speed range "2" and the neutral range "N" (the guide pin 82 is slid along the guide groove 80), a contact force between the guide pin 82 and the guide groove 80 (i.e., a frictional engagement force) is defined by only a force against the biasing force of the first coil spring 88, and a pivot operation force can be relatively weak.

Figure 10:
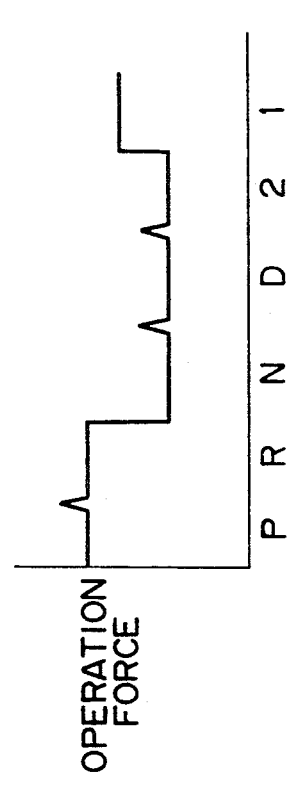
FIG. 10 is a graph showing a difference in operation force of the operation switch when a travel range is switched.

However, when the switch main body 66 is pivoted to switch the travel range between the neutral range "N" and the parking range "P" and between the forward 2nd-speed range "2" and the forward 1st-speed range "1", a contact force between the guide pin 82 and the guide groove 80 is defined by a force against the total biasing force of the first and second coil springs 88 and 90, and a large pivot operation force is required. As a result, as shown in FIG. 10, a pivot operation force can have different strength levels, and these different strength levels and a difference in pivot starting forces from the stop positions of the switch main body 66 on the basis of a difference in depths of the above-mentioned detent holes can call a driver's attention to whether or not this switching operation need be performed really. As a result, an erroneous operation can be prevented.

Figure 11:
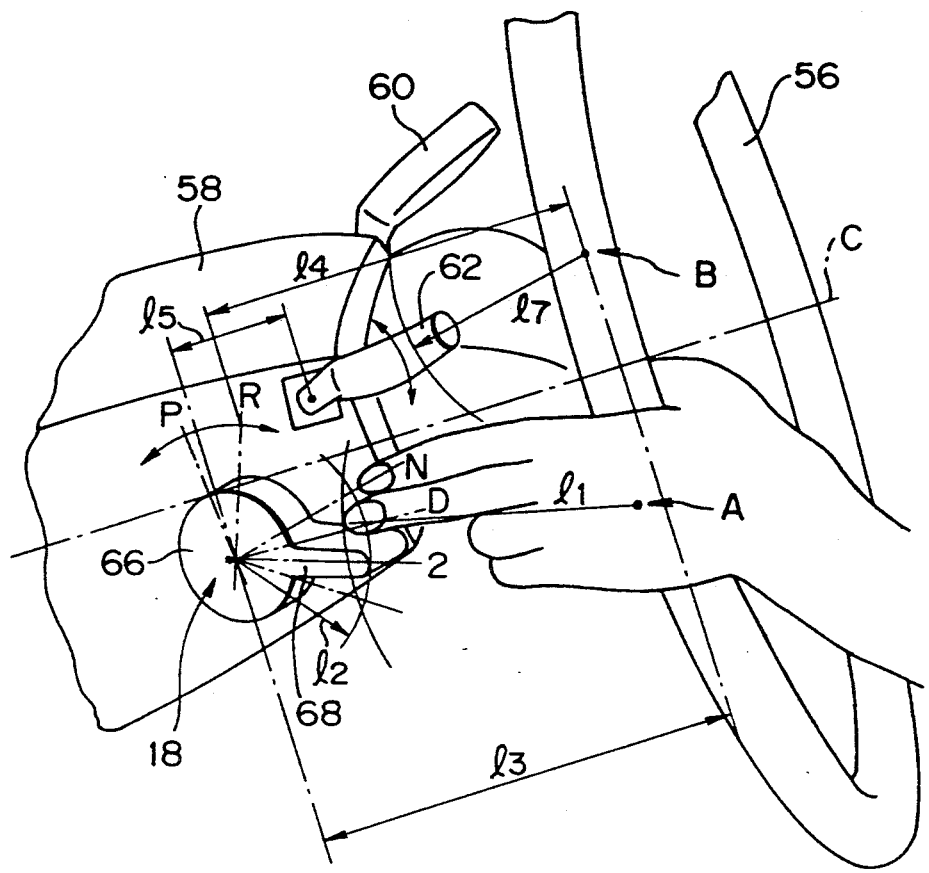
FIGS. 11 and 12 are respectively a perspective view and a side view showing an arranging state of the operation switch.

The operation switch 18 with the above structure is mounted on the left side surface of the steering column 58, as described above. More specifically, the finger operation portion 68 located within a range of the forward 1st-speed range "1" to the neutral range "N" is arranged at a position where a driver can access it with his or her left middle finger, as shown in FIG. 11, in a driving state shown in FIG. 5, i.e., in a state wherein a driver rests his or her both elbows on fixed armrests 92 (an armrest for the right elbow is not shown for the sake of illustrative convenience) and holds the so-called 8 o'clock 20 minute positions of the steering wheel 56 with both hands at ease to drive the vehicle.

In other words, in the above-mentioned state (position), if the pivot radius of the left middle finger is represented by $l_1$ (e.g., 130 mm) and the pivot radius of the finger operation portion 68 is represented by $l_2$, a distance $l_3$ between the pivot center of the operation switch 18 and the grip position of the left hand on the steering wheel 56 is defined so that a pivot path of the distal end of the middle finger overlaps a pivot path of the distal end of the finger operation portion 68 located within a range between the forward 1st-speed range "1" and the neutral range "N". That is, the distance $l_3$ is defined to fall within a range wherein the following inequality (1) is satisfied:

$$l_3 < l_1 + l_2 \qquad (1).$$

When inequality (1) is defined as described above, in this embodiment, as shown in FIG. 12, a distance $l_6$ between the distal end of the finger operation portion 68 located at the forward drive range position "D" and the steering wheel 56 is set to be 110 mm.

Figure 12:
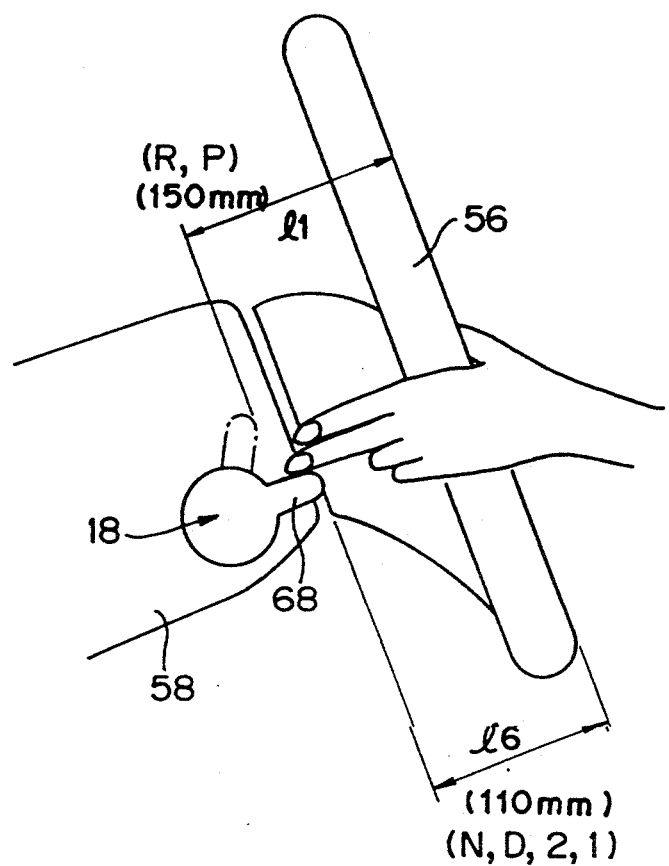

As shown in FIG. 12, if a distance between the distal end of the finger operation portion 68 located at the reverse range position "R" and the steering wheel 56 is represented by $l_4$, the distance $l_4$ is defined to fall within a range wherein the following inequality (2) is satisfied, and is set to be 130 mm in this embodiment:

$$l_4 \geq l_1 \qquad (2).$$

The interval $d_2$ between the neutral range "N" and the reverse range "R" is defined to satisfy the above-mentioned inequality (2).

In this embodiment, since the arranging position of the operation switch 18 is defined in this manner, the driver stretches the middle finger of his or her left hand while holding the steering wheel 56, and taps the finger operation portion 68 of the operation switch 18 downward or upward, thereby desirably and instantaneously switching the switch main body 66 between the forward 1st-speed range "1" and the neutral range "N". As a result, the driver can switch the travel range position during travel while holding the steering wheel 56 with both hands, thus guaranteeing a safety drive state.

In this embodiment, since the reverse range position "R" is located outside an operation enable range of the finger operation portion 68 even if the driver stretches his or her middle finger while holding the steering wheel 56 with the left hand, he or she cannot switch the travel range position from the neutral range "N" to the reverse range "R". As a result, while the driver desirably switches the travel range position between the forward 1st-speed range "1" and the neutral range "N" by tapping the finger operation portion 68 with his or her middle finger during forward travel, he or she can reliably avoid an erroneous operation for setting the reverse range "R". Thus, safety in the travel range switching operation can be guaranteed together with the above-mentioned requirement of the two-step operations.

In order to switch the travel range position to the reverse range "R" or the parking range "P", the driver must release his or her left hand from the steering wheel 56. Therefore, the switching operation to the reverse range "R" or the parking range "P" is mentally controlled, and an erroneous operation upon the switching operation to the reverse range "R" or the parking range "P" can be prevented, thus guaranteeing safety travel from this point of view.

As shown in FIG. 11, the wiper operation lever 62 is arranged above the operation switch 18 and is located behind it by a distance $l_5$. Therefore, when the driver operates the wiper operation lever 62, he or she must change the grip position of the left hand on the steering wheel 56 from the so-called 8 o'clock direction position (indicated by symbol A in FIG. 11) to a so-called 10 o'clock direction position (indicated by symbol B in FIG. 11). That is, an operation pivot range with the pivot radius $l_1$ of the operation switch 18 is different from an operation pivot range with the pivot radius $l_7$ of the wiper operation lever 62.

As a result, in this embodiment, when the driver taps the finger operation portion 68 upward from below to switch the travel range position from the forward 2nd-speed range "2" to the forward drive range "D", even if the middle finger is swung up vigorously, the middle finger will never operate the wiper operation lever 62, and reliability of an operation can be assured. When the wiper operation lever 62 is pushed down from the above to set, e.g., an intermittent wiper mode, even if this push-down operation undesirably drives the finger downward, the finger will not touch the finger operation portion 68 of the operation switch 18. Thus, the driver can operate the wiper operation lever 62 without anxiety.

In this embodiment, the reverse range position "R" is set to be defined by the finger operation portion 68 located in front of a vertical line V contacting the outer peripheral surface of the switch main body 66 to be separated from it by a distance $l_8$. In other words, the reverse range position "R" is defined by pivoting the switch main body 66 via the finger operation portion 68 to a position which can never be accessed by a knee which enters between the operation switch 18 and the steering wheel 56 in an up state (i.e., bent at an acute angle). That is, the reverse range "R" is arranged at a position which satisfies both the condition given by the above-mentioned inequality (2) and a condition for setting a position which cannot be accessed by the knee described above.

Figure 14:
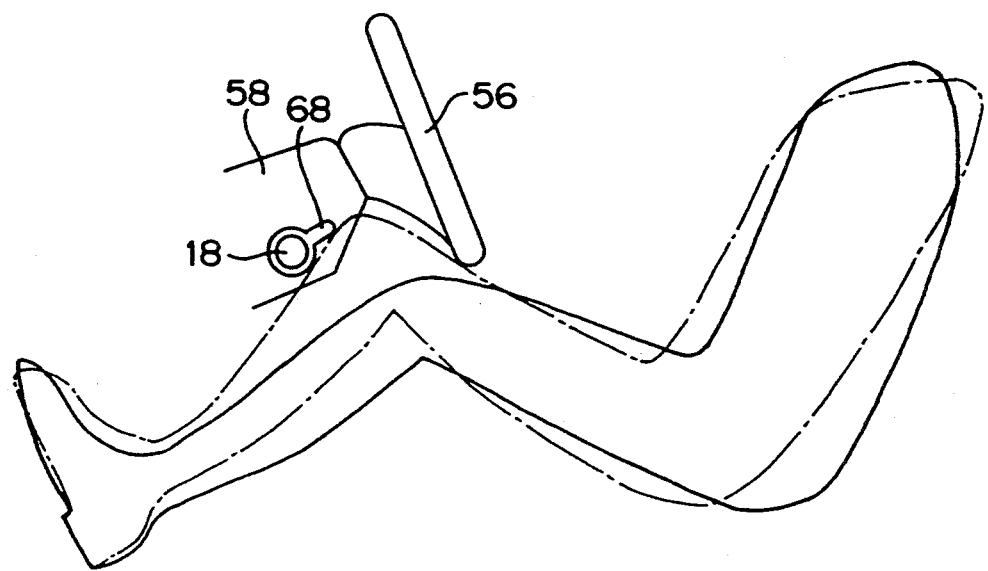
FIG. 14 is a side view for explaining a state wherein a driver draws up his or her left knee.

In a normal drive position, as indicated by a solid line in FIG. 14, the knee of the left leg will never access the operation switch 18. However, if the driver does not wear a seat belt in a head-on collision state or an abrupt braking state, his or her body is pushed forward by an immediate acceleration acting on him, and he or she may be forced to draw up his or her knee of the left leg between the operation switch 18 and the steering wheel 56, as indicated by an alternate long and short dashed line in FIG. 14. With this knee, the finger operation portion 68 of the operation switch 18 may be pushed upward, and the switch main body 66 may be forcibly pivoted from, e.g., the forward drive range "D" to the reverse range "R".

In this case, as described above, although the travel range position can be switched from the forward drive range "D" to the neutral range "N" by only a pivot operation of the switch main body 66, the switching operation from the neutral range "N" to the reverse range "R" cannot be attained by merely pivoting the switch main body 66. That is, two-step operations are required, i.e., the switch main body 66 must be pivoted while being pushed axially inwardly. For this reason, in a normal knee up state, the guide pin 82 is in contact with only the end wall for defining the first lateral groove portion 80b of the guide groove 80, and the switch main body 66 is held in position for defining the neutral range "N" but cannot be switched to the reverse range "R".

However, in the above-mentioned head-on collision state or the abrupt braking state, since the above knee up state is attained with a strong force, in some cases, the guide pin 82 may clear the above-mentioned end wall and the switch main body 66 may be pivoted to accidentally set the reverse range "R".

As a result, when the abrupt braking is made, if the operation switch 18 is forcibly pivoted by the up knee from the neutral range "N" to the reverse range "R" by only the pivot operation, the vehicle is temporarily stopped by braking, and subsequently begins to move backward based on setting of the reverse range "R", resulting in danger.

However, in this embodiment, since the reverse range "R" is set at a position which cannot be accessed by the up knee, as described above, even if an immediate acceleration acts on the driver to force him or her to draw up a knee, the neutral range "N" is set in the worst case, and the reverse range will never be set. Thus, a safety travel state can be assured.

Figure 15:
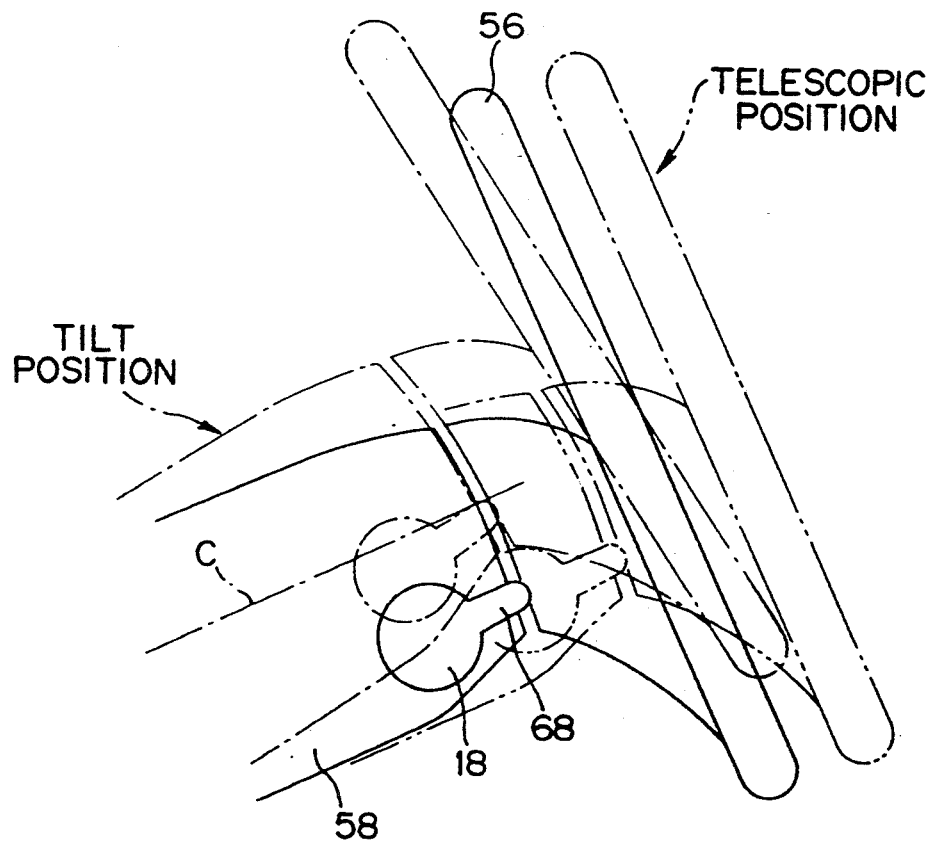
FIG. 15 is a side view showing a positional relationship between a steering wheel and the operation switch when a telescopic mechanism or a tilt mechanism is operated.

Note that as shown in FIG. 15, in order to allow a driver to take an optimal steering wheel holding position, a so-called telescopic mechanism which is axially slidable as indicated by an alternate long and two short dashed line, and a tilt mechanism which is vertically movable as indicated by an alternate long and short dashed line are provided to the steering wheel 56 although their details are not illustrated. In this embodiment, when the telescopic mechanism or the tilt mechanism works, not only the steering wheel 56 axially reciprocates or is vertically moved from the steering wheel 56, but also the steering column 58 and the steering wheel 56 are moved together.

As a result, according to this embodiment, the relative positional relationship between the operation switch 18 and the steering wheel 56 can be kept constant. Even when the steering wheel 56 is subjected to a telescopic operation or is tilted, the travel range switching operation can be reliably executed while a driver keeps holding the steering wheel 56 with both hands.

Referring again to FIG. 2, a travel range indicator 96 for indicating the presently set travel range based on the travel range set by the operation switch 18 is arranged on a portion of an instrument panel 94 on which a speedometer, a tachometer, and the like are arranged. In this travel range indicator 96, an alphanumeric letter corresponding to the presently set travel range is illuminated. Near the travel range indicator 96, there is arranged an A/T warning lamp 98 for informing a failed state to the driver when the control unit 30 determines that control fails since the travel range instructed by the operation switch 18 is different from that set by the inhibitor switch 32.

The travel range switching operation by operating the operation switch 18 by the driver in the operation apparatus 10 with the above arrangement will be described below.

In a state wherein the parking range "P" is set by the operation switch 18, and the vehicle stands still, a driver opens a door (not shown), enters the passenger room, slowly sits on a driver's seat, as shown in FIG. 5, and turns an ignition switch (not shown) with his or her right hand to start the engine 14 while depressing a brake pedal (not shown). Thereafter, the driver holds the switch main body 66 of the operation switch 18 with his or her left hand without gripping the steering wheel 56, and pushes it axially inwardly against the biasing force of the coil spring 66g, so that the guide pin 82 is disengaged from the detent hole $76_p$ corresponding to the parking range "P", slides along the third lateral groove portion 80e, and then reaches the inner end portion of the coupling groove portion 80f, thus stopping the push-in operation. Thereafter, the driver pivots the switch main body 66 downward, so that the guide pin 82 slides along the first coupling groove portion 80f, and reaches the inner end portion of the second lateral groove portion 80d, thus stopping the pivot operation.

Thereafter, when the driver releases the push-in force of the switch main body 66, the switch main body 66g is displaced axially outwardly as a whole by the biasing force of the coil spring 66g, so that the guide pin 82 slides along the second lateral groove portion 80d, and is fitted in and stopped at the detent hole $76_R$ corresponding to the reverse range "R". In this manner, the travel range position is switched to the reverse range "R".

When the vehicle is to be moved backward, the driver releases his or her foot from the brake pedal while the reverse range "R" is set, and depresses an accelerator pedal. On the other hand, when the vehicle is to be moved forward, the driver holds the switch main body 66 with his or her left hand, and pivots it downward, so that the guide pin 82 slides along the oblique groove portion 80c and reaches and stops at the inner end portion of the first lateral groove portion 80b. Subsequently, the switch main body 66 is displaced axially outwardly by the biasing force of the coil spring 66g, so that the guide pin 82 slides along the first lateral groove portion 80b and is fitted in and stopped at the detent hole $76_N$ corresponding to the neutral range "N".

In a state wherein the neutral range "N" is set in this manner, the driver rests both elbows on the armrests 92, and grips the so-called 8 o'clock 20 minute direction positions of the steering wheel 56 to take a driving position. As described above, the travel range switching operation between the neutral range "N" and the forward 2nd-speed range "2" can be attained by only tapping the finger operation portion 68 to pivot the switch main body 66. Therefore, the driver maintains a state wherein he or she grips the steering wheel 56 with his or her both hands, and stretches the middle finger of the left hand to tap the finger operation portion 68 downward from the set position of the neutral range "N". With this tap-down operation, the guide pin 82 is lightly disengaged from the detent hole $76_N$ corresponding to the neutral range "N", slides along the linear portion 80a, and is then fitted in and stopped at the detent hole $76_D$ corresponding to the forward drive range "D".

When the forward drive range "D" is set in this manner, the driver releases his or her foot from the brake pedal, and depresses the accelerator pedal, thus driving the vehicle forward in an automatic transmission state.

When the travel range position is switched to the neutral range while the vehicle is stopped at, e.g., an intersection, the driver stretches the middle finger of his or her left hand while gripping the steering wheel 56 with both hands, and taps the finger operation portion 68 of the operation switch 18 upward, so that the guide pin 82 is lightly disengaged from the detent hole $76_D$ corresponding to the drive range "D", slides along the linear groove portion 80a, and is then fitted in and stopped at the detent hole $76_N$ corresponding to the neutral range "N". In this manner, the travel range position can be switched to the neutral range "N".

During forward travel, for example, when the vehicle reaches a long down slope, and requires an engine brake, the driver stretches the middle finger of his or her left hand while gripping the steering wheel 56 with both hands, and taps the finger operation portion 68 of the operation switch 18 downward, so that the guide pin 82 is lightly disengaged from the detent hole $76_D$ corresponding to the drive range "D", slides along the linear groove portion 80a, and is fitted in and stopped at the detent hole $76_2$ corresponding to the forward 2nd-speed range "2". In this manner, the travel range position can be switched to the forward 2nd-speed range "2".

During forward travel, for example, when the vehicle reaches a steep down slope, and requires a strong engine brake, the driver stretches the middle finger of his or her left hand while gripping the steering wheel 56 with both hands, and pushes the push-in portion 70 of the operation switch 18 axially inwardly against the biasing force of the coil spring 66g, so that the guide pin 82 is disengaged from the detent hole $76_2$ corresponding to the forward 2nd-speed range "2", slides along the fourth lateral groove portion 80g, and reaches the upper end portion of the second coupling groove portion 80f, thus stopping the push-in operation. Thereafter, the driver pivots the finger operation portion 68 downward (i.e., taps it downward from the above) with the middle finger which has pushed in the push-in portion 70, so that the guide pin 82 slides along the second coupling groove portion 80h, and is fitted in and stopped at the detent hole $76_1$ for defining the forward 1st-speed range "1". In this manner, the travel range position can be switched to the forward 1st-speed range "1".

In this manner, when the forward 1st-speed range "1" is set, a strong engine brake can be attained. However, when the strong engine brake is erroneously set during high-speed travel, a stable travel state may be disturbed. For this reason, in this embodiment, as described above, when the travel range position is switched from the forward 2nd-speed range "2" to the forward 1st-speed range "1", two-step operations, i.e., push-in and pivot operations are required although the left hand keeps holding the steering wheel 56. Thus, the forward 1st-speed range "1" cannot be set by only pivoting the finger operation portion 68.

As a result, in a state wherein the travel range switching operation is executed among the forward 2nd-speed range "2" and the neutral range "N" with a light operation force, the forward 1st-speed range "1" cannot be easily set. In addition, in order to switch the travel range position from the forward 2nd-speed range "2" to the forward 1st-speed range "1", a special attention is required, and it can be effectively prevented to erroneously set the forward 1st-speed range "1".

More specifically, in this embodiment, during forward travel of the vehicle, when the driver changes the travel range position among the forward 2nd-speed range "2" and the neutral range "N" while he or she keeps holding the steering wheel 56 with both hands, he or she stretches the middle finger of his or her left hand and lightly taps the finger operation portion 68 of the operation switch 18 downward or upward to pivot the switch main body 66, thereby executing the travel range switching operation during forward travel without releasing the left hand from the steering wheel 56, i.e., while holding the steering wheel 56 with both hands. Thus, high-level safety upon operation of the steering wheel 56 can be attained.

When the travel range position is switched from the forward 2nd-speed range "2" to the forward 1st-speed range "1", the driver stretches the middle finger of his or her left hand, temporarily axially pushes in the push-in portion 70 of the operation switch 18, and then strongly taps the finger operation portion 68 upward to pivot the switch main body 66. As a result, the driver can execute the travel range switching operation for effecting a strong engine brake without releasing the left hand from the steering wheel 56, i.e., while holding the steering wheel 56 with both hands. Thus, high-level safety upon operation of the steering wheel 56 can be similarly attained.

When the travel direction of the vehicle is to be reversed from a forward travel state, after the travel range position is temporarily switched to the neutral range "N" by the above-mentioned operations, the driver releases his or her left hand from the steering wheel 56, and pushes the push-in portion 70 axially inwardly against the biasing force of the coil spring 66g with the middle finger of the released left hand. With this push-in operation, the guide pin 82 is disengaged from the detent hole $76_N$ corresponding to the neutral range "N", slides along the first lateral groove portion 80b, and reaches the lower end portion of the oblique groove portion 80c, thus stopping the push-in operation. Thereafter, the driver taps the finger operation portion 68 upward, so that the guide pin 82 slides along the oblique groove portion 80c, reaches its upper end portion, and is fitted in and stopped at the detent hole $76_R$ corresponding to the reverse range "R". In this manner, the travel range position can be switched to the reverse range "R".

When the travel range position is to be switched from the reverse range "R" to the parking range "P", operations quite opposite to those for switching the travel range position from the parking range "P" to the reverse range "R" are executed.

More specifically, in conventional vehicles, when a transmission operation in a manual transmission mechanism or a travel range switching operation in an automatic transmission mechanism is to be performed regardless of the type of transmission mechanism (manual or automatic transmission) or type of shift lever (column or floor shift lever type), a driver must release his or her left hand from the steering wheel 56 to perform the operation, a so-called single-hand driving state occurs, and it is not preferable in terms of safety. According to this embodiment, however, this problem can be solved, and the travel range switching operation can be performed without releasing the left hand from the steering wheel 56, i.e., while holding the steering wheel 56 with both hands. As a result, a greatly improved novel driving operation in terms of safety can be realized.

According to this embodiment, the operation switch 18 for switching the transmission range position is mounted on the left side surface of the steering column 58, and a front-wheel driving system is employed. As a result, a floor between the driver's seat and the front passenger's seat can be formed to be almost flat, and a space around the driver's seat can be "neatly" arranged. In this manner, gorgeous circumstances as if the driver's seat were placed on the floor of a reception room can be attained, and the circumstances in the passenger room creates a very "leisurely" atmosphere in addition to the fact that the driver can rest elbows of both arms on the armrests 92 and can take a relaxed driving position. As a result, a comfortable, safety driving condition can be naturally attained.

A control system for controlling a motorized driving operation of the automatic transmission mechanism 12 on the basis of a travel range switching operation through the operation switch 18 with the above-mentioned structure will be described below with reference through FIGS. 16 to 27.

The control system mainly comprises a signal generation mechanism 100 equipped in the operation switch 18, and the control unit 30 for driving the driving motor 22 of the motorized travel range switching apparatus 20 on the basis of a travel range switching signal and a range setting signal output from the signal generation mechanism 100 so that the automatic transmission mechanism 12 can be immediately set at the travel range position newly set by the operation switch 18. The signal generation mechanism 100 of the operation switch 18 will be described below.

As has already been described above with reference to FIG. 7, the signal generation mechanism 100 comprises the contacts $X_P$, $X_R$, $X_N$, $X_D$, $X_2$, and $X_1$ formed on the insulating portion defined on the left side surface of the steering column 58 in correspondence with the travel ranges "P", "R", "N", "D", "2", and "1", and the contact rod 66c fixed on the outward flange portion 66a of the switch main body 66 and sequentially contacting the contacts $X_P$, $X_R$, $X_N$, $X_D$, $X_2$, and $X_1$ in accordance with the pivot operation of the switch main body 66.

Figure 16:
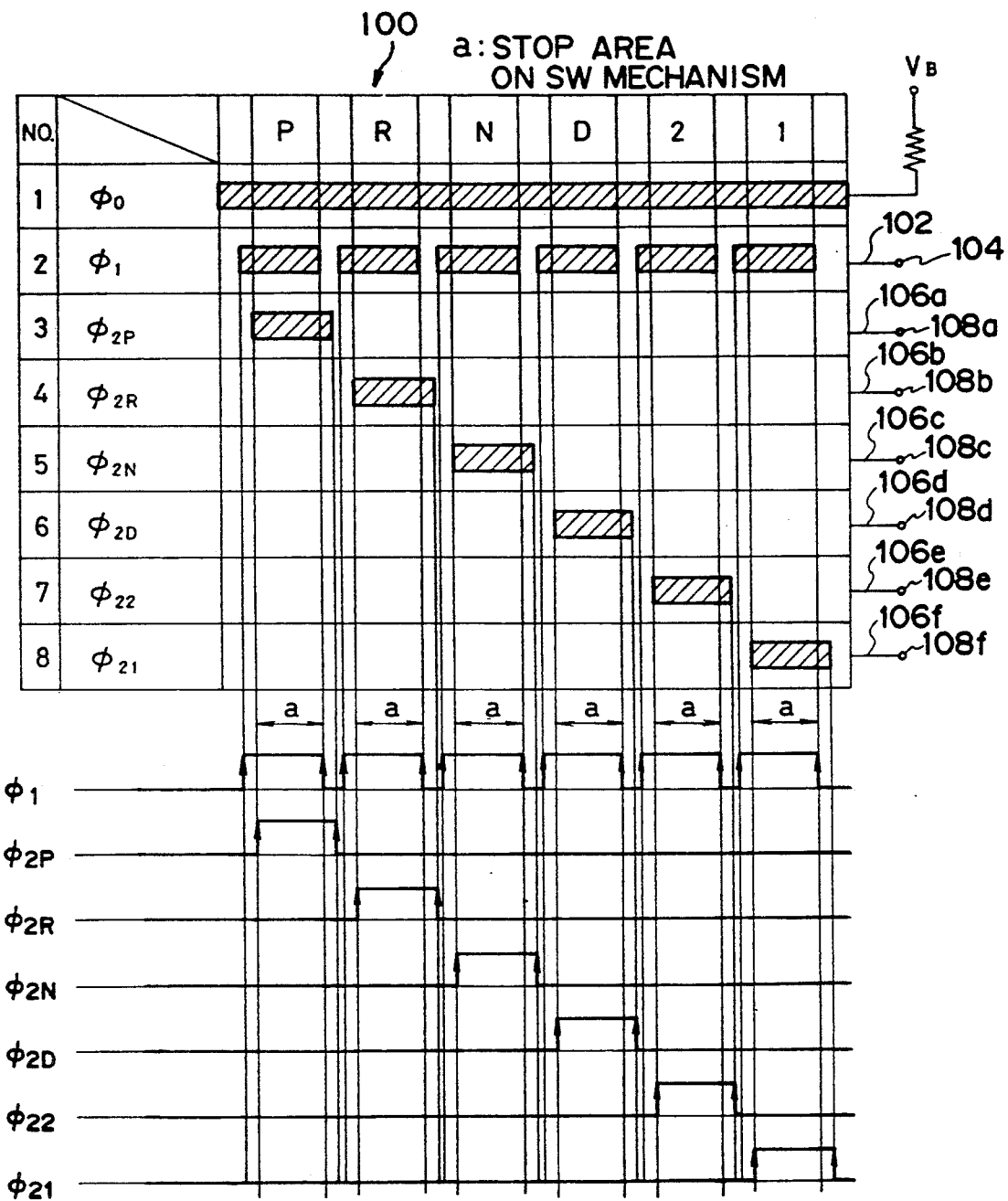
FIG. 16 is a plan view illustrating a contact structure of a signal generation mechanism in the operation switch.

More specifically, as shown in FIG. 16, the contacts $X_p$, $X_R$, $X_N$, $X_D$, $X_2$, and $X_1$ are constituted by a feeder terminal $\phi_0$ extending in an arcuated shape along the pivot direction of the switch main body and continuously formed to extend all over the contacts $X_p$, $X_R$, $X_N$, $X_D$, $X_2$, and $X_1$, first contact terminals $\phi_1$ sequentially aligned in a line along the pivot direction of the switch main body 66 beside the feeder terminal $\phi_0$, and independently formed in units of the contacts $X_p$, $X_R$, $X_N$, $X_D$, $X_2$, and $X_1$, and second contact terminals $\phi_{2P}$, $\phi_{2R}$, $\phi_{2N}$, $\phi_{2D}$, $\phi_{22}$, and $\phi_{21}$ sequentially aligned in a line along the pivot direction of the switch main body 66 beside the corresponding first contact terminals $\phi_1$, and formed in correspondence with the contacts $X_p$, $X_R$, $X_N$, $X_D$, $X_2$, and $X_1$.

The feeder terminal $\phi_0$ is connected to a battery (not shown) through a resistor (not shown). As shown in FIG. 16, each first contact terminal $\phi_1$ is formed to extend along the pivot direction of the switch main body in a sectorial shape having a predetermined central angle $\theta_1$ (it is illustrated as a rectangular shape for the sake of illustrative convenience in FIG. 16). The adjacent first contact terminals $\phi_1$ are separated from each other by equal angular intervals having a predetermined central angle $\theta_2$. The first contact terminals $\phi_1$ are electrically commonly connected by a first connection line 102 consisting of branch connection lines 102a (FIG. 17) temporarily extending sideways from their edges along a direction perpendicular to the slide direction of the contact rod 66c, and a main connection line 102b (FIG. 17) for commonly coupling these branch connection lines 102a and extending along the slide direction of the contact rod 66c. An end portion of the first connection line 102 is defined as a first output terminal 104.

On the other hand, the second contact terminals $\phi_{2P}$, $\phi_{2R}$, $\phi_{2N}$, $\phi_{2D}$, $\phi_{22}$, and $\phi_{21}$ are formed to extend along the slide direction of the contact rod 66c in a sectorial shape having the above-mentioned central angle $\theta_1$, and are entirely offset by a predetermined central angle $\theta_3$ along a forward operation direction of the operation switch 18 (this forward operation direction is defined as an operation direction from the parking range "P" toward the forward 1st-speed range "1", and a reverse operation direction is defined as an operation direction from the forward 1st-speed range "1" toward the parking range "P").

This offset amount (angle) $\theta_3$ is set to be smaller than the separation angle $\theta_2$ of the first contact terminals $\phi_1$. Therefore, the second contact terminal $\phi_2$ of a given travel range and the first contact terminal $\phi_1$ of the adjacent travel range are completely separated by a central angle $(\theta_2 - \theta_3)$, and the first contact terminal $\phi_1$ of a given travel range and the second contact terminal $\phi_2$ of the adjacent travel range are completely separated by a central angle $(\theta_2 - \theta_3)$. More specifically, the contacts $X_p$, $X_R$, $X_N$, $X_D$, $X_2$, and $X_1$ of the adjacent travel ranges are completely separated from each other by this complete separation angle $(\theta_2 - \theta_3)$.

Figure 17:
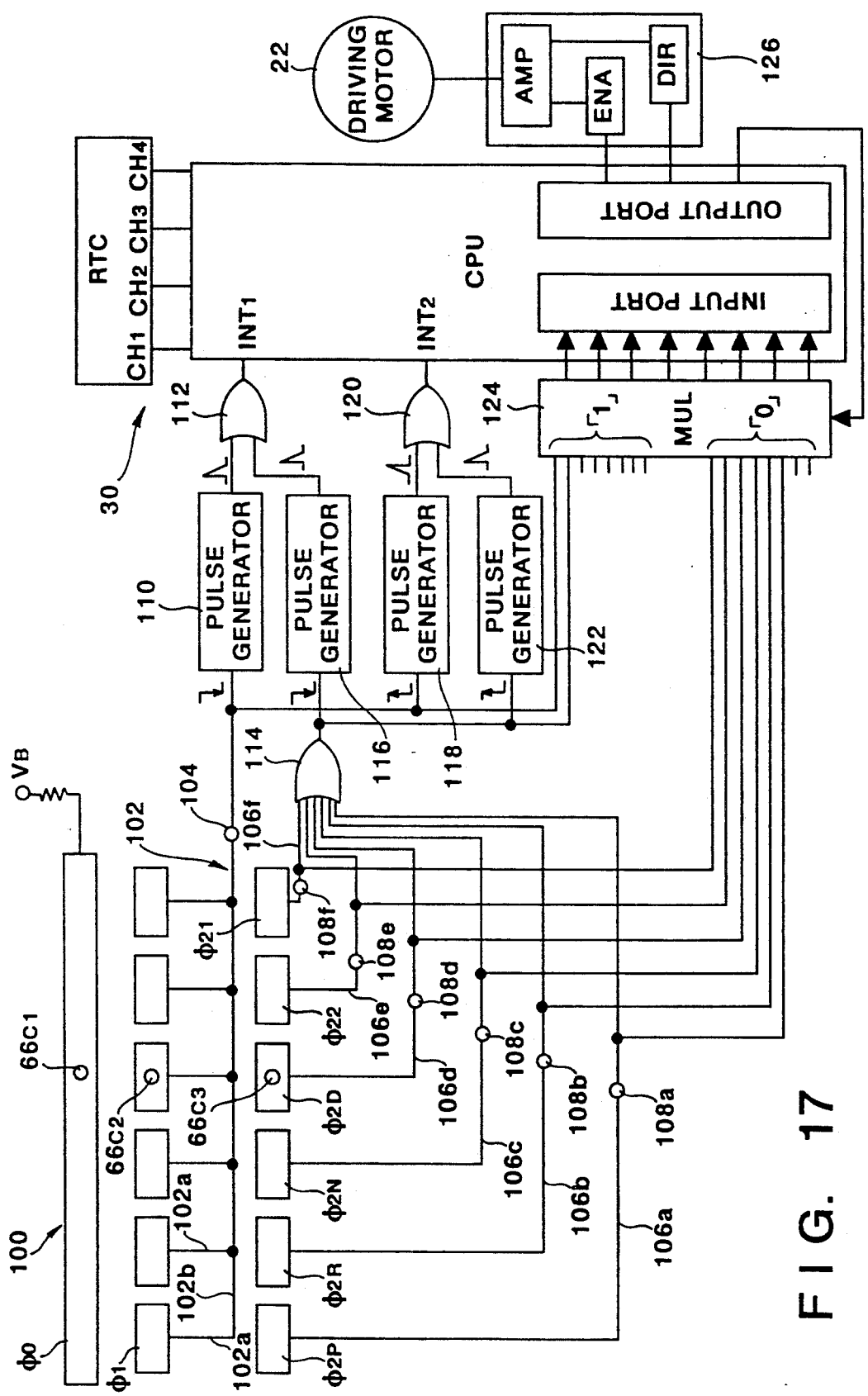
FIG. 17 is a block diagram showing in detail a connection state between the operation switch and a control unit.

Note that in FIG. 16, for the sake of easy understanding, the second contact terminals $\phi_{2P}$, $\phi_{2R}$, $\phi_{2N}$, $\phi_{2D}$, $\phi_{22}$, and $\phi_{21}$ are illustrated so that they are arranged not to overlap each other in the slide direction of the contact rod 66. However, in practice, as shown in FIG. 17, these contact terminals are independently aligned in a line along the travel direction of the contact rod 66c. The second contact terminals $\phi_{2P}$, $\phi_{2R}$, $\phi_{2N}$, $\phi_{2D}$, $\phi_{22}$, and $\phi_{21}$ are led outwardly by connection lines 106a through 106f which temporarily extend sideways from the edges of the terminals along a direction perpendicular to the slide direction of the contact rod 66c, and then extend along the slide direction of the contact rod 66c. The end portions of these second connection lines 106a through 106f are defined as second output terminals 108a through 108f.

The above-mentioned contact rod 66c comprises a first slide brush $66c_1$ which is always in contact with the feeder terminal $\phi_0$, a second slide brush $66c_2$ which is in selective contact with the first contact terminals $\phi_1$, and a third slide brush $66c_3$ which is in selective contact with the second contact terminals $\phi_{2P}$, $\phi_{2R}$, $\phi_{2N}$, $\phi_{2D}$, $\phi_{22}$, and $\phi_{21}$. These first through third slide brushes $66c_1$, $66c_2$, and $66c_3$ are moved together according to a pivotal movement of the switch main body 66, and are aligned in a line along a direction perpendicular to the moving direction of the contact rod 66c.

Each of the second and third slide brushes $66c_2$ and $66c_3$ has a circular contact end face (slide surface) having a diameter smaller than the above-mentioned complete separation amount $(\theta_2 - \theta_3)$. The first and second slide brushes $66c_1$ and $66c_2$, and the first and third slide brushes $66c_1$ and $66c_3$ are electrically connected to each other.

As a result, signals having waveforms shown in the timing chart portion of FIG. 16 are output from the first output terminal 104 and the second output terminals 108a through 108f upon operation of the operation switch 18, i.e., the pivotal movement of the switch main body 66. More specifically, the first output terminal outputs an "L"-level signal when the second slide brush $66c_2$ is in contact with the insulating portion, and outputs an "H"-level signal when the second slide brush $66c_2$ is in contact with the first contact terminal $\phi_1$. The second output terminals 108a through 108f output "L"-level signals while the third slide brush $66c_3$ is in contact with the insulating portion, and output "H"-level signals while the third slide brush $66c_3$ is in contact with the corresponding one of the second contact terminals $\phi_p$, $\phi_{2R}$, $\phi_{2N}$, $\phi_{2D}$, $\phi_{22}$, and $\phi_{21}$.

In this embodiment, the "H"-level signal from the first output terminal 104 and the "H"-level signal from one of the second output terminals 108a through 108f define range setting signals for indicating the travel range presently set by the operation switch 18. On the other hand, the "L"-level signal from the first output terminal 104 and the "L"-level signals from the second output terminals 108a to 108f define travel range switching signals for indicating that the travel range switching operation is started by the operation switch 18.

When the following travel ranges are set by pivoting the switch main body 66, signals are output from the first output terminal 104 and the second output terminals 108a through 108f in the following order.

Figure 18A:
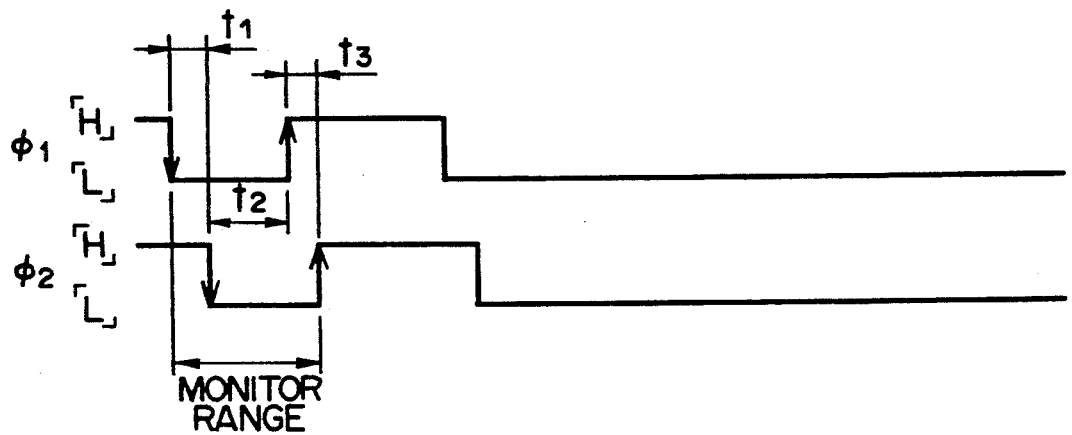
FIG. 18A is a timing chart showing an order of changes in output levels from first and second output terminals when the operation switch is rotated in a normal direction.

More specifically, when the switch main body 66 is pivoted in a forward direction from a state wherein the neutral range "N" is presently set, as shown in FIG. 18A, i.e., from a state wherein the "H"-level signals are output from both the first output terminal 104 and the second output terminal 108c, the second slide brush $66c_2$ is disengaged from the first contact terminal $\phi_1$ corresponding to the neutral range "N", and the output from the first output terminal 104 goes from "H" level to "L" level. Subsequently, the third slide brush $66c_3$ is disengaged from the second contact terminal $\phi_{2N}$ corresponding to the neutral range "N", and the output from the second output terminal 108c goes from "H" level to "L" level. In this manner, all the first and second terminals 104, and 108a through 108f output "L"-level signals, i.e., the travel range switching signals.

Thereafter, the second slide brush $66c_2$ is brought into contact with the first contact terminal $\phi_1$ adjacent thereto in the forward direction and corresponding to the forward drive range "D", and the output from the first output terminal 104 goes from "L" level to "H" level. Subsequently, after the lapse of a predetermined delay time, the third slide brush $66c_3$ is brought into contact with the second contact terminal $\phi_{2D}$ corresponding to the forward drive range "D", and the output from the second output terminal 108e goes from "L" level to "H" level. That is, the range setting signals indicating the forward drive range are output.

Figure 18B:
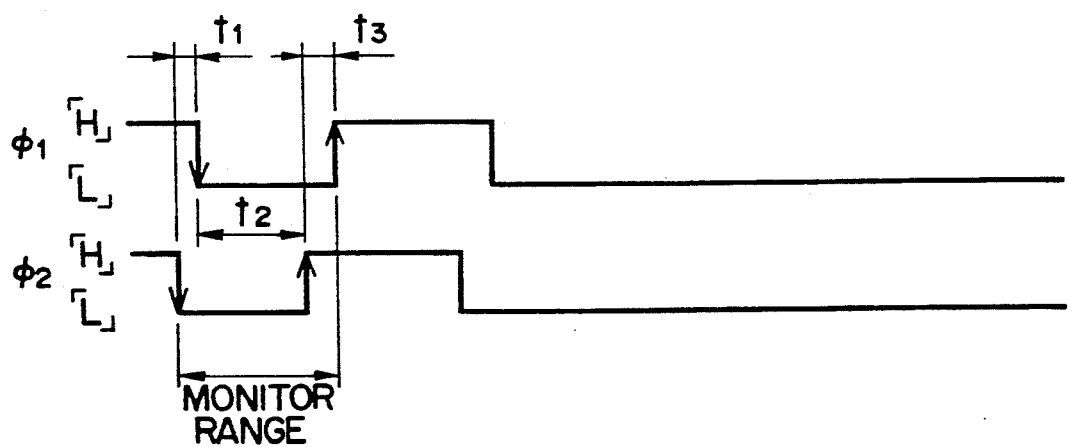
FIG. 18B is a timing chart showing an order of changes in output levels from the first and second output terminals when the operation switch is rotated in a reverse direction.

When the switch main body 66 is pivoted in a reverse direction from a state wherein the forward drive range "D" is presently set, as shown in FIG. 18B, i.e., from a state wherein the "H"-level signals are output from both the first output terminal 104 and the second output terminal 108d, the third slide brush $66c_3$ is disengaged from the second contact terminal $\phi_{2D}$ corresponding to the forward drive range "D", and the output from the second output terminal 108d goes from "H" level to "L" level. Subsequently, the second slide brush $66c_2$ is disengaged from the first contact terminal $\phi_1$ corresponding to the forward drive range "D", and the output from the first output terminal 104 goes from "H" level to "L" level. In this manner, all the first and second terminals 104, and 108a through 108f output "L"-level signals, i.e., the travel range switching signals.

Thereafter, the third slide brush $66c_3$ is brought into contact with the second contact terminal $\phi_{2N}$ adjacent thereto in the reverse direction and corresponding to the neutral range "N", and the output from the second output terminal 108c goes from "L" level to "H" level. Subsequently, after the lapse of a predetermined delay time, the second slide brush $66c_2$ is brought into contact with the first contact terminal $\phi_1$ corresponding to the neutral range "N", and the output from the first output terminal 104 goes from "L" level to "H" level. That is, the range setting signals indicating the neutral range are output.

As a result, as will be described in detail later, the control unit 30 monitors the order of rising of output levels of the first and second output terminals 104 and 108a through 108f. When the control unit 30 detects that the output from the first output terminal 104 first goes to "H" level, and then, the output from one of the second output terminals 108a through 108f goes to "H" level, it determines that the operation switch 18 is operated in the forward direction. On the other hand, when the control unit 30 detects that the output from one of the second output terminals 108a through 108f goes to "H" level, and then, the output from the first output terminal 104 goes to "H" level, it determines that the operation switch 18 is operated in the reverse direction. In this manner, upon operation of the operation switch 18, the control unit 30 can recognize at least whether the operation switch is operated in the forward or reverse direction although its destination (i.e., a target stop position) is unknown yet.

In this embodiment, whether the operation switch is operated in the forward or reverse direction is determined on the basis of two "H"-level signals, i.e., the "H"-level output from the first output terminal 104 and rising of the "H"-level output from one of the second output terminals 108a through 108f. As a result, as compared to a case wherein a rotational direction is determined based on a single "H"-level signal, an erroneous operation caused by noise does not easily occur. More specifically, in this embodiment, signals from the signal generation mechanism 100 are constituted by outputs which change based on contact.noncontact operations between contact terminals and the contact rod 66c. When signals are defined based on a change in contact state, noise tends to be generated. When such noise is recognized as an "H"-level signal, if a rotational direction is determined on the basis of a single "H"-level signal, the travel range switching operation may be undesirably started in the automatic transmission mechanism 12 although the operation of the operation switch 18 is not yet determined. However, in this embodiment, as described above, since a rotational direction is recognized based on the two "H"-level signals, a possibility of an erroneous operation caused by noise can be minimized, and the rotational direction can be reliably determined.

Note that symbol a in FIG. 16 denotes a range of a common extending portion of the first and second contact terminals $\phi_1$ and $\phi_2$ in each travel range, and its length is expressed by $a = \theta_1 - 2 \times \theta_3$. When the contact rod 66c reaches a region represented by the range a, the travel range setting position is mechanically regulated by the above-mentioned detent mechanism in the operation switch 18, thus stopping the switch 18.

The connection state between the operation switch 18 and the control unit 30 will be described below with reference to FIG. 17.

The output terminal 104 for the first contact terminals $\phi_1$ is connected to one input terminal of a first OR gate 112 through a first pulse generator 110. The output terminals 108a through 108f for the second contact terminals $\phi_{2P}$ through $\phi_{2I}$ are connected to input terminals of a second OR gate 114. The output terminal of the second OR gate 114 is connected to the other input terminal of the first OR gate 112 via a second pulse generator 116. The first and second pulse generators 110 and 116 output one-shot pulses in response to the trailing edges of input signals. The output terminal of the first OR gate 112 is connected to a first interrupt terminal $INT_1$ of a CPU for executing a control sequence in the control unit 30.

The output terminal 104 for the first contact terminals $\phi_1$ is connected to one input terminal of a third OR gate 120 via a third pulse generator 118. The output terminal of the second OR gate 114 is connected to the other input terminal of the third OR gate 120 via a fourth pulse generator 122. The third and fourth pulse generators 118 and 122 output one-shot pulses in response to the trailing edges of input signals. The output terminal of the third OR gate 120 is connected to a second interrupt terminal $INT_2$ of the CPU for executing the control sequence of the control unit 30.

The second output terminals 108a through 108f are connected to one input terminal group of an 8×4 multiplexer 124, and the first output terminal 104 and the output terminal of the second OR gate 114 are connected to the other input terminal group of this multiplexer. When an "L"-level signal is input to a control terminal of the multiplexer 124, the multiplexer 124 outputs the signals input to one input terminal group to an input port of the CPU; when an "H"-level signal is input to the control terminal, it outputs signals input to the other input terminal group to the input port of the CPU.

The CPU is connected to a real-time counter RTC. The real-time counter RTC has four channels. In each channel, when a corresponding timer is started, and a preset time is time-up, a time-up signal is output to the CPU. When the CPU receives the time-up signal from any of the timers in the four channels, it determines a failed state, and executes a predetermined fail-safe operation. The timer in each channel stops a count-up operation in response to an input timer reset signal, and is reset to an initial state to wait for the next signal.

The CPU is connected to the driving motor 22 via a servo amplifier 126. The servo amplifier 126 comprises a direction latch circuit DIR for defining a rotational direction of the driving motor 22, an enable latch circuit ENA for defining a driving force of the driving motor 22, and an amplifier AMP for amplifying the outputs from the direction latch circuit DIR and the enable latch circuit ENA and supplying these outputs to the driving motor 22. When the direction latch circuit DIR receives a "1" signal, it outputs a forward rotation signal for rotating the driving motor 22 in a forward direction; when it receives a "0" signal, it outputs a reverse rotation signal for rotating the driving motor 22 in a reverse direction. When the enable latch circuit ENA receives a "1" signal, it outputs a driving signal for driving the driving motor 22 at a predetermined voltage; when it receives a "0" signal, it does not apply any voltage to the driving motor 22.

Note that the CPU has, as a main routine, a routine for controlling to stop rotation of the driving motor 22 when a travel range newly set by the operation switch 18 coincides with an inhibitor signal from the inhibitor switch 32 of the automatic transmission mechanism 12 after the rotational direction of the operation switch 18 is determined in a rotational direction determination routine (to be described later) and the driving motor 22 is rotated based on the determined rotational direction. Meanwhile, when a pulse signal is input to the first or second interrupt terminal $INT_1$ or $INT_2$, the main routine is interrupted, and the CPU executes the first or second interrupt routine.

The control sequence in the CPU will be described hereinafter with reference to FIGS. 19 through 27.

The main routine of the CPU will be described below with reference to FIG. 19.

In this main routine, in step S10, a travel range ($SR_1$) presently set in the automatic transmission mechanism 12 is read based on an inhibitor signal (INH) from the inhibitor switch 32. In step S12, an "L"-level signal is output to the control terminal of the multiplexer MUX, and signals connected to one input terminal group of the multiplexer, i.e., signals output from the second output terminals 108a through 108f are input to the input terminals of the CPU. Thereafter, in step S14, a travel range ($SR_S$) presently set by the operation switch 18 is read based on the signals from the second output terminals 108a through 108f.

It is checked in step S16 if the travel range ($SR_1$) set in the automatic transmission mechanism 12 and read in step S10 coincides with the travel range ($SR_S$) set by the operation switch 18 and read in step S14. If YES in step S16, i.e., if it is determined that the travel range ($SR_1$) set in the automatic transmission mechanism 12 coincides with the travel range ($SR_2$) set by the operation switch 18, the driving motor 22 need not be driven to switch the travel range of the automatic transmission mechanism 12. Therefore, in step S18, a flag F (forward) indicating that the operation switch 18 is operated in the forward direction is reset, and in step S20, a flag F (reverse) indicating that the operation switch 18 is operated in a reverse direction is reset. In step S22, a "0" signal is output to the enable latch circuit 22 of the servo amplifier 126. As a result, a driving operation of the driving motor 22 is stopped.

Thereafter, in step S24, a first fail judgment operation is executed, and the flow then returns to step S10. The sequence in step S10 and subsequent steps are repeated. The first fail judgment operation in step S24 will be described later as a subroutine.

A case wherein No in step S16, i.e., it is determined that the travel range ($SR_1$) set in the automatic transmission mechanism 12 does not coincide with the travel range ($SR_2$) set by the operation switch 18 will occur in the following states. That is, when the driver operates the operation switch 18 to switch the travel range position, and the next travel range adjacent to the previous range in the forward or reverse direction is newly set, the newly set travel range is determined when both the outputs from the first output terminal 104 and the corresponding one of the second output terminals 108a through 108f go to "H" level. In addition, since the start timing of the driving motor 22 is defined by the rising timings of the two outputs, as will be described in detail later, the ranges $SR_1$ and $SR_S$ do not coincide with each other.

For this reason, after a noncoincidence state is detected, when the two ranges are separated by only one range (i.e., when the operation switch 18 is operated to the neighboring travel range), the driving motor 22 is driven to cause the two ranges to coincide with each other. When the two ranges are separated by two or more ranges (i.e., when the operation switch 18 is operated to a farther range beyond the neighboring range), the driving motor 22 is controlled so that the travel range of the automatic transmission mechanism 12 is set to coincide with the immediately preceding travel range set by the operation switch 18.

More specifically, if NO in step S16, it is checked in step S26 if a flag F (monitor) for defining a monitor range is "1". Note that the monitor range is defined between the first falling timing to the last rising timing of adjacent travel ranges, as shown in FIGS. 18A and 18B. When the operation switch 18 is stopped at the adjacent travel range position, since a noncoincidence between $SR_1$ and $SR_S$ has already been detected in step S16, NO is always determined in step S26. However, when the operation switch 18 is further operated beyond the adjacent travel range, since it enters the next monitor range, YES is inevitably determined in step S26.

If NO in step S26, the forward or reverse direction operation of the operation switch 18 is determined in step S28. The forward/reverse determination of the operation switch 18 is performed on the basis of a determination result in an operation direction determination routine of the operation switch 18, which is executed at a timing when both the outputs from the first output terminal 104 and a corresponding one of the second output terminals 108a to 108f goes through "H" level.

If the forward direction is determined in step S28, i.e., if it is determined that the flag F (forward) is set, "1" signals are output to both the enable latch circuit ENA and the direction latch circuit DIR of the servo amplifier 126 in step S30. As a result, the driving motor 22 is driven in the forward direction, and the switching operation from the presently set travel range to the adjacent travel range in the forward direction is executed in the automatic transmission mechanism 12.

If the reverse direction is determined in step S28, i.e., if it is determined that the flag F (reverse) is set, a "1" signal is output to the enable latch circuit ENA of the servo amplifier 126, and a "0" signal is output to the direction latch circuit DIR in step S32. As a result, the driving motor 22 is driven in the reverse direction, and a switching operation from the presently set travel range to the adjacent travel range in the reverse direction is executed in the automatic transmission mechanism 12.

When step S30 or S32 is executed, a second fail judgment operation is executed in step S34, and the flow returns to step S10 to repeat the sequence from step S10 and subsequent steps. The second fail judgment operation in step S34 will be described later as a subroutine.

In a process of executing the sequence from step S10 and thereafter, when the travel range set in the automatic transmission mechanism 12 based on a driving operation of the driving motor 22 is close to the next adjacent travel range but the travel range ($SR_S$) set by the operation switch 18 does not coincide with the travel range ($SR_1$) based on the inhibitor switch 32 yet, NO is determined in step S16, and steps S26, S28, and S30 (or S32) are successively executed to keep driving the driving motor 22.

When the travel range set in the automatic transmission mechanism 12 is set to be the next adjacent travel range, the travel range ($SR_S$) by the operation switch 18 coincides with the travel range ($SR_1$) based on the inhibitor switch 32. As a result, YES is determined in step S16. Therefore, control from step S18 is executed, and the driving motor 22 is stopped upon execution of step S22.

If YES in step S26, i.e., if it is determined that the operation switch 18 enters the next monitor range beyond the adjacent travel range, the travel range ($SR_1$) presently set in the automatic transmission mechanism 12 is read based on the inhibitor signal (INH) from the inhibitor switch 32 in step 36. In step S38, the immediately preceding travel range ($SR_{S-1}$) set by the operation switch 18 is read. More specifically, the travel range ($SR_{S-1}$) is defined by the travel range located immediately behind the present monitor range of the operation switch 18 with respect to the operation direction. Whether this travel range ($SR_{S-1}$) is adjacent to the travel range ($SR_1$) set in the automatic transmission mechanism 12 is not concerned, and when the operation switch 18 is immediately operated, the operation of the automatic transmission mechanism 12 is relatively delayed, and the above ranges may be separated by two or more travel ranges.

In step S40, it is checked if the travel range ($SR_1$) read in step S36 and presently set in the automatic transmission mechanism 12 coincides with the immediately preceding travel range ($SR_{S-1}$) set by the operation switch 18. If NO in step S40, the flow jumps to step S28, and the driving motor 22 is kept driven; otherwise, i.e., if it is determined that the travel range ($SR_1$) presently set in the automatic transmission mechanism 12 coincides with the immediately preceding travel range ($SR_{S-1}$) set by the operation switch 18, the flow jumps to step S18 to reset the flags F (forward) and F (reverse), and the driving operation of the driving motor 22 is then stopped.

In this manner, as long as the operation switch 18 is located within the monitor range, the travel range in the automatic transmission mechanism 12 is stopped at an immediately preceding travel range ($SR_{S-1}$) set by the operation switch 18, and it reliably can be prevented that control sets a travel range advanced from that to be set by the operation switch 18.

More specifically, according to this embodiment, as will be described later, only the operation direction of the operation switch 18 is read first, and the driving motor 22 is started according to the read operation direction to execute the switching operation in the automatic transmission mechanism 12 so that the travel range switching operation is executed in quick response to the operation of the operation switch 18. As a result, since no stop signal of the driving motor 22 is output in the above-mentioned monitor range, if the operation switch 18 is operated very slowly in this monitor range, the travel range switching speed by the driving motor 22 exceeds the operation speed of the switch 18, and the travel range set in the automatic transmission mechanism 12 overtakes that set by the operation switch. Thus, an uncontrollable state may occur.

More specifically, assume that the operation switch 18 is quickly operated from the neutral range position "N" to a monitor range located between the forward drive range "D" and the forward 2nd-speed range "2" beyond the forward drive range "D", and is then operated very slowly in this monitor range. In this case, when the operation switch 18 passes the forward drive range "D", the CPU outputs a driving signal to rotate the driving motor 22 in the forward direction. If no proper measure is adopted at all in this state, since no stop condition is established as long as the operation switch 18 stays in the monitor range between the forward drive range "D" and the forward 2nd-speed range "2", the driving motor 22 is kept driven, and the travel range set in the automatic transmission mechanism 12 is sequentially switched to the forward direction.

As a result, when the driver stops the operation switch 18 at the forward 2nd-speed range position "2" and wants to switch the travel range position to the forward 2nd-speed range "2", the forward 1st-speed range is set beyond the forward 2nd-speed range "2" in this automatic transmission mechanism 12. That is, the travel range set by the operation switch 18 does not coincide with the travel range set in the automatic transmission mechanism, and a failed state occurs.

However, as described above, according to this embodiment, as long as the operation switch 18 is located within the monitor range, the travel range in the automatic transmission mechanism 12 is stopped at the immediately preceding travel range set by the operation switch 18, and this travel range is temporarily set. Therefore, the travel range in the automatic transmission mechanism 12 can be prevented from setting a travel range advanced from that to be set by the operation switch 18.

While the operation switch 18 is operated within the monitor range, NO is determined in step S16 via steps S10, S12, and S14, a control loop is formed such that YES is determined in step S26, NO is determined in step S40 via steps S36 and S38, and then the flow returns to step S10 via steps S28, S30 (or S32), and S34. As will be described later, however, since it is very abnormal to operate the operation switch 18 to stay within the monitor range for a long period of time, when a stay time of the operation switch 18 in the monitor range exceeds a predetermined period of time, a fourth failed state is satisfied, and a fourth fail-safe operation is executed.

On the other hand, when the operation switch 18 is further operated and enters the next travel range setting position to fall outside the monitor range, NO is determined in step S16 at that time, and steps S28 and S30 (or S32) are executed to drive the driving motor 22 in the same manner as in a case wherein the operation switch 18 is switched to the adjacent travel range. Thereafter, steps S34, S10, S12, and S24 are executed, and decision step S16 is then executed again. Since the travel range in the automatic transmission mechanism 12 catches up that set by the operation switch 18, YES is determined in step S16, and steps S18, S20, and S22 are executed to stop the driving motor 22.

As described in detail above, in this main routine, the travel range in the automatic transmission mechanism 12 is set to reliably coincide with the travel range set at a position where the operation switch 18 is stopped.

The first interrupt routine during execution of the above-mentioned main routine will be described below with reference to FIG. 20. The first interrupt routine is executed every time a pulse signal is input to the first interrupt terminal $INT_1$ in FIG. 17.

More specifically, when the operation switch 18 is operated, and is moved in a direction to be away from the presently set travel range, two "L"-level states occur in an output (to be simply referred to as a first output hereinafter) $\Phi_1$ from the first output terminal 104 or an output (to be simply referred to as a second output hereinafter) $\Phi_2$ from the second OR gate 114 regardless of the operation direction (forward or reverse direction) of the operation switch 18. More specifically, every time the "L"-level state occurs, a pulse signal is output from the first OR gate 112, and when the operation switch 18 is switched from the presently set travel range position, the first interrupt routine is started twice.

In the first interrupt routine for the first time, in step S42, an "H"-level signal is output to the control terminal of the multiplexer MUX, so that the output from the first output terminal 104 and the output from the second OR gate 114 are input to the input port. In step S44, the first and second outputs $\Phi_1$ and $\Phi_2$ are loaded.

Thereafter, in step S46, it is checked based on the loading results in step S44 if both the first and second outputs $\Phi_1$ and $\Phi_2$ are at "L" level. When the first pulse signal is input to the first interrupt terminal $INT_1$, one of the first and second outputs $\Phi_1$ and $\Phi_2$ goes to "L" level, but the other is kept at "H" level. Thus, NO is determined in step S46.

In step S48, a first timer $T_1$ of the real-time counter RTC is started. An allowable time $t_1$ from when one of the first and second outputs $\Phi_1$ and $\Phi_2$ goes to "L" level until both the outputs go to "L" level is preset in the first timer $T_1$. When the time $t_1$ has passed, the first timer $T_1$ outputs a time-up signal to the CPU, and upon reception of this time-up signal, the CPU interrupts this routine and executes the third fail-safe routine, as will be described later. In step S50, a flag F (monitor) indicating that the operation switch 18 is present in the above-mentioned monitor range is set, and the flow returns to the main routine.

In the first interrupt routine for the first time, a start point of the monitor range is defined, and the first timer $T_1$ starts to count a time during which a state wherein one of the outputs $\Phi_1$ and $\Phi_2$ of the operation switch 18 is kept at "H" level is maintained as the third fail judgment operation.

When the operation switch 18 is further operated and is moved in a direction to be completely away from the presently set travel range, the second "L"-level state occurs in the first or second output $\Phi_1$ or $\Phi_2$ regardless of its operation (forward or reverse) direction. At this time, the second pulse signal is output from the first OR gate 112, and the first interrupt routine is started again, i.e., for the second time.

In the first interrupt routine for the second time, in step S42, an "H"-level signal is output to the control terminal of the multiplexer MUX to load the first and second outputs $\Phi_1$ and $\Phi_2$ in the same manner as in the first time. In step S46, it is checked based on the loading results in step S44 if both the first and second outputs $\Phi_1$ and $\Phi_2$ are at "L" level. When the second pulse signal is input to the first interrupt terminal $INT_1$, since both the first and second outputs $\Phi_1$ and $\Phi_2$ go to "L" level, YES is determined in step S46.

Since one of the outputs $\Phi_1$ and $\Phi_2$ of the operation switch 18 has already gone from an "H"-level state to an "L"-level state, the first timer $T_1$ of the real-time counter RTC is reset in step S52 so as not to execute the third fail judgment. That is, when the first timer $T_1$ is reset, the first timer $T_1$ stops a time-count operation, and is reset to an initial state.

Thereafter, in step S54, a second timer $T_2$ of the real-time counter RTC is started. An allowable time $t_2$ during which a state wherein both the first and second outputs $\Phi_1$ and $\Phi_2$ are kept at "L" level is maintained when the operation switch 18 is operated is preset in the second timer $T_2$. When the time $t_2$ has passed, the second timer $T_2$ outputs a time-up signal to the CPU, and upon reception of this time-up signal, the CPU interrupts this routine and executes the fourth fail-safe routine, as will be described later. In this manner, after the second timer $T_2$ is started in step S54, the flow returns to the main routine.

More specifically, in the first interrupt routine for the second time, the first timer $T_1$ is reset to stop counting a time for maintaining a state wherein one of the outputs $\Phi_1$ and $\Phi_2$ of the operation switch 18 is kept at "H" level, and the second timer $T_2$ starts counting a time for maintaining a state wherein both the outputs $\Phi_1$ and $\Phi_2$ of the operation switch 18 are at "L" level.

The second interrupt routine during execution of the above-mentioned main routine will be described below with reference to FIG. 21. The second interrupt routine interrupts the main routine and is executed every time a pulse signal is input to the second interrupt terminal $INT_2$ shown in FIG. 17.

More specifically, when the operation switch 18 is operated to be moved in a direction to be away from the presently set travel range, and is about to enter the adjacent travel range, two "H"-level states occur in the output $\Phi_1$ from the first output terminal 104 or the output $\Phi_2$ from the second OR gate 114 regardless of the operation (forward or reverse) direction of the switch 18. Every time an "H"-level state occurs, a pulse signal is output from the third OR gate 120. More specifically, when the operation switch 18 is switched from the presently set travel range to the adjacent travel range, the second interrupt routine is executed twice.

In the second interrupt routine for the first time, in step S56, an "H"-level signal is output to the control terminal of the multiplexer MUX, so that the first and second outputs $\Phi_1$ and $\Phi_2$ are input to the input port. In step S58, the first and second outputs $\Phi_1$ and $\Phi_2$ are loaded.

In step S60, an output change state is judged. The output change state includes three modes, i.e., a first change mode wherein the first output $\Phi_1$ is at "H" level and the second output $\Phi_2$ is at "L" level, a second change mode wherein the first output $\Phi_1$ is at "L" level and the second output $\Phi_2$ is at "H" level, and a third change mode wherein both the outputs $\Phi_1$ and $\Phi_2$ are at "H" level. However, since this second interrupt routine is executed for the first time, only the first and second change modes can only theoretically occur. If the first change mode is determined in step S60, this means that the operation direction of the operation switch 18 is determined as a forward direction. Therefore, in step S62, a flag (T forward) for preliminarily defining the forward direction is set.

Thereafter, the second timer $T_2$ is reset in step S64. That is, since the second interrupt routine is started, this means that at least one of the outputs $\Phi_1$ and $\Phi_2$ goes to "H"-level, and the second timer $T_2$ for counting a time during which both the outputs $\Phi_1$ and $\Phi_2$ are at "L" level is reset to inhibit the fourth fail judgment operation. More specifically, when the second timer $T_2$ is reset, it stops a time-count operation, and is reset to an initial state. In step S66, a third timer $T_3$ of the real-time counter RTC is started.

An allowable time $t_3$ from when one of the first and second outputs $\Phi_1$ and $\Phi_2$ goes to "H" level until both the outputs go to "H" level is preset in the third timer $T_3$. Note that when the time $t_3$ has passed, the third timer $T_3$ outputs a time-up signal to the CPU, and upon reception of this time-up signal, the CPU interrupts this routine and executes the fifth fail-safe routine, as will be described later. After the third timer $T_3$ is started in step S66, the flow returns to the main routine.

On the other hand, if the second change mode is determined in step S60, this means that the operation direction of the operation switch 18 is determined as a reverse direction when the second interrupt routine is started. In step S68, a flag F (T reverse) for preliminarily defining the reverse direction is set, and the flow jumps to step S64 described above. Steps S64 and S66 are sequentially executed, and then, the flow returns to the main routine.

In this manner, in the second interrupt routine for the first time, the third timer $T_3$ starts counting a time for maintaining a state wherein one of the outputs $\Phi_1$ and $\Phi_2$ of the operation switch 18 is at "L" level as the fifth fail judgment operation.

When the operation switch 18 is further operated and is moved in a direction to perfectly enter the next travel range, the second "H"-level state occurs in the first or second output $\Phi_1$ or $\Phi_2$ regardless of its operation (forward or reverse) direction. At this time, the third OR gate 120 outputs the second pulse signal, and the second interrupt routine is started again, i.e., for the second time.

In the second interrupt routine for the second time, steps S56 and S58 are sequentially executed in the same manner as in the first time, and in step S60, the third change mode is determined, i.e., it is judged that both the outputs $\Phi_1$ and $\Phi_2$ go to "H" level. Since establishment of this judgment means that the operation switch 18 escapes from the above-mentioned monitor range, the flag F (monitor) for defining the monitor range is reset in step S70. In step S72, whether the operation switch 18 is operated in the forward or reverse direction is determined.

More specifically, if the third change mode is determined in step S60 in a state wherein the preliminary flag F (T forward) is set in the second interrupt routine for the first time, it is determined in step S72 that the operation switch 18 is operated in the forward direction. In step S74, the flag F (forward) indicating that the operation switch 18 is operated in the forward direction, and in step S76, the flag F (reverse) indicating the reverse direction is reset. In addition, in step S78, the preliminary flag F (T forward) is reset.

Thereafter, since it is recognized in step S60 that both the outputs $\Phi_1$ and $\Phi_2$ go to "H" level, the third timer $T_3$ of the real-time counter RTC is reset in step S80 to inhibit the fifth fail judgment. That is, when the third timer $T_3$ is reset, it stops a time-count operation, and is reset to an initial state. After the third timer $T_3$ is reset in step S80, the flow returns to the main routine.

On the other hand, if the third change mode is determined in step S60 in a state wherein the preliminary flag F (T reverse) is set in the second interrupt routine for the first time, it is determined in step S72 described above that the operation switch 18 is operated in the reverse direction. In step S82, the flag F (reverse) indicating that the operation switch 18 is operated in the reverse direction is set, and in step S84, the flag F (forward) indicating the forward direction is reset. In addition, in step S86, the preliminary flag F (T reverse) is reset.

Thereafter, the flow jumps to step S80 described above, and the third timer $T_3$ of the real-time counter RTC is reset. After the third timer $T_3$ is reset in this manner, the flow returns to the main routine.

In this manner, in the second interrupt routine for the second time, the third timer $T_3$ is reset to stop counting a time for maintaining a state wherein one of the outputs $\Phi_1$ and $\Phi_2$ of the operation switch 18 is at "L" level, and whether the operation switch 18 is operated in the forward or reverse direction is defined. As a result, as has been described above in step S28 in the main routine, even if the target destination position (travel range) upon operation of the operation switch 18 is unknown, since at least the operation direction of the operation switch 18 is determined, the following control is executed while the target travel range position is unknown. That is, the driving motor 22 is started in accordance with the operation direction of the operation switch 18, thus starting the travel range switching operation in the automatic transmission mechanism 12.

As a result, in this embodiment, even when the operation switch 18 is quickly operated, the travel range switching operation in the automatic transmission mechanism 12 is started to follow this quick operation. Thus, the actual travel range switching operation in the automatic transmission mechanism 12 which satisfactorily responds to the travel range switching operation by the driver can be realized.

The first fail judgment subroutine in step S24 described in the above-mentioned main routine will be described below with reference to FIG. 22. In this first fail judgment, even when a time $t_4$ which sufficiently makes an allowance for a time required for converging a vibration state when the monitor is stopped after the stop state of the driving motor 22 is theoretically attained, and a time required for mechanically correcting an allowable overshoot or undershoot by the above-mentioned detent mechanism is set, if the driving motor 22 is kept driven to exceed the setting time $t_4$, an abnormal state is determined, and fail judgment is executed.

Figure 22:
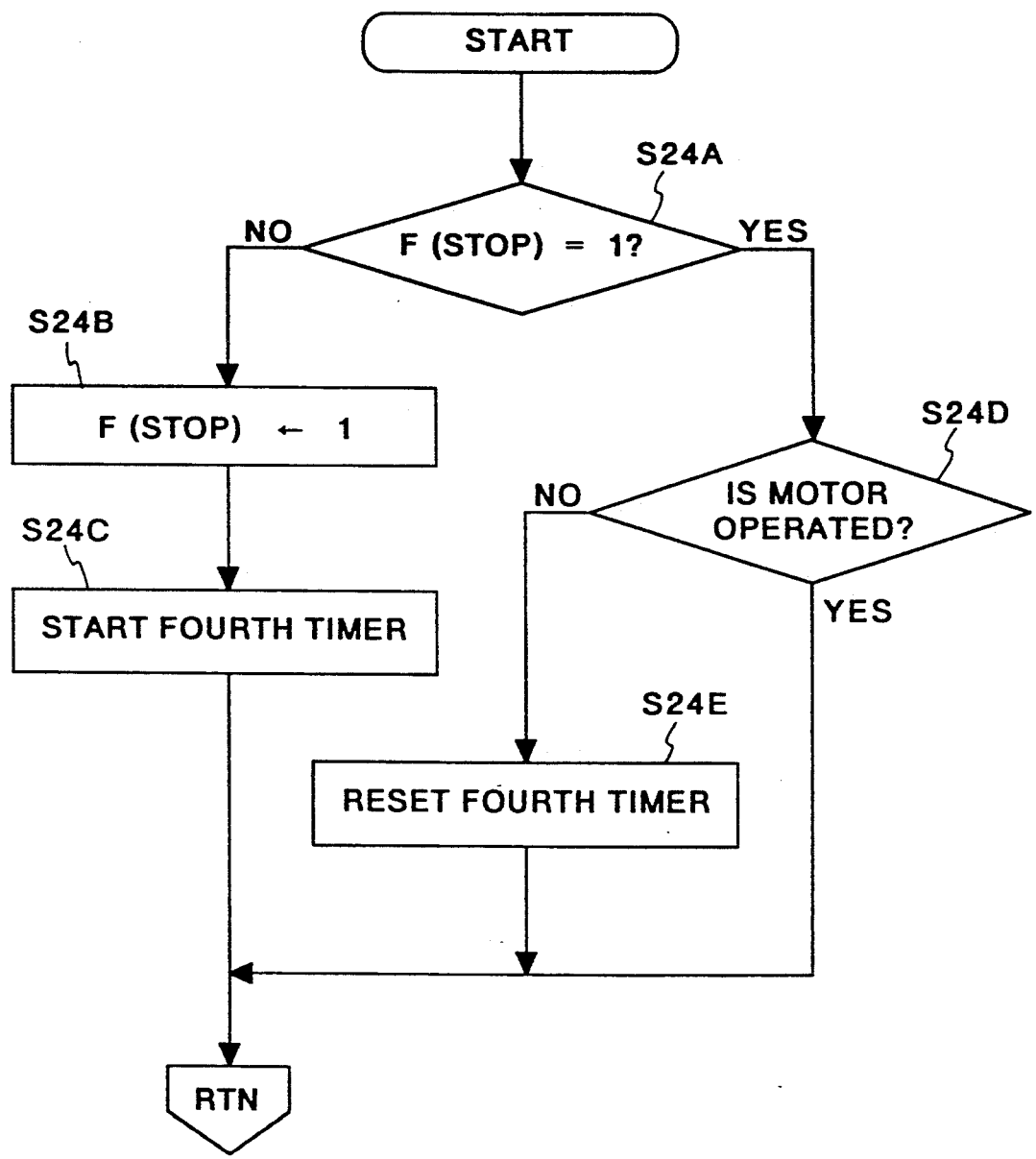
FIG. 22 is a flow chart showing a sequence of a subroutine in a first fail judgment operation of the CPU.

More specifically, when execution of step S22 is completed in the main routine, as shown in FIG. 22, it is checked in step S24A if a flag F (stop) indicating that a stop state occurs is set. When step S24A is judged for the first time, since this flag F (stop) is not set in advance, NO is determined. In step S24B, this flag F (stop) is set, and a fourth timer $T_4$ of the real-time counter RTC is started in step S24C.

The above-mentioned predetermined time $t_4$ is preset in the fourth timer $T_4$. When the time $t_4$ has passed, the fourth timer $T_4$ outputs a time-up signal to the CPU, and upon reception of this time-up signal, the CPU interrupts the executing routine, and executes the first fail-safe routine, as will be described later. After the fourth timeer $T_4$ is started in step S24C in this manner, the flow returns to the main routine.

When the first fail judgment subroutine is executed for the second time and thereafter, since the flag F (stop) is set in step S24B in the first subroutine, YES is determined in step S24A. If YES in step S24A, it is checked in step S24D if the driving motor 22 is kept operated. This judgment is performed by detecting an output from the encoder 36 attached to the driving motor 22.

If YES in step S24D, i.e., if it is determined that the driving motor 22 is kept operated, the flow returns to the main routine without resetting the fourth timer $T_4$. However, if NO in step S24D, i.e., if it is determined that the driving operation of the driving motor 22 is stopped, the fourth timer $T_4$ is reset in step S24E to stop the first fail judgment. More specifically, when the fourth timer $T_4$ is reset, it stops a time-count operation, and is reset to an initial state. After the fourth timer $T_4$ is reset in step S24E, the flow returns to the main routine.

Since the first fail judgment subroutine is constituted in this manner, if the driving motor 22 is kept operated to exceed the setting time $t_4$ described above, i.e., if step S24E is not executed, the time-up signal is output from the fourth timer $T_4$ to the CPU, and the CPU determines a failed state.

Figure 23:
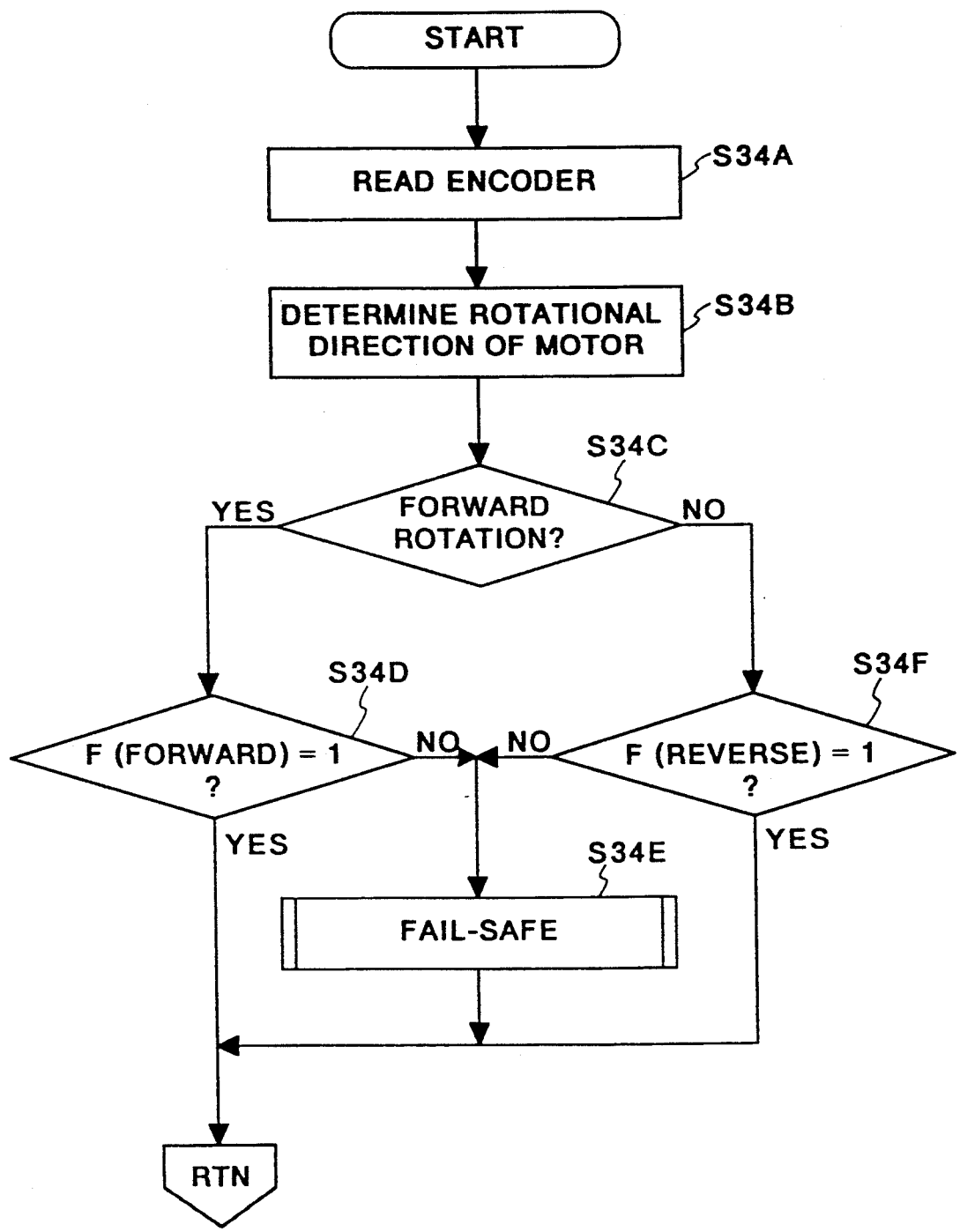
FIG. 23 is a flow chart showing a sequence of a subroutine in a second fail judgment operation of the CPU.

The second fail judgment subroutine in step S34 described in the above-mentioned main routine will be described below with reference to FIG. 23. In this second fail judgment, when the operation direction of the operation switch 18 determined in the operation direction determination routine in the second interrupt routine does not coincide with the actual driving direction of the driving motor 22, it is determined that an abnormal state occurs, and fail judgment is executed.

More specifically, when step S30 or S32 is executed in the above-mentioned main routine, in step S34A, an output state of the encoder 36 of the driving motor 22 is loaded, and the rotational direction of the driving motor 22 is judged on the basis of the loaded output from the encoder 36 in step S34B. If it is determined in step S34C that the rotational direction of the driving motor 22 is the forward direction, it is checked in step S34D if the flag F (forward) indicating that the operation direction of the operation switch 18 is the forward direction is set.

If YES in step S34D, i.e., if it is determined that both the rotational direction of the driving motor 22 and the operation direction of the operation switch 18 are forward directions, since there is no problem, the flow returns to the main routine. However, if NO in step S34D, i.e., if it is determined that the rotational direction of the driving motor 22 is the forward direction but the operation direction of the operation switch 18 is the reverse direction, and the two directions do not coincide with each other, it is determined that an abnormal state occurs. In step S34E, the second fail-safe operation is executed, and an alarm operation is executed to inform a driver that a failed state occurs and a fail-safe operation is under execution based on this failed state. The flow then returns to the main routine.

On the other hand, if it is determined in step S34C that the rotational direction of the driving motor 22 is the reverse direction, it is checked in step S34F if the flag F (reverse) indicating that the operation direction of the operation switch 18 is the reverse direction is set.

If YES in step S34F, i.e., if it is determined that both the rotational direction of the driving motor 22 and the operation direction of the operation switch 18 are reverse directions, since there is no problem, the flow returns to the main routine. However, if NO in step S34F, if it is determined that the rotational direction of the driving motor 22 is the reverse direction but the operation direction of the operation switch 18 is the forward direction, and the two directions do not coincide with each other, it is determined that an abnormal state occurs. The flow jumps to step S34E to execute the fail-safe operation, and the flow returns to the main routine.

The first and third through fifth fail-safe control operations will be described below with reference to FIGS. 24 through 27.

As has been described above in the first interrupt routine with reference to FIG. 20, when the operation switch 18 is operated to switch the presently set travel range, since both the first and second outputs $\Phi_1$ and $\Phi_2$ are at "H" level, they must transit to a state wherein one of these outputs is at "L" level. When the first timer $T_1$ is not reset after one of the outputs $\Phi_1$ and $\Phi_2$ goes to "L" level and the predetermined time $t_1$ has passed, i.e., when the operation switch 18 is held at an unstable position where one of the outputs $\Phi_1$ and $\Phi_2$ goes to "L" level for the predetermined time $t_1$ or longer, it is determined that an abnormal operation is performed, or an output state is abnormal, and this means that the third failed state occurs.

Figures 24, 25:
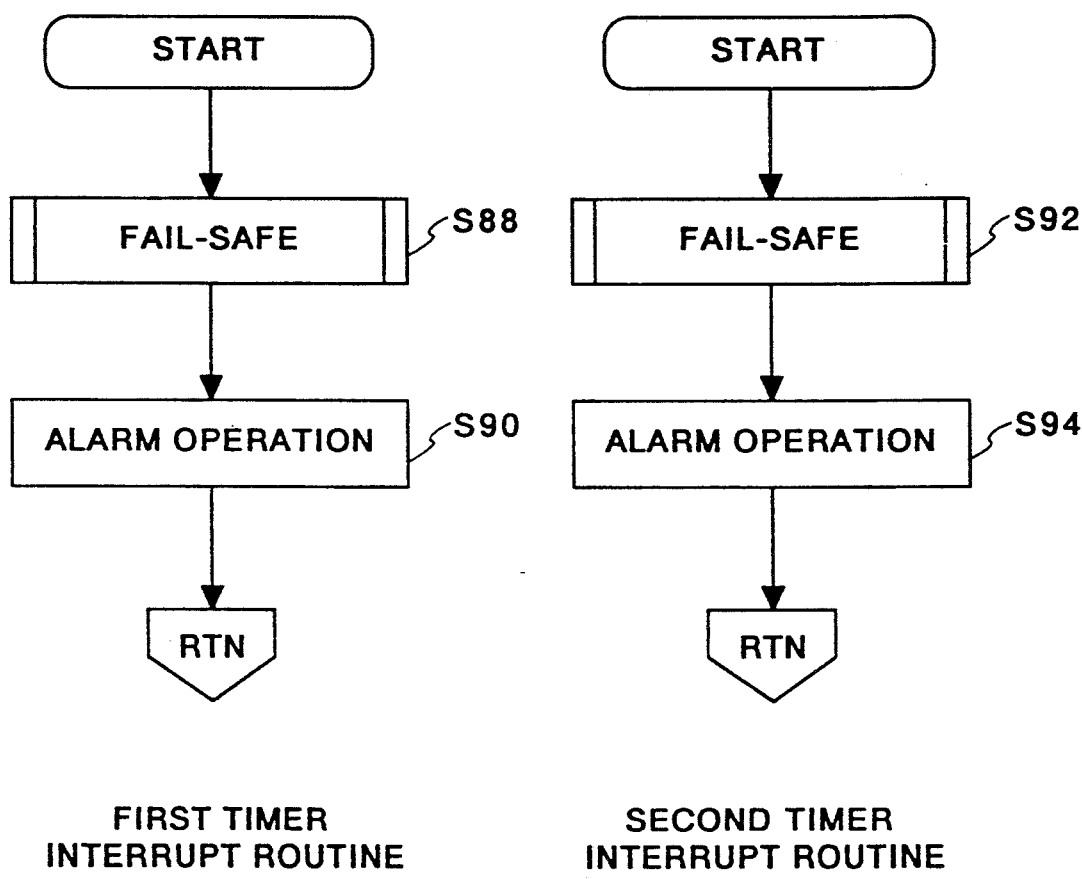

Therefore, when the predetermined time $t_1$ has passed, the first timer $T_1$ outputs a time-up signal to the CPU, and the CPU starts the first timer interrupt routine upon reception of this time-up signal. In this first timer interrupt routine, as shown in FIG. 24, in step S88, the fail-safe operation is executed, and in step S90, an alarm operation is executed, thereby informing the driver that the failed state occurs, and the fail-safe operation is being executed on the basis of this failed state. The flow then returns to the main routine.

Figure 21:
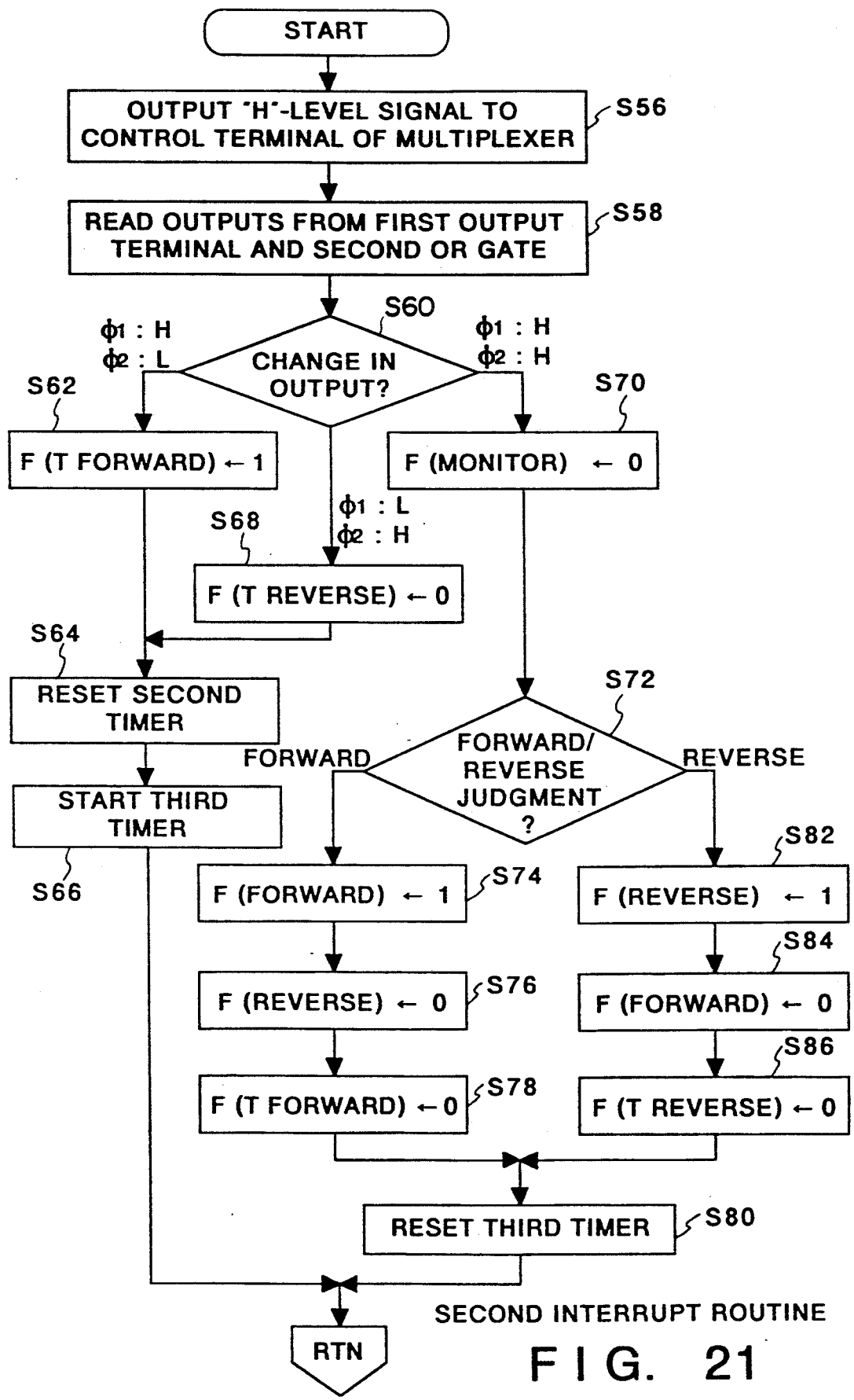
FIG. 21 is a flow chart showing a sequence of a second interrupt routine of the CPU.

On the other hand, as has been described above in the first and second interrupt routines with reference to FIGS. 20 and 21, a state wherein both the first and second outputs $\Phi_1$ and $\Phi_2$ are at "L" level must occur before the operation switch 18 is operated and is switched to the travel range to be set. However, when the second timer $T_2$ cannot be reset after both the outputs $\Phi_1$ and $\Phi_2$ go to "L" level and the predetermined time $t_2$ has passed, i.e., when the operation switch 18 is held at an unstable position where both the outputs $\Phi_1$ and $\Phi_2$ go to "L" level for the predetermined time $t_2$ or longer, it is determined that an abnormal operation is performed, or an output state is abnormal, and this means that the fourth failed state occurs.

Therefore, when the predetermined time $t_2$ has passed, the second timer $T_2$ outputs a time-up signal to the CPU, and the CPU starts the second timer interrupt routine upon reception of this time-up signal. In this second timer interrupt routine, as shown in FIG. 25, in step S92, the fail-safe operation is executed, and in step S94, an alarm operation is executed, thereby informing the driver that the failed state occurs, and the fail-safe operation is being executed on the basis of this failed state. The flow then returns to the main routine.

As has been described above in the second interrupt routine with reference to FIG. 21, when the operation switch 18 is operated to switch the presently set travel range, both the first and second outputs $\Phi_1$ and $\Phi_2$ are at "L" level must transit to a state wherein one of these outputs is at "H" level. When the third timer $T_3$ is not reset after one of the outputs $\Phi_1$ and $\Phi_2$ goes to "H" level and the predetermined time $t_3$ has passed, i.e., when the operation switch 18 is held at an unstable position where one of the outputs $\Phi_1$ and $\Phi_2$ goes to "H" level for the predetermined time $t_3$ or longer, it is determined that an abnormal operation is performed, or an output state is abnormal, and this means that the fifth failed state occurs.

Therefore, when the predetermined time $t_3$ has passed, the third timer $T_3$ outputs a time-up signal to the CPU, and the CPU starts the third timer interrupt routine upon reception of this time-up signal. In this third timer interrupt routine, as shown in FIG. 26, in step S96, the fail-safe operation is executed, and in step S98, an alarm operation is executed, thereby informing the driver that the failed state occurs, and the fail-safe operation is being executed on the basis of this failed state. The flow then returns to the main routine.

Note that a total value of the predetermined times $t_1$, $t_2$, and $t_3$ set in the first through third timers $T_1$, $T_2$, and $T_3$ is defined as an allowable maximum time when the operation switch 18 passes the monitor range. That is, when the operation switch 18 stays in the monitor range for a long period of time, this means that a target travel range to be set by the operation switch 18 is unknown for a long period of time. As a result, as described above, the travel range of the automatic transmission mechanism 12 is temporarily set at the immediately preceding travel range position of the operation switch 18. However, since the travel range temporarily set in the automatic transmission mechanism 12 is never one to be set by the driver, such a travel range setup state which is not intended by the driver should be avoided as much as possible although it is temporary. From this point of view, a total value of the predetermined times $t_1$, $t_2$, and $t_3$ is limited to a predetermined value.

As has been described above with reference to FIG. 22, after the stop condition of the driving motor 22 is logically established, when the fourth timer $T_4$ cannot be reset and the predetermined time $t_4$ has passed, i.e., when the driving motor 22 is kept operated to exceed the predetermined time $t_4$ although it has been stopped logically, this means that the first failed state occurs.

Therefore, when the predetermined time $t_4$ has passed, the fourth timer $T_4$ outputs a time-up signal to the CPU, and the CPU starts the fourth timer interrupt routine upon reception of this time-up signal. In this fourth timer interrupt routine, as shown in FIG. 27, in step S100, the fail-safe operation is executed, and in step S102, an alarm operation is executed, thereby informing the driver that the failed state occurs, and the fail-safe operation is being executed on the basis of this failed state. The flow then returns to the main routine.

Note that in this embodiment, the above-mentioned first through fifth fail-safe operations are attained by cutting a power supply to the driving motor 22. After the fail-safe operation is executed in this manner, when the driver wants to cancel the fail-safe state and the vehicle to travel he or she turns off an ignition switch, and then turns it on again. Thus, the CPU is reset to an initial state, and the fail-safe state can be automatically canceled.

When the driver drives the vehicle in this reset state, and operates the operation switch 18 to execute the travel range switching operation, if the fail-safe operation is executed again, the travel range switching operation via the operation switch 18 can no longer be performed. In this case, the lid member 54a arranged on the cowl panel lower 54 is removed to expose the manual driving mechanism 38, and the switching lever 50 is pivoted from the control position to the disengaging position to disengage the clutch mechanism 34, and the wrench 48 is fitted in the fitting hole 40a of the pivot disc 40, so that the pivot disc 40 is pivoted through the wrench 48, thereby setting an arbitrary travel range. Thus, the travel range in the automatic transmission mechanism 12 can be manually switched.

In the main routine of the CPU described above, in order to precisely set the presently switching travel range in the automatic transmission mechanism 12 to the target travel range position set by the operation switch 18, the following arrangement is adopted in this embodiment.

More specifically, in the setting operation of the target travel range by the operation switch 18, a stop time of the operation switch stopped at the travel range position is monitored, and when this stop time exceeds a predetermined period of time, the travel range corresponding to this stop position is determined as the target travel range. When the determined target travel range is separated from the travel range presently set in the automatic transmission mechanism 12 by two or more ranges, the driving motor 22 is subjected to so-called chopping control when a signal indicating a travel range immediately before the target travel range is output from the inhibitor switch 32, so that an energization time of the driving motor 22 is shortened in a pulse manner, thereby substantially decelerating the driving motor 22. Thus, the driving motor 22 is precisely stopped and held at the target travel range while it is mechanically constrained by the above-mentioned detent mechanism 76, a detent mechanism (not shown) in the manual driving mechanism 38, and a detent mechanism (not shown) equipped in the inhibitor switch 32 itself.

The driving motor 22 is controlled in this manner, so that the travel range in the automatic transmission mechanism 12 precisely coincides with that set by the operation switch 18. However, an overshoot or undershoot occurs in the driving motor 22 under various conditions, and the travel range in the automatic transmission mechanism 12 cannot often be precisely defined.

The overshoot or undershoot in the driving motor 22 is detected on the basis of the output from a potentiometer connected to the driving motor 22, and an overshoot or understood amount is also measured. When the overshoot or undershoot is detected, the driving motor 22 is energized as follows for an energization time set in proportion to the overshoot or undershoot amount. That is, when the driving motor 22 overshoots, it is energized to be rotated in a direction opposite to the rotational direction so far; when the motor 22 undershoots, it is energized to be rotated in the same direction as the rotational direction so far.

In this manner, in this embodiment, even when an overshoot or undershoot occurs, a positional offset caused thereby can be reliably corrected, and a precise positioning state can be attained.

When the correction operation takes too much time or an overshoot or undershoot occurs beyond a correctable range, the driving motor 22 is kept driven even after a stop condition is logically established. Therefore, the above-mentioned first fail judgment is made.

In this embodiment, the inhibitor switch 32 outputs an inhibitor signal while an inhibitor slide terminal passes an inhibitor contact having a predetermined width and they are in contact with each other. Assuming that a distance from an origin of the potentiometer when the inhibitor slide terminal begins to contact the inhibitor contact is represented by $L_1$, a distance from the origin of the potentiometer when the inhibitor slide terminal is about to be disengaged from the inhibitor contact is represented by $L_2$, and a distance from the origin of the potentiometer to a stop position for defining each travel range in the inhibitor switch 32 is represented by $L_0$, this distance $L_0$ is corrected and set every time the inhibitor slide terminal passes each inhibitor contact so as to satisfy:

$$L_0 = \frac{L_1 + L_2}{2}$$

As a result, even when a relative position between the driving motor 22 and the potentiometer is changed, a stop position for defining each travel range is always calculated and updated, thus attaining a precise positioning operation.

In the CPU of this embodiment, when the operation switch 18 begins to be operated, and is operated in the reverse direction in a state wherein the travel range set by the operation switch 18 is separated from the travel range in the automatic transmission mechanism 12, i.e., the travel range based on the inhibitor signal from the inhibitor switch 32 by one or more ranges, more specifically, when the second output $\Phi_2$ goes from "L" level to "H" level and then, the first output $\Phi_1$ goes from "L" level to "H" level in a state wherein it is determined that the operation switch 18 is operated in the forward direction since the second output $\Phi_2$ goes from "L" level to "H" level after the first output $\Phi_1$ goes from "L" level to "H" level, the reverse operation of the operation switch 18 is detected.

When the reverse operation of the operation switch 18 is detected, the CPU temporarily ignores this reverse detection, and maintains the present driving direction of the driving motor 22 without reversing it. When the travel range set by the operation switch 18 exceeds the travel range defined based on the inhibitor signal output from the inhibitor switch 32, i.e., when the operation position of the operation switch 18 crosses the operation position in the automatic transmission mechanism 12 and passes to the opposite side, the CPU drives the driving motor 22 in the reversed direction based on the above-mentioned reverse instruction.

With this arrangement, it can be reliably prevented that the travel range position in the automatic transmission mechanism 12 is set to exceed that set by the operation switch 18, and a good control state can be maintained.

The present invention is not limited to the arrangement of the above embodiment, and various changes and modifications may be made within the spirit and scope of the invention.

Figure 28:
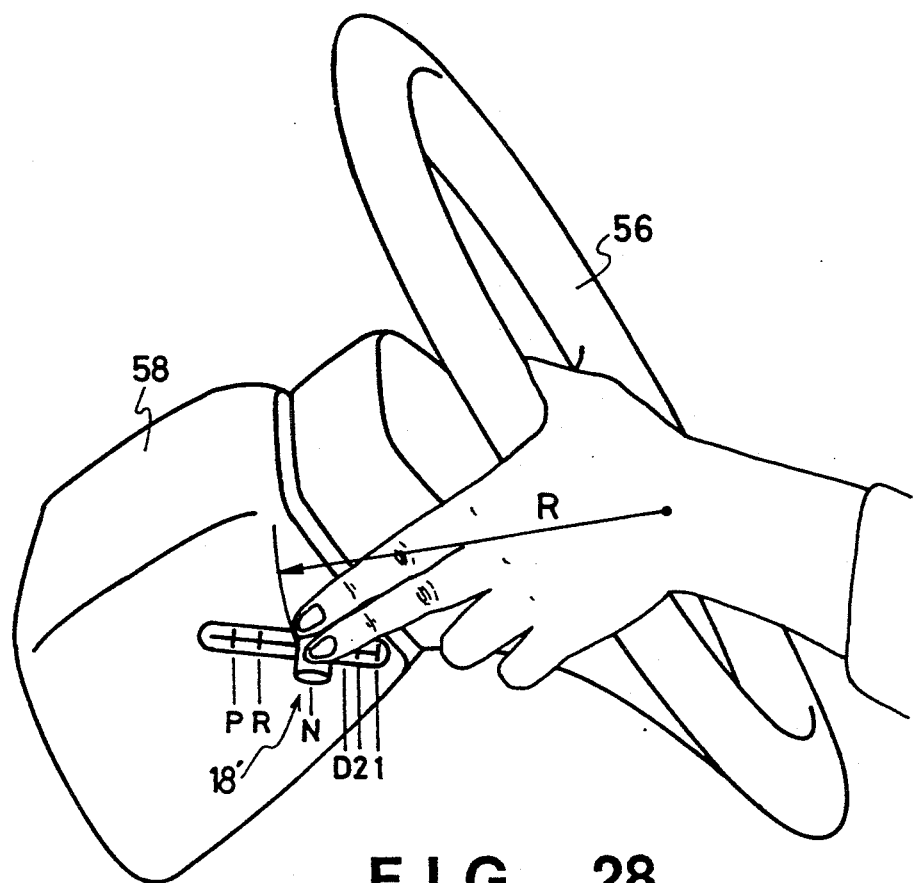
FIG. 28 is a perspective view showing a first modification of the operation switch of this embodiment.

For example, in the above embodiment, the operation switch 18 comprises a rotary switch. However, the present invention is not limited to this arrangement. For example, as shown in FIG. 28 as a first modification, an operation switch 18' comprises a slide switch. The slide operation switch 18' is slidably mounted along an oblique moving axis S. The moving axis of the slide operation switch 18' is obliquely set so that its upper end is inclined forward, as shown in FIG. 28, and a parking range "P" and a reverse range "R" are arranged at an upper front side. More specifically, travel ranges between the neutral range "N" and the forward 1st-speed range are arranged inside an operation range which can be accessed by a stretched middle finger so that these ranges can be switched by stretching the middle finger of the left hand while holding the steering wheel 56. On the other hand, the parking range "P" and the reverse range "R" are arranged outside the middle finger operation range.

In particular, in the first modification, the separation distance $d_2$ between the neutral range "N" and the reverse range "R" can be set to be considerably longer than the separation distance $d_1$ between the neutral range "N" and the forward drive range "D". In this manner, like in the embodiment described above, the operation switch 18' is arranged so that a driver cannot switch a travel range to the parking range "P" or the reverse range "R" while holding the steering wheel 56 with his or her left hand. Thus, a dangerously erroneous operation such as a reverse operation or a parking operation during forward travel can be reliably prevented.

Figure 29:
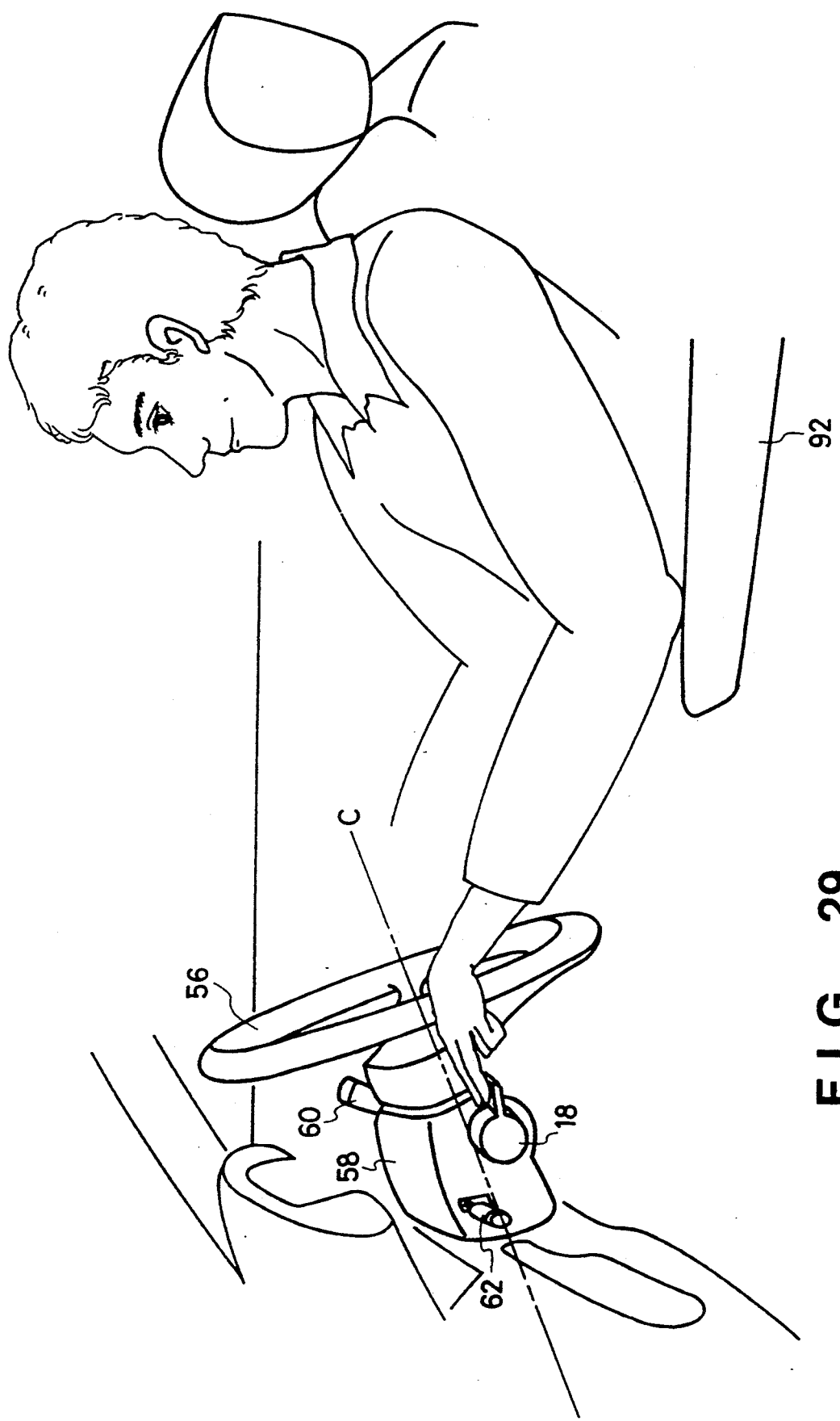
FIG. 29 is a side view showing a second modification in association with relative arrangement positions between the operation switch of this embodiment and a wiper operation lever.

In the above embodiment, the relative positional relationship between the operation switch 18 and the wiper operation lever 62 arranged on the left side surface of the steering column 58 is set such that the operation switch 18 is arranged on a driver-side lower portion of the left side surface, while the wiper operation lever 62 is arranged on a driver-side upper portion of the left side surface, as shown in FIG. 5. However, the present invention is not limited to this arrangement. For example, as shown in FIG. 29, as a second modification, the operation switch 18 is similarly arranged on the driver-side lower portion of the left side surface of the steering column 58, while the wiper operation lever 62 may be arranged on an opposite upper portion thereof. According to the arrangement of the second modification, the wiper operation lever 62 can be prevented from being erroneously operated when the travel range switching operation is performed using the operation switch 18.

Figure 30:
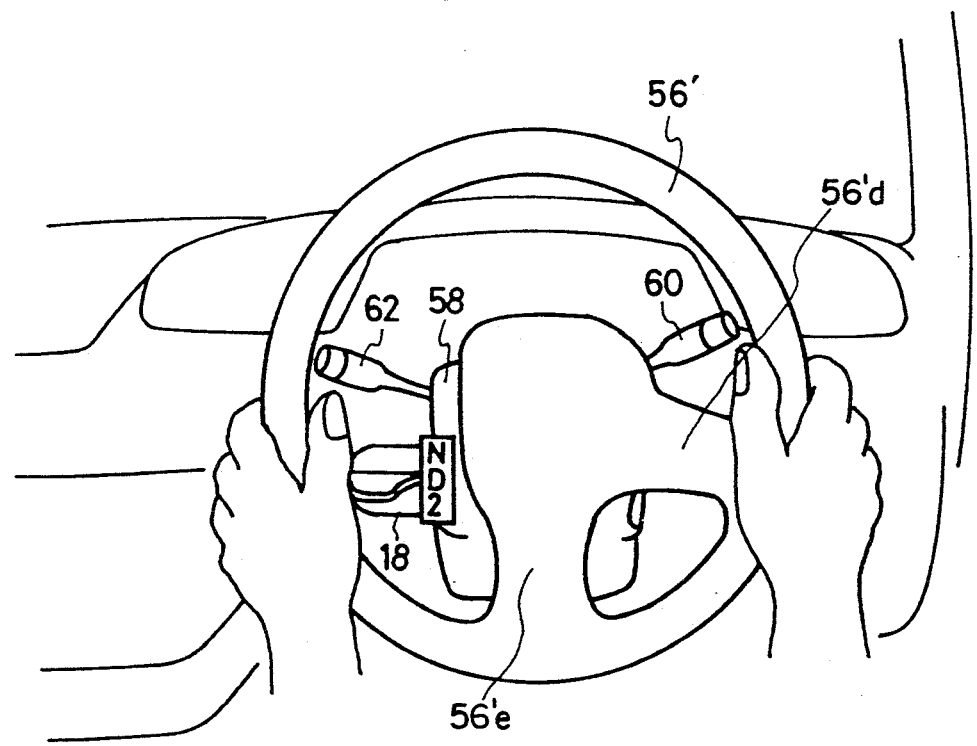
FIG. 30 is a front view showing a third modification of a steering wheel of this embodiment.

In the above embodiment, the steering wheel 56 comprises the spokes 56a, 56b, and 56c extending in 2, 6, and 10 o'clock directions, so that a driver sitting in the driver's seat can directly see alphanumeric characters "N", "D", and "2" corresponding to the travel ranges drawn on the peripheral surface of the mounting ring 64 when the steering wheel 56 is at substantially the neutral position. However, the present invention is not limited to this arrangement. For example, as shown in FIG. 30 as a third modification, a steering wheel 56' may comprise spokes 56'd and 56'e extending in 3 and 6 o'clock directions, respectively. Since the steering wheel 56' is arranged as described above, a driver can recognize the operation switch 18 through a space portion of this steering wheel 56'.

In the above embodiment, the signal generation mechanism 100 for indicating a travel range set by the operation switch 18 comprises the contacts $X_P$, $X_R$, $X_N$, $X_D$, $X_2$, and $X_1$ arranged in the insulating portion defined on the left side surface of the steering column 58, and the contact rod 66c which is fixed to the outward flange portion 66 of the switch main body 66, and is sequentially brought into contact with the contacts $X_p$, $X_R$, $X_N$, $X_D$, $X_2$, and $X_1$ in accordance with a pivot operation of the switch main body 66. However, the present invention is not limited to this arrangement. For example, the signal generation mechanism 100 may be arranged as shown in FIG. 31 as a fourth modification.

Figure 31:
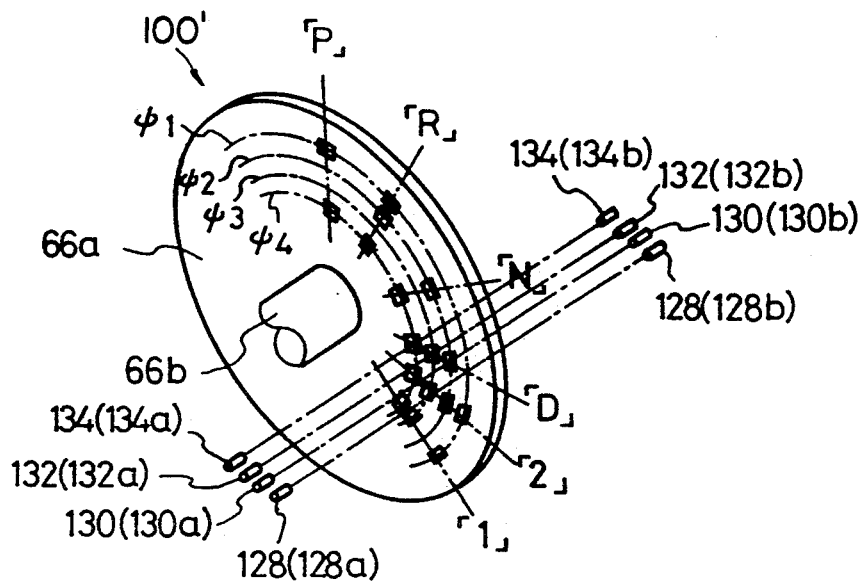
FIG. 31 is a perspective view showing a fourth modification of a signal generation mechanism of this embodiment.

In a signal generation mechanism 100' as the fourth modification, as shown in FIG. 31, the outward flange portion 66a is formed of a thin plate as a slit disc, and four concentrical paths $\psi_1$, $\psi_2$, $\psi_3$, and $\psi_4$ are defined at equal intervals on this slit disc 66a inwardly from a radially outward portion. On the other hand, slits are formed on radii corresponding to the travel ranges and at intersections with the four paths $\psi_1$, $\psi_2$, $\psi_3$, and $\psi_4$ as shown in the Table below.

TABLE

|          | P | R | N | D | 2 | 1 |
|----------|---|---|---|---|---|---|
| $\psi_1$ | 1 | 1 | 0 | 0 | 1 | 1 |
| $\psi_2$ | 0 | 1 | 1 | 1 | 1 | 0 |
| $\psi_3$ | 0 | 0 | 0 | 1 | 1 | 1 |
| $\psi_4$ | 1 | 1 | 1 | 1 | 1 | 1 |

In this table, no slit is formed at a portion indicated by "0", and a slit is formed at a portion expressed by "1". Each travel range is uniquely defined by a code expressed by "0" and "1" in the corresponding first through third paths $\psi_1$, $\psi_2$, and $\psi_3$. As can be seen from this table, this code is expressed by a gray code.

Figure 32:
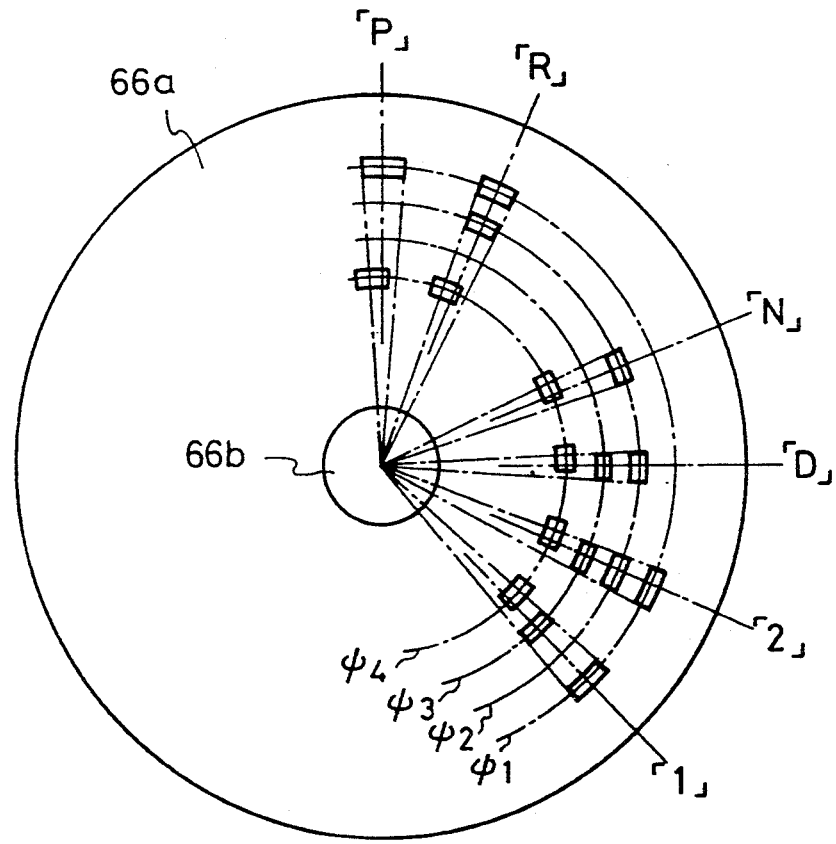
FIG. 32 is a front view showing a slit disc shown in FIG. 31.

In the fourth modification, the slit arrays formed in the first through third paths $\psi_1$, $\psi_2$, and $\psi_3$ are defined to correspond to the second contact terminals $\phi_{2P}$, $\phi_{2R}$, $\phi_{2N}$, $\phi_{2D}$, $\phi_{22}$, and $\phi_{21}$ in the embodiment described above, and slits in the fourth path $\psi_4$ are defined to correspond to the first contact terminals $\phi_1$ in the above embodiment. More specifically, the slits constituting the slit arrays formed in the first to third paths $\psi_1$, $\psi_2$, and $\psi_3$ are formed in a sectorial shape having the same central angle, as shown in FIG. 32, and leading and trailing ends of each slit are located on the same radius in units of travel ranges. On the other hand, the slits formed in the fourth path $\psi_4$ are formed to have the same central angle as that of the slits constituting the slit arrays formed in the first through third paths $\psi_1$, $\psi_2$, and $\psi_3$, but are offset in one direction (in this modification, a counterclockwise direction) by a predetermined distance along the circumferential direction with respect to the slit arrays formed in the first through third paths $\psi_1$, $\psi_2$, and $\psi_3$.

As shown in FIG. 31, four photocouplers 128, 130, 132, and 134 are arranged on the left side surface of the steering column 58 opposing the slit disc 66a on the same radius in correspondence with the first through fourth paths $\psi_1$, $\psi_2$, $\psi_3$, and $\psi_4$, respectively. The photocouplers 128, 130, 132, and 134 respectively comprise light-emitting elements 128a, 130a, 132a, and 134a for emitting light toward the corresponding paths $\psi_1$, $\psi_2$, $\psi_3$, and $\psi_4$ of the slit disc 66a, and light-receiving elements 128b, 130b, 132b, and 134b for receiving only light emitted from the corresponding light-emitting elements 128a, 130a, 132a, and 134a and passing through the slits formed on the corresponding paths $\psi_1$, $\psi_2$, $\psi_3$, and $\psi_4$.

Since the signal generation mechanism 100' comprises an optical arrangement, as shown in the fourth modification, the same operation as in the mechanical contact type signal generation mechanism 100 can be attained. In addition, as compared to the mechanical contact type, noise at the beginning or end of contact can be eliminated, and a highly reliable operation can be realized.

In the above-mentioned mechanical contact type signal generation mechanism 100, the second contact terminals $\phi_{2P}$, $\phi_{2R}$, $\phi_{2N}$, $\phi_{2D}$, $\phi_{22}$, and $\phi_{21}$ may be constituted by gray codes.

In the above embodiment, power supply to the driving motor 22 is cut off by the fail-safe operation. However, the present invention is not limited to this. For example, an auxiliary driving motor for fail-safe may be arranged as a driving motor for switching the hydraulic valve 16 of the automatic transmission mechanism 12 in addition to the driving motor 22. In a normal state, the travel range switching operation in the automatic transmission mechanism 12 is performed by the driving motor. When fail judgment is made, power supply to this driving motor 22 is cut off, and an electric power is supplied to the auxiliary driving motor, so that the automatic transmission mechanism 12 is driven by this auxiliary driving motor as a fail-safe operation.

When the two driving motors are arranged, if fail judgment is made, the auxiliary driving motor may comprise hardware to forcibly switch the present travel range to a predetermined travel range, e.g., the forward drive range "D" regardless of the setup position of the operation switch 18. Alternatively, another CPU is arranged for fail-safe (i.e., 2-CPU/2-driving motor type), and when the main CPU makes fail judgment, the fail-safe CPU drives the auxiliary driving motor to execute the fail-safe operation.

In the above embodiment, fail judgment is made when the timer $T_1$, $T_2$, $T_3$, or $T_4$ cannot be reset after the lapse of the corresponding allowable time $t_1$, $t_2$, $t_3$, or $t_4$, and when the operation direction of the operation switch 18 does not coincide with the rotational direction of the driving motor 22. However, the present invention is not limited to this fail judgment. For example, when a signal indicating the reverse range "R" is output from the inhibitor switch 32 of the automatic transmission mechanism 12 in a state wherein the forward travel range (i.e., the forward drive range "D", the forward 2nd-speed range, or the forward 1st-speed range) is set by the operation switch 18, it is not preferable in view of safety driving.

More specifically, as described above, in the control of the above embodiment, when the operation switch 18 is located within the monitor range between the reverse range "R" and the neutral range "N", the travel range in the automatic transmission mechanism 12 is temporarily held and set at the reverse range position "R" as the immediately preceding travel range position of the operation switch 18. Thereafter, when the operation switch 18 is immediately operated and the forward drive range "D" is directly set beyond the neutral range "N", the driving motor 22 is locked, and the travel range in the automatic transmission mechanism 12 may be fixed in the reverse range "R".

In this state, if no fail judgment is made, since the driver sets the forward drive range, he or she believes that the forward drive range is set, and depresses the accelerator pedal. As a result, the vehicle starts a reverse operation opposite to the driver's will, i.e., forward travel.

For this reason, as described above, when a signal indicating the reverse range "R" is output from the inhibitor switch 32 of the automatic transmission mechanism 12 in a state wherein the forward travel range (i.e., the forward drive range "D", the forward 2nd-speed range, or the forward 1st-speed range) is set by the operation switch 18, fail judgment is made, and the fail-safe operation based on this fail judgment is set to execute an operation for killing an engine. When such a fail-safe operation is executed, the driver manually switches the automatic transmission mechanism 12 using the manual driving mechanism 38, as described above, and restarts the engine to again cause the vehicle to travel.

As the fail-safe operation, not only an operation for killing the engine but also a control operation for decreasing all oil pressures from a hydraulic system in the automatic transmission mechanism 12 may be executed. In this case, when the oil pressures are decreased, the hydraulic valve 16 automatically (mechanically) sets and holds the forward drive range "D". Therefore, after the fail-safe operation is executed, the driver can drive the vehicle to move it to a nearby repair shop or service station.

In the above embodiment, in order to precisely set the travel range in the automatic transmission mechanism 12 to the target travel range position set by the operation switch 18, the driving motor 22 is subjected to chopping control after the operation switch passes by a travel range immediately before the target travel range. However, the present invention is not limited to this arrangement. For example, chopping control of the driving motor 22 may be started when the target travel range is determined. In place of chopping control, the clutch mechanism 34 may be disengaged so that no driving force is applied at all. Furthermore, when the travel range in the automatic transmission mechanism 12 catches up to a position two ranges before the travel range position set by the operation switch 18, the chopping control of the driving motor may be executed.

An arrangement of an operation apparatus for a vehicle automatic transmission mechanism according to another embodiment of the present invention will be described in detail below with reference to the accompanying drawings. The same reference numerals in the following description denote the same parts as in the above-mentioned embodiment, and a detailed description thereof will be omitted.

Figure 33:
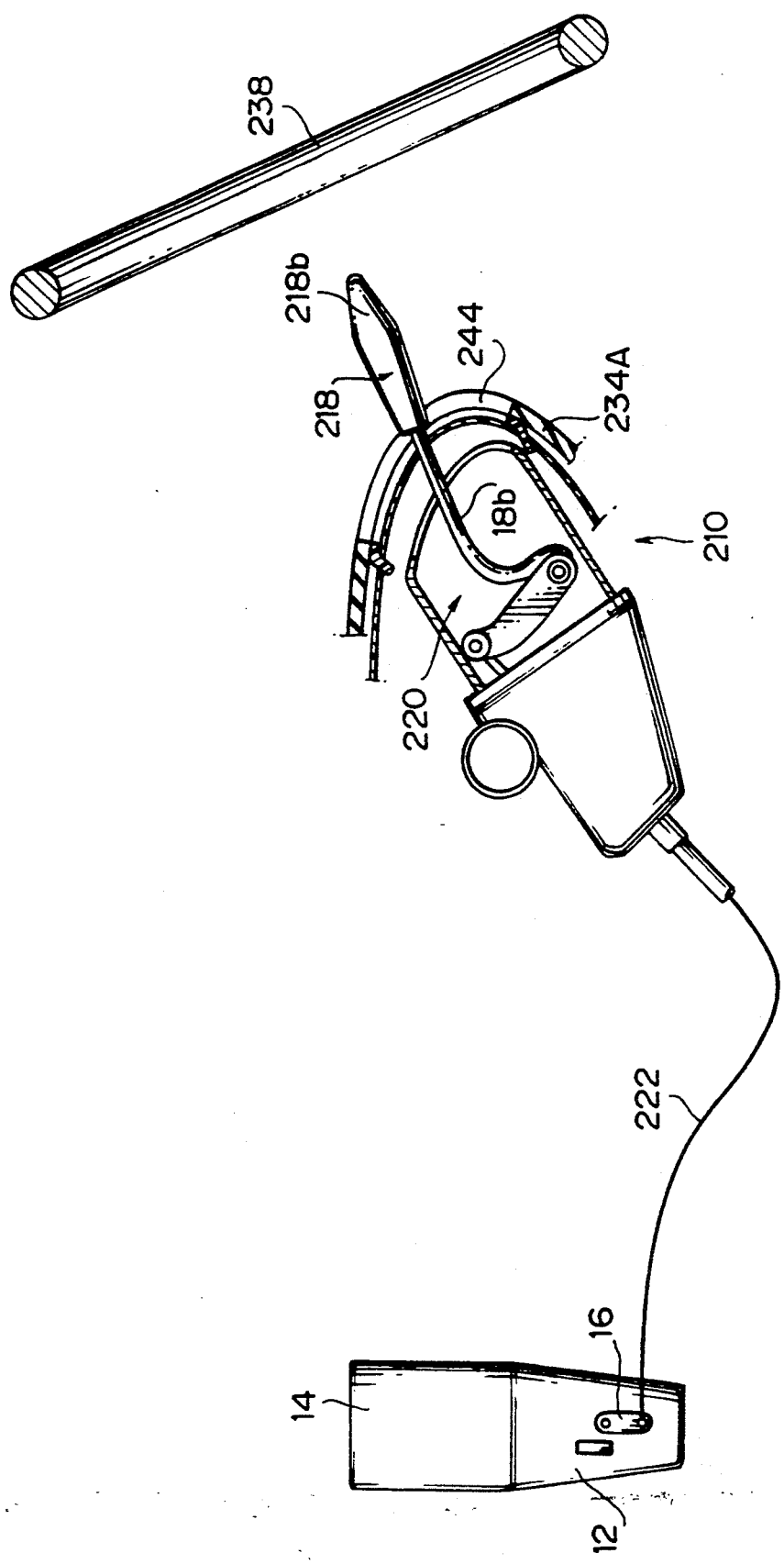
FIG. 33 is a schematic view showing an operation apparatus for a vehicle automatic transmission mechanism according to another embodiment of the present invention.

An operation apparatus 210 of this embodiment can manually perform a travel range switching operation of an automatic transmission mechanism 12, as shown in FIG. 33.

In the operation apparatus 210 of this embodiment, the above-mentioned hydraulic valve 16 is manually driven by a driver in accordance with a manual operation of an operation lever (a detailed structure and mounting state thereof will be described later) 218 as a characteristic feature of the present invention, thereby switching a travel range position. More specifically, the operation apparatus 210 comprises the above-mentioned operation lever 218, a lever mounting mechanism 220 to which the operation lever 218 is swingably mounted, and a transmission wire 222 for transmitting an operation of the operation lever 218 by a driver of a vehicle to the hydraulic valve 16 of the automatic transmission mechanism 12.

Figure 34:
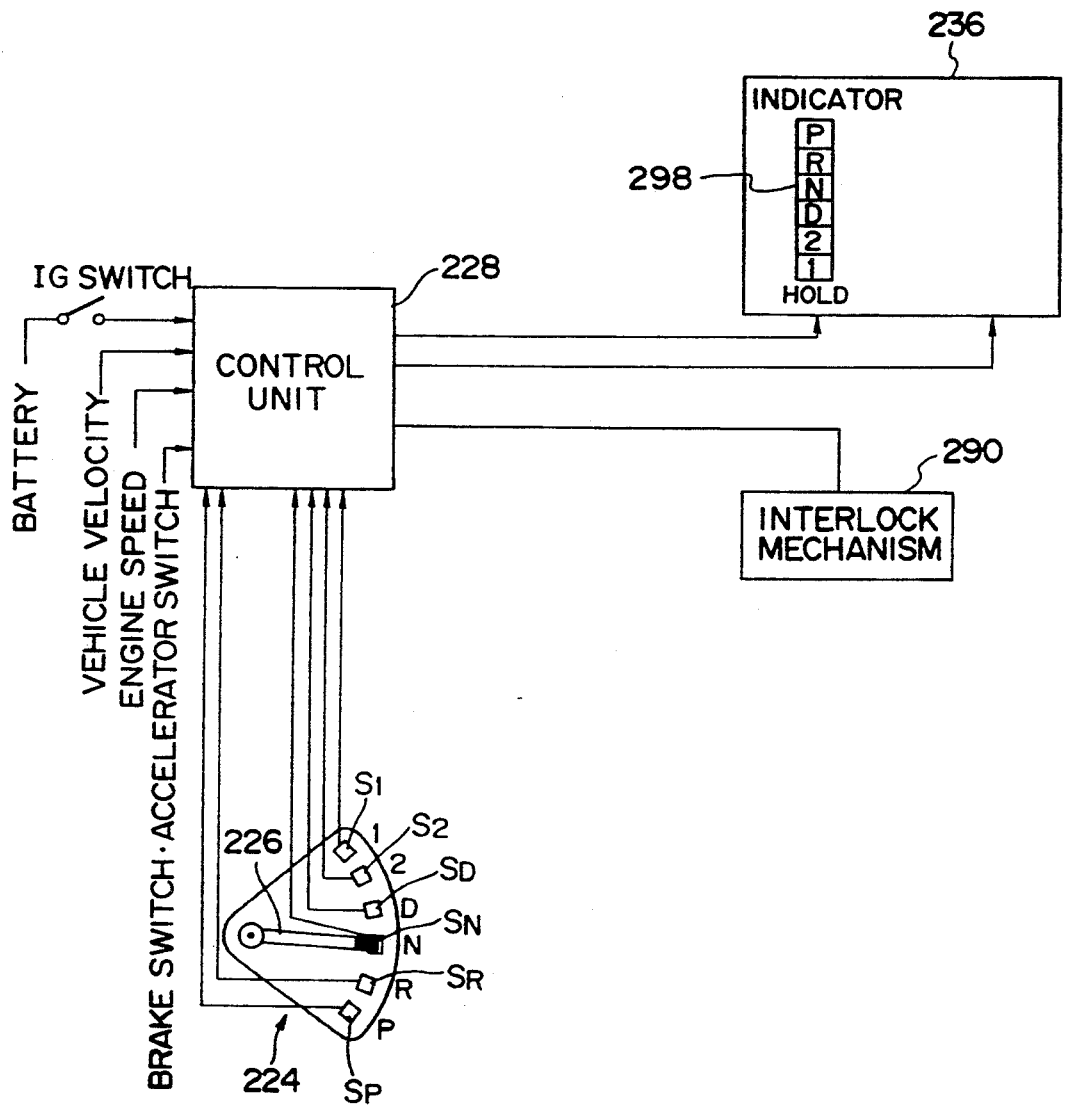
FIG. 34 is a block diagram showing connection states among an inhibitor switch, a control unit, and an interlock mechanism.

The automatic transmission mechanism 12 comprises an inhibitor switch 224 for indicating a switched travel range state in accordance with a travel range switching state by the hydraulic valve 16, as shown in FIG. 34. The inhibitor switch 224 comprises contacts $S_P$, $S_R$, $S_N$, $S_D$, $S_2$, and $S_1$ respectively corresponding to a parking range "P", a reverse range "R", a neutral range "N", a forward drive range "D", a forward 2nd-speed range "2", and a forward 1st-speed range "1", and a swing lever 226 which is pivoted to be in selective contact with these contacts $S_P$, $S_R$, $S_N$, $S_D$, $S_2$, and $S_1$.

The contacts $S_P$, $S_R$, $S_N$, $S_D$, $S_2$, and $S_1$ are connected to a control unit 228. In this manner, the inhibitor switch 224 outputs, to the control unit 228, an inhibitor signal from only one of the contacts $S_P$, $S_R$, $S_N$, $S_D$, $S_2$, and $S_1$, which contacts the swing lever 226.

The control unit 228 displays a presently set travel range on an indicator 298 of a meter panel 236 (to be described later) upon reception of the inhibitor signal. The control unit 228 outputs a control signal for permitting a start operation of an engine 14 by an ignition switch (not shown) only when an inhibitor signal is output from the contact $S_P$ corresponding to the parking range "P", and outputs a control signal for causing an interlock mechanism 290 (to be described later) to execute a pull-down operation of a lock pin 294 to permit a shift operation of the operation lever 218 from the parking range "P" to another travel range only when a brake pedal is depressed and a brake switch (not shown) is turned on after the engine 14 is started.

The operation lever 218 of the operation apparatus 210 with the above structure will be described in detail below with reference to FIG. 35 and subsequent drawings.

Prior to a description of the detailed structure of the operation lever 218, an internal structure of a passenger room in which the operation lever 218 is arranged will be explained below.

Figure 35:
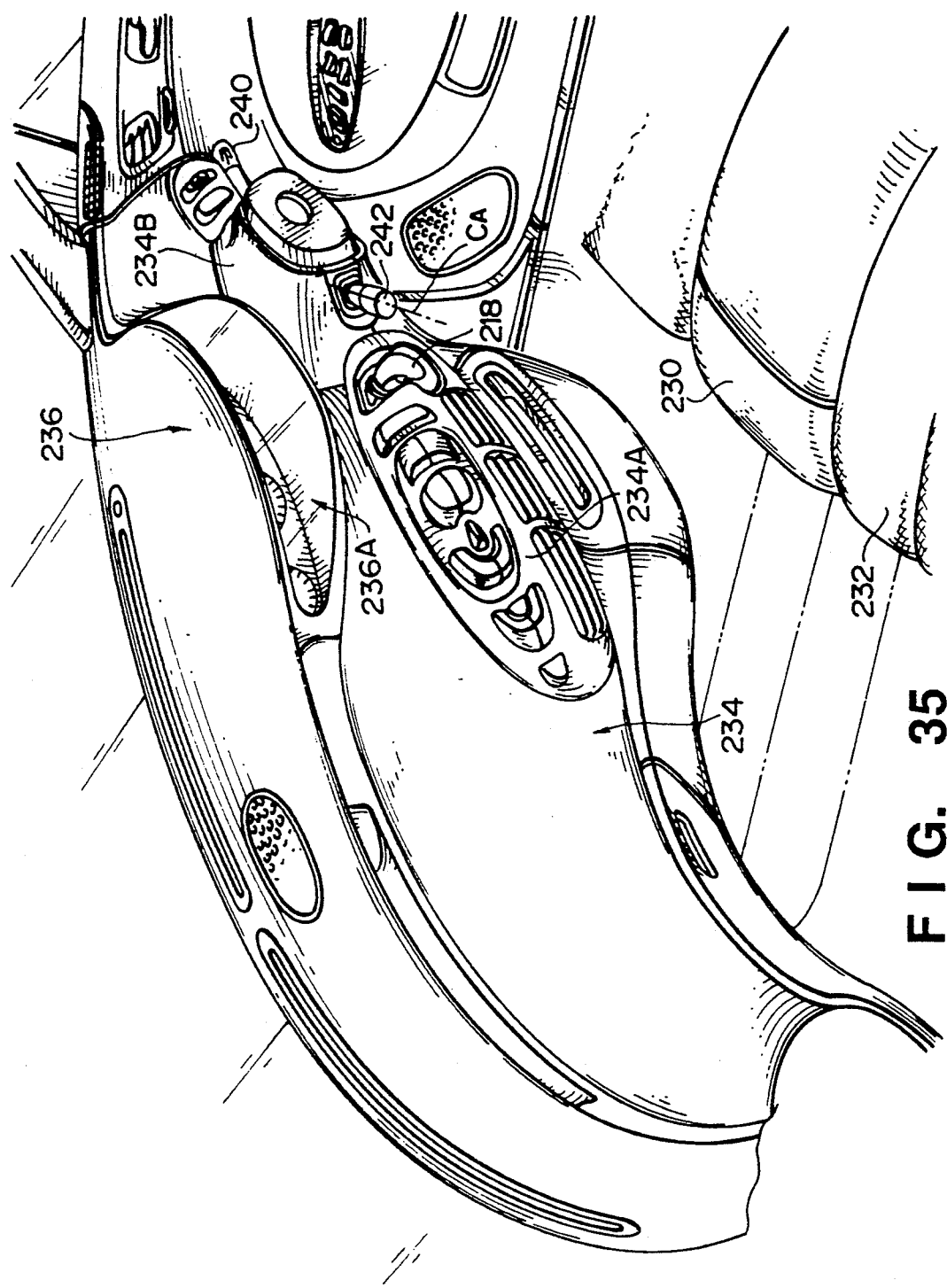
FIG. 35 is a perspective view showing an arrangement of an operation lever of this embodiment in a state wherein a steering wheel is detached.

As shown in FIG. 35, a synthetic resin instrument panel 234 is arranged to extend over a widthwise direction of a vehicle body (to be simply referred to as a widthwise direction hereinafter) in front of a driver's seat 230 and a front passenger's seat 232. A meter panel 236 is arranged above the instrument panel 234 to be contiguously integrated with the panel 234. A main panel portion 236A where a speedometer, a tachometer (neither are shown), and the like are arranged is integrally formed on a portion of the meter panel 236 opposing the driver's seat 230 to be moderately bulged toward the driver's seat 230, i.e., backward.

On the other hand, the instrument panel 234 integrally comprises a central bulge portion 234A moderately bulged backward on a portion located at substantially the center between the driver's seat and the front passenger's seat 232, and a steering column 234B immediately projecting backward from a portion opposing the driver's seat 230. More specifically, the central bulge portion 234A and the steering column 234B are juxtaposed. A steering wheel 238 (shown in FIGS. 33, 36, and 37; although not shown in FIG. 35) is pivotally mounted on the projecting end of the steering column 234B, i.e., the end projecting into the passenger room.

The above-mentioned operation lever 218 is arranged on a portion, near the driver's seat 230 (i.e., a right side portion), of the central bulge portion 234A. The arranging range of the operation lever 218 is set such that a driver can operate the operation lever 218 by stretching at least the middle finger of his or her left hand while holding the steering wheel 238 with both hands, as will be described in detail later.

Since the operation lever 218 for switching a travel range position in the automatic transmission mechanism 12 is arranged on the central bulge portion 234A of the instrument panel 234, the transmission wire 222 for mechanically connecting the operation lever 218 and the hydraulic valve 16 of the automatic transmission mechanism 12 can extend to simply pierce through a dash panel (not shown) for partitioning the passenger room and the engine room. On the other hand, the steering column 234B may be considered as a portion where the operation lever 218 is arranged within an operation enable range which can be accessed by a stretched finger of a hand holding the steering wheel 238. However, when the operation lever 218 is arranged on the steering column 234B, the transmission wire 222 for mechanically connecting the operation lever 218 and the hydraulic valve 16 must temporarily extend inside the steering column 234B along a steering shaft, and then must extend to pierce the dash panel after it is guided inside the instrument panel 234A. For this reason, as compared to a case wherein the operation lever 218 is arranged on the instrument panel 234A, a slide resistance of the transmission wire 222 is increased, and hence, an operation resistance of the operation lever 218 is undesirably increased.

In a passenger vehicle, in order to guarantee safety upon a head-on collision, the axial length of the steering shaft is able to be shortened in the steering column 234B. When the operation lever 218 is arranged on the steering column 234B, a shock absorption mechanism may not satisfactorily function since it may be disturbed by the operation lever 218. In order to satisfactorily operate the shock absorption mechanism even if the operation lever 218 is arranged, a conventional shock absorption mechanism must be considerably improved, resulting in an increase in cost.

In this manner, in this embodiment in which the operation lever 218 and the automatic transmission mechanism 12 are mechanically coupled, it is most preferable to arranged the operation lever 218 on the instrument panel 234A.

As can be seen from the above description, a driver may hit against the central bulge portion 234A upon a head-on collision since the portion 234A projects toward the passenger room. For this reason, the rigidity of the central bulge portion 234A is set to be small to avoid danger. When the driver hits against this portion, the central bulge portion 234A can be easily deformed, and effectively absorbs the hitting force, thereby minimizing damage to the driver.

In this embodiment, since the steering column 234B is integrally formed on the instrument panel 234, the steering wheel 238 attached to this steering column 234B cannot be tilted, and the relative positional relationship between the steering wheel 238 and the operation lever 218 is kept constant. Therefore, the relationship according to the present invention, i.e., that a driver can operate the operation lever 218 by stretching at least the middle finger of his or her left hand while holding the steering wheel 238 with both hands, can always be maintained.

As described above, since the steering wheel 238 is not tilted, and its arranging state, i.e., its arranging position is fixed, it is impossible to adjust and change the arranging position of the steering position in correspondence with a sitting position of the driver in accordance with physical features of the driver sitting at the driver's seat 239. For this reason, in this embodiment, the driver's seat 230 is of a motorized type to adjust and change the position of the driver sitting at the driver's seat 230, thereby realizing an optimal driving position with respect to the steering wheel 238. Note that the structure of the motorized driver's seat 230 will be described in detail later.

In this embodiment, a direction indication lever 240 is arranged on the right side surface of the steering column 234B, and a wiper switch 242 is arranged on its left side surface. The operation lever 218 comprises a so-called stroke contact type switch. More specifically, the operation lever 218 comprises a swing switch one end of which is swingably mounted on substantially the same plane as the arranging surface of the steering wheel 238, i.e., the mounting surface of the steering wheel 238 on the steering column 234B, on the central bulge portion 234A of the instrument panel 234.

A swing axis $S_A$ of this operation lever 218 is set to extend substantially along the widthwise direction, as will be described in detail later. The wiper switch 242 is pivotal about its own central axis $C_A$, and the central axis $C_A$ extends substantially along the widthwise direction. In this manner, in this embodiment, an operation mode of the wiper switch 242 is distinctly distinguished from that of the operation lever 218. Therefore, when the wiper switch 242 is operated, the operation lever 218 can be prevented from being erroneously operated, and vice versa.

Figure 36:
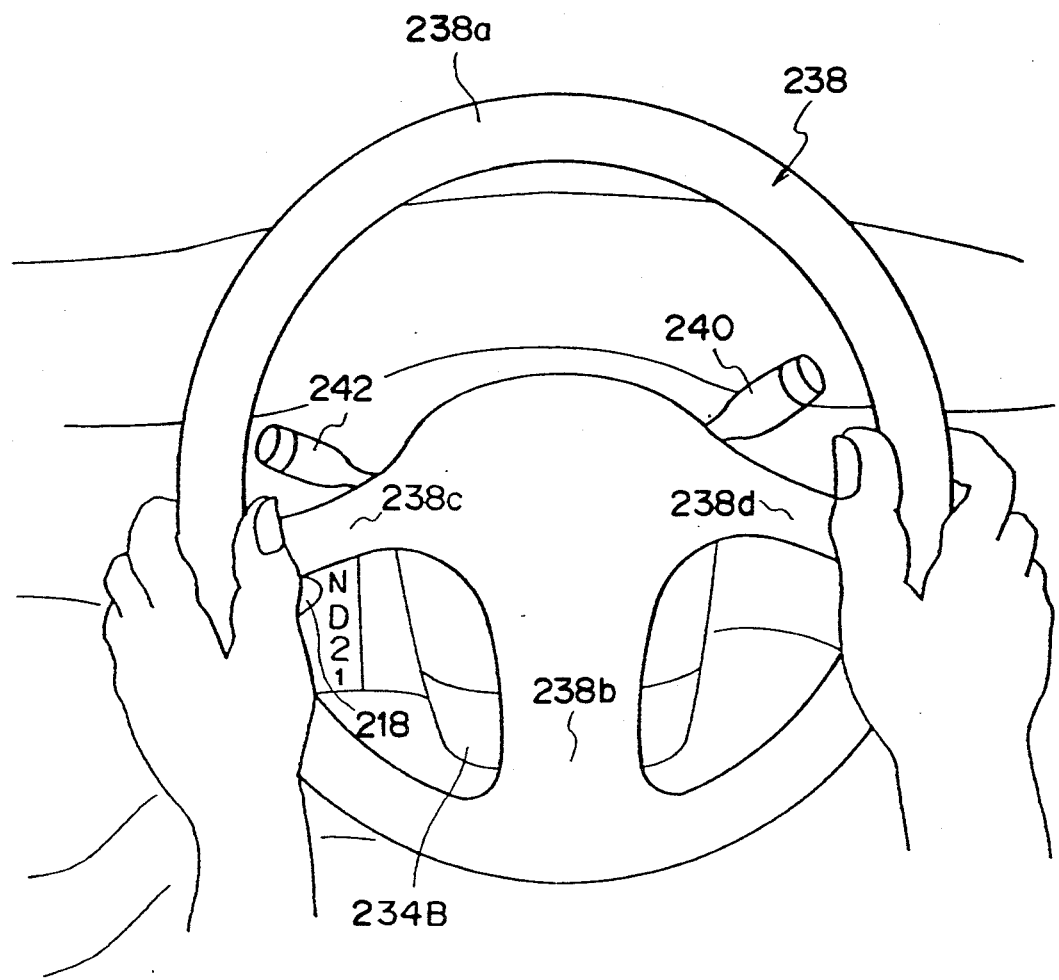
FIG. 36 is a front view showing an arrangement of the operation lever when viewed from a driver sitting at a driver's seat.

The arranging position of the operation lever 218 on the central bulge portion 234A of the instrument panel 234 is set as follows. That is, when a driver sitting at the driver's seat sees a front side while holding two side portions located at so-called 8 o'clock 20 minute positions of the steering wheel 238 at a substantially neutral position (i.e., a position where a rotational angle $=0°$) with both hands, he or she can visually recognize the operation lever 218 through a space portion of the steering wheel 238, as shown in FIG. 36. The steering wheel 238 is of a 3-spoke type to guarantee this visual recognition. More specifically, the steering wheel 238 comprises a ring-shaped wheel main body 238a, and three spokes 238d; 238b, and 238c radially extending along 3, 6, and 9 o'clock directions, respectively.

Figure 37:
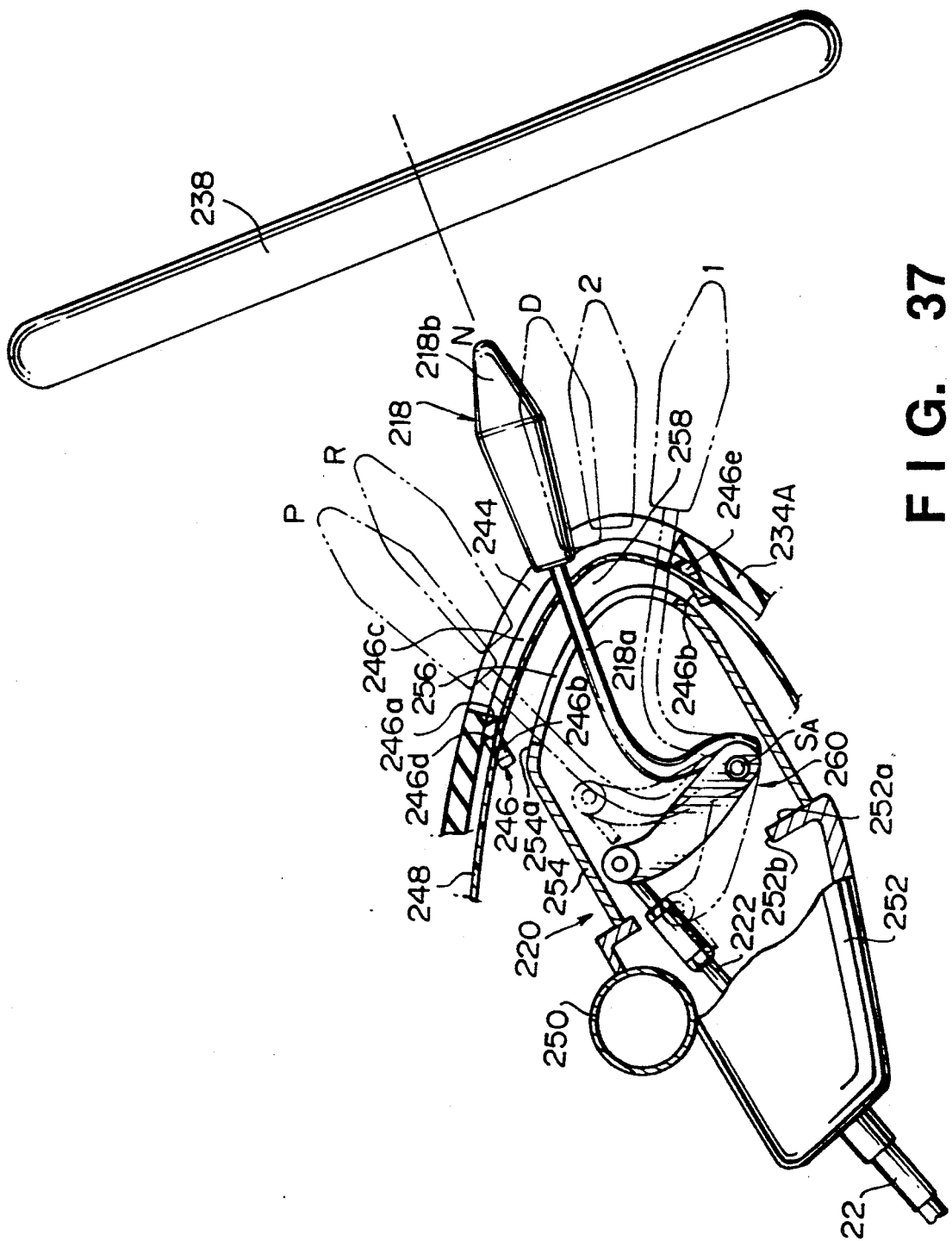
FIG. 37 is a longitudinal sectional view showing a structure of an operation lever mounting mechanism.

The operation lever 218 is mounted on the lever mounting mechanism 220 disposed in an internal space of the central bulge portion 234A of the instrument panel 234 to be pivotal about a rotational axis extending along the widthwise direction, and to be reciprocal along the widthwise direction, as shown in FIG. 37. The operation lever 218 comprises a lever main body 218a inserted in a slit 244 formed in the central bulge portion 234A along a vertical direction, and a finger operation portion 218b which is integrally attached to the distal end portion of the lever main body 218a projecting into the passenger room (i.e., the rear end portion in the back-and-forth direction of the vehicle body), and is formed to be gradually separated from the extending direction of the lever main body 218a, i.e., the steering wheel 238.

The slit 244 is formed in a straight pattern, and its width is determined to be large enough to receive the proximal end portion of the finger operation portion 218b and to allow its temporary widthwise movement so that the finger operation portion 218b is disengaged from, e.g., the parking range "P". The length of the slit 244 is determined to be large enough to permit swing movement of the finger operation portion 218b from the uppermost parking range "P" position to the lowermost forward 1st-speed range "1" position.

More specifically, this slit 244 is formed to have a relatively large size. In this state, the interior of the central bulge portion 234A is undesirably seen through the slit 244, and it is not preferable from the view point of design. In order to conceal such a portion, a display panel 246 for informing a travel range set by the operation lever 218 to a driver is attached to the inner surface of the instrument panel 234, which defines the central bulge portion 234A so as to cover the slit 244 from the inner surface side.

The display panel 246 is formed of a synthetic resin having a low rigidity by a panel main body 246a which is in tight contact with the inner surface of the central bulge portion 234A, and an edge portion 246b surrounding the panel main body 246a. A gate groove 246c having the same pattern as a guide groove for defining a travel range switching operation by the operation lever 218 is formed in the panel main body 246a. The pattern of this gate groove 246c will be described in detail later.

Alphanumeric characters "P" representing the parking range, "R" representing the reverse range, "N" representing the neutral range, "D" representing the forward drive range, "2" representing the forward 2nd-speed range, and "1" representing the forward 1st-speed range are sequentially marked downward aside the gate groove 246c at positions corresponding to the travel range positions.

The interior of the central bulge portion 234A can be seen through the gate groove 246c formed in the display panel 246. In order to prevent the interior of the central bulge portion from being seen through the gate groove 246c, a blindfold sheet 248 is arranged on the inner surface of the panel main body 246a. The blindfold sheet 248 is fixed at its central portion to the lever main body 218a of the operation lever 218 inserted in the gate groove 246c. The upper and lower ends of the blindfold sheet 248 reciprocally project upward and downward via through holes 246d and 246e formed in the upper and lower portions of the edge portion 246b of the display panel 246, respectively.

With this structure, the blindfold sheet 248 is moved along the inner surface of the panel main body 246a of the display panel 246 according to a swing movement of the operation lever 218. As a result, the blindfold sheet 248 always closes the gate groove 246c and can prevent the interior of the central bulge portion 234A from being seen through without disturbing the swing movement of the operation lever 218.

The structure of the lever mounting mechanism 220 described above will be described in detail below.

The lever mounting mechanism 220 swingably supports the operation lever 218, as described above, and transmits a manual swing driving force of this operation lever 218 by the driver to the hydraulic valve 16 of the automatic transmission mechanism 12 via the transmission wire 222.

An instrument panel mounting pipe 250 is arranged in front of the instrument panel 234 to extend over the widthwise direction. The two ends of the mounting pipe 250 are respectively fixed to a center pillar (not shown). A hollow mounting member 252 is fixed to a portion of the mounting pipe 250, which corresponds to the driver's seat 230. A surface 252a of the mounting member 252, which faces the passenger room, is set to be parallel to the extending plane of the steering wheel 238. The above-mentioned lever mounting mechanism 220 is mounted on this mounting surface 252a.

More specifically, the lever mounting mechanism 220 comprises a hollow housing 254 mounted on the mounting surface 252a of the above-mentioned mounting member 252. The entire surface of the housing 254 which surface is attached to the mounting surface 252a of the mounting member 252 is open. A communication opening 252b communicating with the housing 254 attached to the mounting surface 252a is formed in the mounting surface 252a of the mounting member 252. In this manner, the internal spaces of the housing 254 and the mounting member 252 communicate with each other after the housing 254 is attached to the mounting member 252. The above-mentioned transmission wire 222 extends from the mounting member 252 to the housing 254 via this communicating portion.

Figure 38:
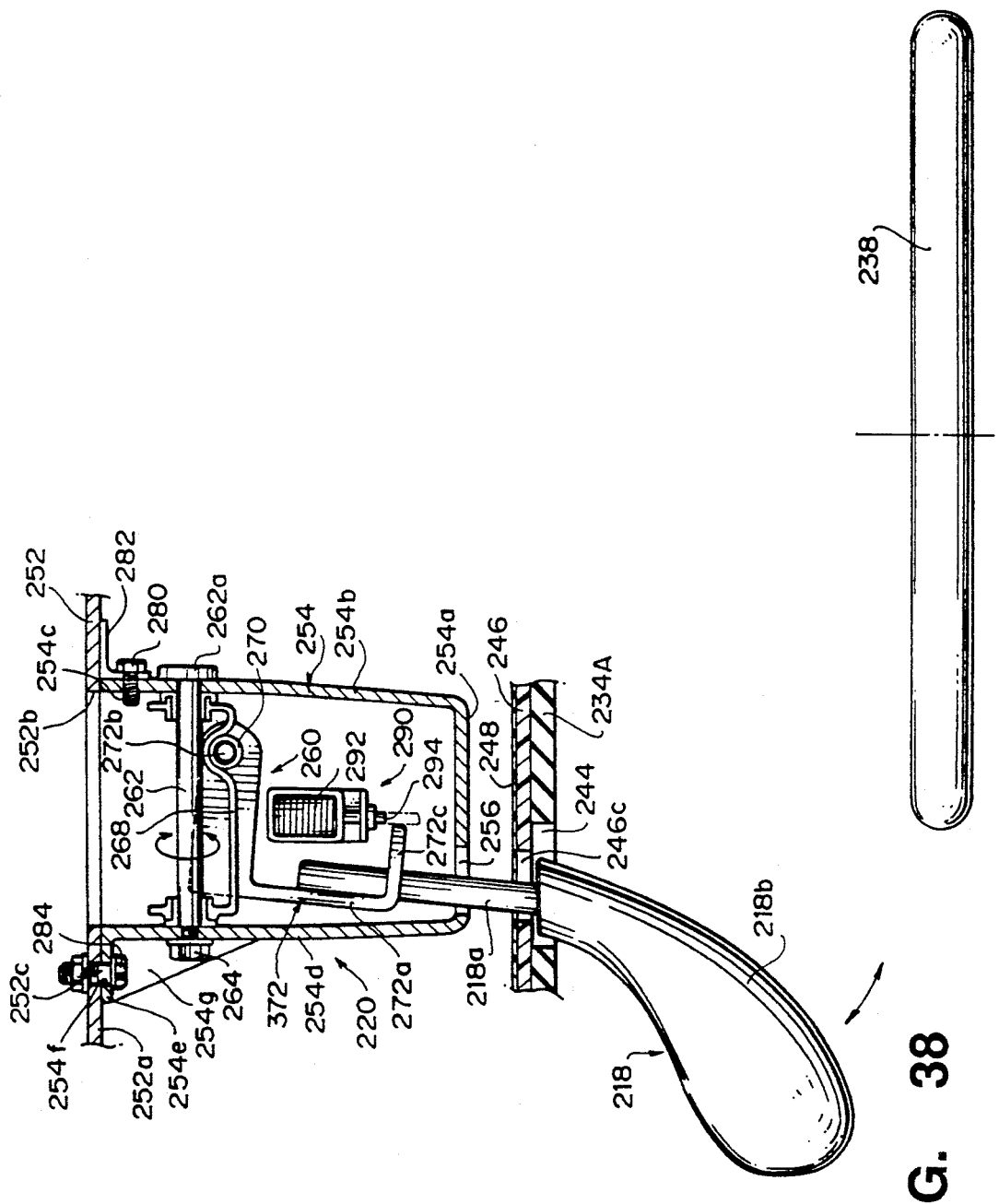
FIG. 38 is a cross-sectional view showing the structure of the lever mounting mechanism shown in FIG. 37.

A guide groove 256 for defining a travel range switching operation of the operation lever 218 is formed in a surface, facing the passenger room, of the housing 254, as shown in FIG. 38. The fact that the switching operation of the operation lever 218 is defined by this guide groove 256 also implies that the movement operation is regulated by direct contact of the lever main body 218a of the operation lever 218, which is operated by the driver. For this reason, the housing 254 is formed of stainless steel having a sufficient rigidity to receive the direct contact of the lever main body 218a.

According to one characteristic feature of the present invention, a surface 254a of the housing 254 where the guide groove 256 is formed has a height from the mounting surface 252a so that a predetermined space 258 can be assured between itself and the display panel 246 attached to the inner surface of the central bulge portion 234A. In other words, the surface 254a of the housing 254 is separated forward from the inner surface of the display panel 246 by a predetermined distance.

With this arrangement, the space 258 serves as a crash absorption space. More specifically, a portion of the central bulge portion 234A of the instrument panel where the operation lever 218 is arranged is located to just face a left side body portion of the driver. For this reason, when this vehicle comes into a head-on collision, if the driver does not wear a seat belt, the driver is strongly thrown forward, and h ts against the central bulge portion 234A. In this embodiment, since the space 258 is formed between the housing 254 having a high rigidity and the central bulge portion 234A having a low rigidity, deformation of the central bulge portion 234A upon hitting of the driver can be reliably permitted, and the hitting force is absorbed, thus guaranteeing safety of the driver.

The guide groove 256 is formed in the surface 254a of the housing 254, so that positions for defining the parking range "P", the neutral range "R", the forward drive range "D", the forward 2nd-speed range "2", and the forward 1st-speed range "1" are sequentially set downward.

When the operation lever 218 is manually swung, a travel range set according to its swing position is set by the automatic transmission mechanism 12 through the hydraulic valve 16. More specifically, a travel range expressed by an alphanumeric character just aside the finger operation portion 218b is set in the automatic transmission mechanism 12. That is, the finger operation portion 218b also serves as an index for indexing the presently set travel range.

Figure 39:
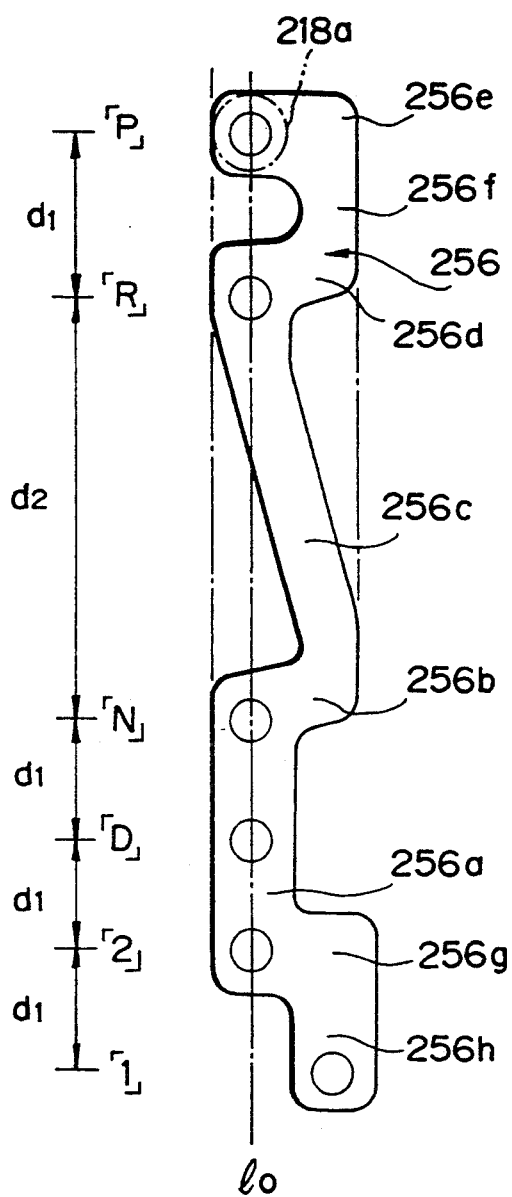
FIG. 39 is a plan view showing a guide groove pattern developed on a plane.

As shown in FIG. 39, the alphanumeric characters "N", "D", and "2" are aligned in a line at equal small intervals $d_1$. The letter "R" is aligned to be separated from the letter "R" by an interval $d_2$ larger than the interval $d_1$. The letter "P" is aligned to be separated from the letter "R" by the above-mentioned small interval $d_1$. The character "1" is aligned to be separated from the character "2" by the above-mentioned wide interval $d_2$. The alphanumeric characters "N", "D", and "2" are arranged at positions where a driver who sits at the driver's seat can directly look at these letters or characters to have the letter "D" at the center when he or she sees forward, as shown in FIG. 36. In this manner, when a driver executes an operation for switching the travel range position among the neutral range "N", the forward drive range "D", and the forward 2nd-speed range "2", he or she can read the alphanumeric character "N", "D", or "2" indicated by the finger operation portion 218b to instantaneously recognize which travel range is presently set. Thus, a driver can switch the travel range without anxiety.

As can be seen from FIG. 36, a driver cannot directly look at the letters "R" and "P". As will be described in detail later, when the operation lever 218 is merely swung upward or downward, the travel range position cannot be shifted from the neutral range "N" to the reverse range "R" or from the forward 2nd-speed range "2" to the forward 1st-speed range "1", and the operation lever 218 must be pushed in toward a steering wheel side along the widthwise direction, i.e., to the right to attain this shift operation.

As a result, in a state wherein the operation lever 218 is merely swung vertically to desirably switch the travel range position among the neutral range "N", the drive range "D", and the forward 2nd-speed range "2", the reverse range "R" and the reverse range "R" can never be set. Since the driver cannot directly look at the characters "R", "P", and "1", he or she can also receive as a mental security the fact that the travel range position will never be shifted from the neutral range "N" to the reverse range "R" and from the forward 2nd-speed range "2" to the forward 1st-speed range "1". Thus, the driver can desirably switch the travel range position among the neutral range "N", the drive range "D", and the forward 2nd-speed range "2" without anxiety.

As shown in FIG. 39 in a state wherein a circumferential pattern is developed on a plane, the guide groove 256 is constituted in a continuous state by a linear groove portion 256a which is linearly formed to extend between the forward 2nd-speed range "2" and the neutral range "N" along the vertical direction $l_0$, a first lateral groove portion 256b extending from the neutral range "N" at the upper end of the linear groove portion 256a to the right along the widthwise direction (i.e., perpendicular to the linear groove portion 256a), an oblique groove portion 256c obliquely extending from the right end of the first lateral groove portion 256b to the reverse range "R" with respect to the vertical direction $l_0$, a second lateral groove portion 256d extending from the reverse range "R" to the right in the widthwise direction, a third lateral groove portion 256e extending from the parking range "P" to the right in the widthwise direction, a first coupling groove portion 256f extending along the vertical direction $l_0$ to couple the right ends of the second and third lateral groove portions 256d and 256e, a fourth lateral groove portion 256g extending from the forward 2nd-speed range "2" at the lower end of the above-mentioned linear groove portion 256a to the right in the widthwise direction, and a second coupling groove portion 256h extending downward from the right end of the fourth lateral groove portion 256g to the forward 1st-speed range "1" along the vertical direction $l_0$.

The extending lengths of the first through third lateral groove portions 256b, 256d, and 256e are defined as a widthwise push-in amount of the above-mentioned operation switch, and are set to be equal to each other. Since the guide groove 256 is constituted as described above, the travel range switching operation from the forward 1st-speed range "1" to the neutral range "N" and the travel range switching operation from the reverse range "R" toward the forward 2nd-speed range "2" can be executed by only one-step operation, i.e., swinging the operation lever 218. However, the travel range switching operation from the neutral range "N" to the parking range "P", the travel range switching operation between the parking range "P" and the reverse range "R", and the travel range switching operation from the forward 2nd-speed range "2" to the forward 1st-speed range "1" require two-step operations, i.e., can be executed by swinging the operation lever switch 218 while being temporarily pushed in the widthwise direction every time each range is passed.

As a result, the travel range switching operation from the neutral range "N" to the reverse range "R", a travel range switching operation between the reverse range "R" and the parking range "P", and a travel range switching operation between the forward 2nd-speed range "2" and the forward 1st-speed range "1" cannot be performed by only a swing operation of the operation lever 218 described above, and these switching operations can be reliably prevented from being accidentally performed, thus assuring a safety travel state.

Note that the operation lever 218 is locked by a predetermined stop force at each position by means of a detent mechanism (not shown) which comprises detent holes formed at the respective travel range positions and a locking lever disengageably selectively locked in the detent holes, by the hydraulic valve 16 of the automatic transmission mechanism 12.

The lever mounting mechanism 220 comprises a universal joint mechanism 260 which permits both a widthwise movement and a vertical swing movement of the operation lever 218, while transmitting only the vertical swing movement of the operation lever 218 to the transmission wire 222 without transmitting its widthwise movement.

Figure 40:
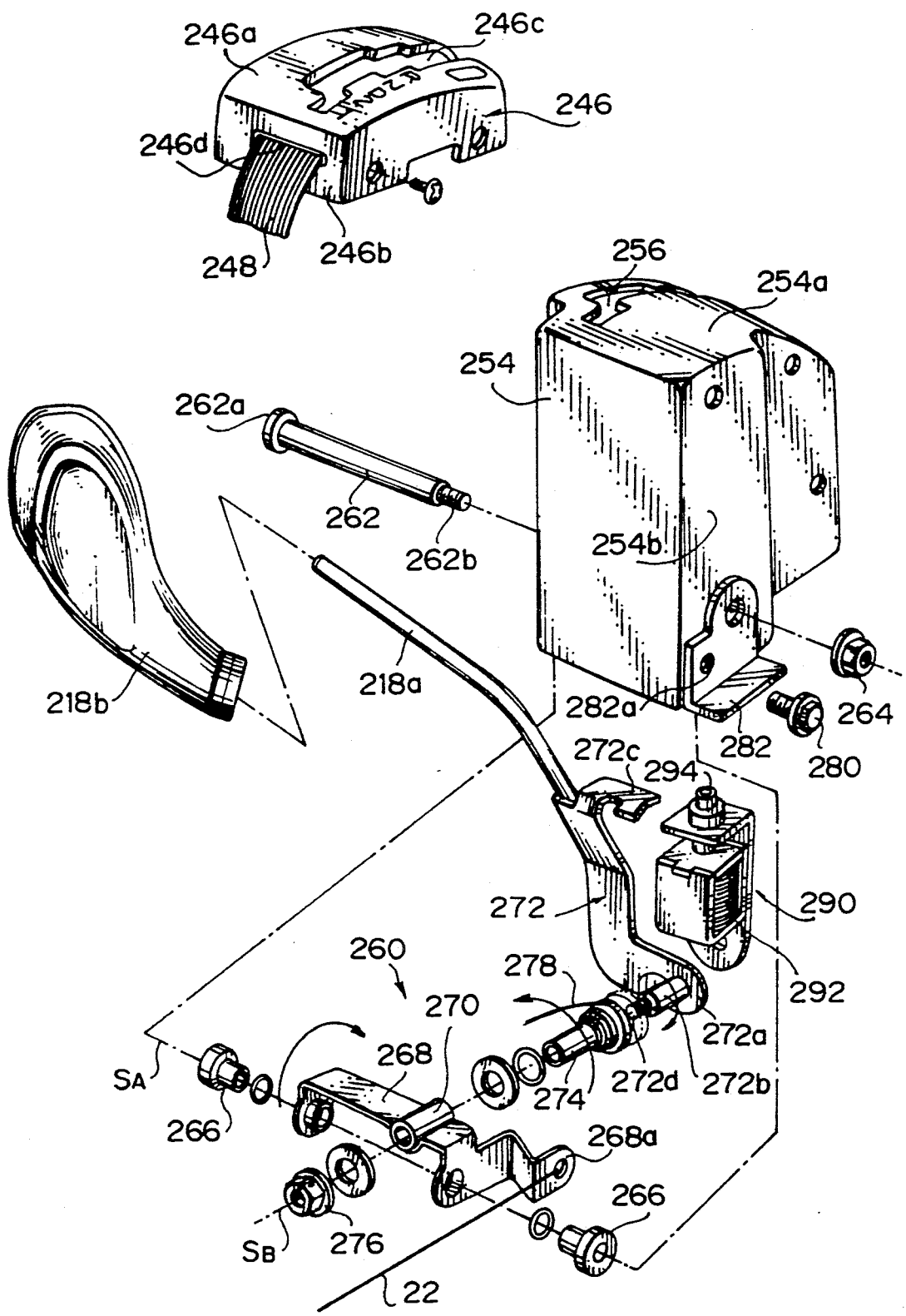
FIG. 40 is an exploded perspective view showing an internal structure of the lever mounting mechanism.

As shown in FIGS. 38 and 40, the universal joint mechanism 260 comprises a swing shaft 262 which extends through the housing 254 in the widthwise direction, and two ends of which extend through the two side walls of the housing 254 to define the above-mentioned vertical swing axis $S_A$ of the operation lever 218. A large-diameter head portion 262a is formed on the proximal end portion of the swing shaft 262, and a male threaded portion 262b is formed on its distal end portion. When a nut 264 is threadably engaged with the male threaded portion 262b extending outwardly from the housing 254, the swing shaft 262 is fixed to the housing 254.

A swing bracket 268 is attached to the swing shaft 262 via a synthetic resin bushing 266 to be swingable about the swing shaft 262 and to be located in the housing 254. A connection segment 268a to which the end portion of the transmission wire 222 is connected is integrally formed on one end of the swing bracket 268 to stand upright therefrom. A cylindrical sleeve 270, extending in a direction perpendicular to the widthwise direction, for defining the horizontal swing axis $S_B$ of the operation lever 218 is integrally attached to the central portion of the swing bracket 268.

A mounting bracket 272 is integrally attached to the proximal end portion of the lever main body 218a of the above-mentioned operation lever 218. The mounting bracket 272 comprises a planar member which extends in the widthwise direction to be perpendicular to the above-mentioned swing bracket 268, and is integrally formed by a bracket main body 272a to an upper portion of which the lever main body 218a is fixed, a support pin 272b standing upright from the lower end of the bracket main body 272a toward the swing bracket 268, and a locking segment 272c standing substantially upright from the upper edge of the bracket main body 272a in a direction opposite to the extending direction of the support pin 272b.

The support pin 272b of the mounting bracket 272 is fitted in the above-mentioned sleeve 270 through a synthetic resin bushing 274 to be pivotal about its central axis. A male threaded portion 272d is formed on the distal end of the support pin 272b. When the support pin 272b extends through the sleeve 270 and the male threaded portion 272d projecting therefrom is threadably engaged with a nut 276, the mounting bracket 272 is mounted on the swing bracket 268 to be swingable about a swing axis perpendicular to the swing axis of the swing bracket 268.

Since the universal joint mechanism 260 is arranged in this manner, the operation lever 218 is supported to be pivotal in a plane perpendicular to a vertical plane extending in a back-and-forth direction of a vehicle body via engagement between the support pin 272b and the sleeve 270, i.e., to be horizontally movable along the widthwise direction while being swingable about the swing shaft 262 extending along the widthwise direction, i.e., swingable along the vertical direction in view of the finger operation portion 218b. As can be seen from the above description, the swing movement of the operation lever 218 about the vertical swing axis $S_A$ generates a tensile force for the transmission wire 222, and is used for a travel range change operation.

On the other hand, the movement of the operation lever 218 about the horizontal swing axis $S_B$ does not generate a tensile force for the transmission wire 222 at all. In this manner, the horizontal movement of the operation lever 218 is not used for the travel range switching operation but is used for preventing the travel range from being accidentally changed.

The operation lever 218 is always biased to the left in the widthwise direction by a biasing force of a torsion coil spring 278 bridged between the mounting bracket 272 and the swing bracket 268.

The above-mentioned housing 254 is mounted on the mounting surface 252a of the mounting member 252 as follows. That is, a screw hole 254c for receiving a bolt 280 is formed in the right side surface 254b of the housing 254 in the widthwise direction, as shown in FIGS. 40 and 41A. The bolt 280 is screwed in this screw hole 254c while extending via a through hole 282a of an L-shaped bracket 282 fixed to the mounting surface 252a, so that the right side surface 254b of the housing 254 is mounted on the mounting surface 252a of the mounting member 252.

Figure 41B:
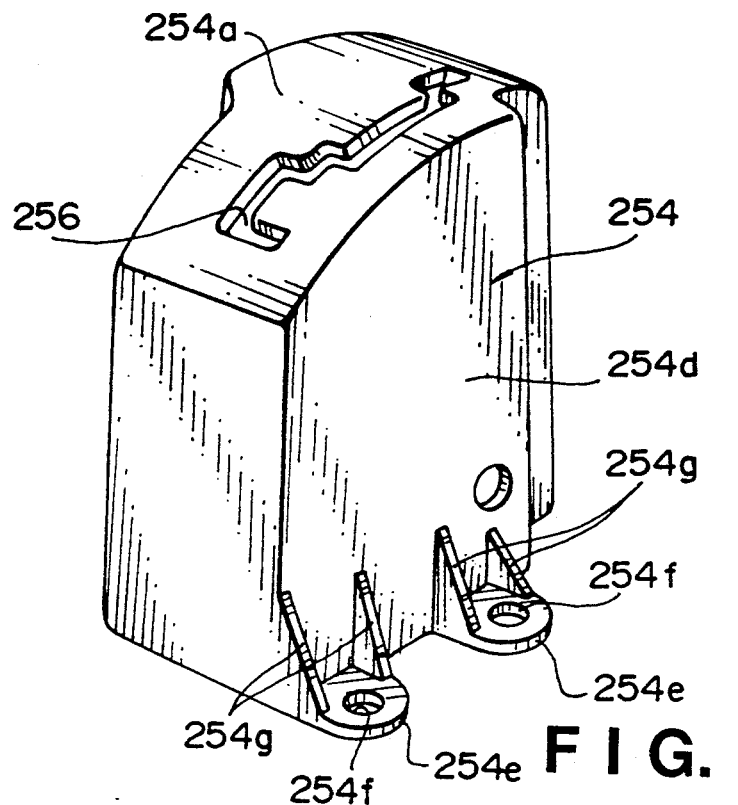
FIGS. 41A and 41B are perspective views showing an outer appearance of a housing when viewed from different directions.
Figure 41A:
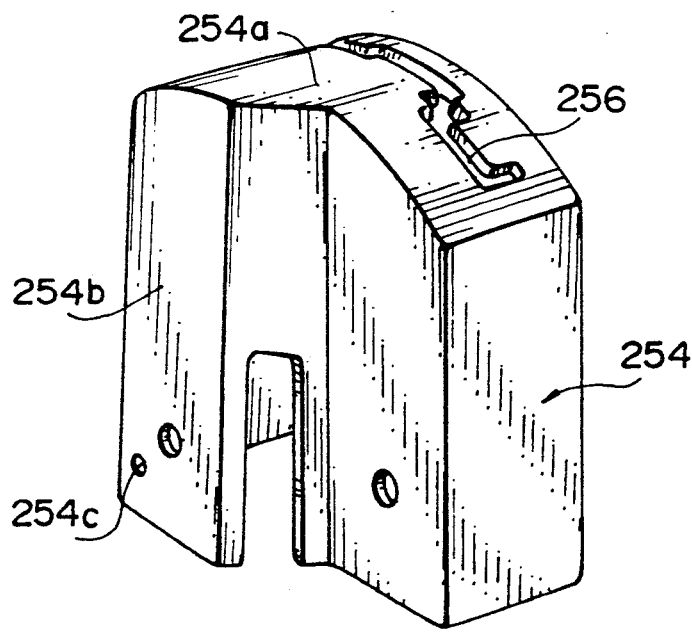

A mounting boss portion 254e extending to the left is integrally formed on the bottom surface of a left side surface 254d of the housing 254 in the widthwise direction, as shown in FIGS. 38 and 41B. A bolt 284 extending via a through hole 254f formed in this boss portion 254e is screwed in a screw hole 252c formed in the mounting surface 252a, thereby mounting the left side surface 254d of the housing 254 to the mounting surface 252a of the mounting member 252. A triangular reinforcement rib 254g is formed between the mounting boss portion 254e and the left side surface 254d to integrally connect them. With this reinforcement rib 254g, the mounting strength of the boss portion 254e can be considerably enhanced. In this manner, since the left and right side surfaces 254b and 254d of the housing 254 are mounted on the mounting surface 252a, the housing 254 can be satisfactorily fixed to the mounting member 252.

Note that the guide groove 256 is formed in the guide groove formation surface 254a of the housing 254, as described above. When the operation lever 218 at the parking range "P" position is shifted to another travel range, the operation lever 218 is displaced to the right in the widthwise direction against the biasing force of the torsion coil spring 278. The right displacement in the widthwise direction of the operation lever 218 is stopped when the lever 218 abuts against the right side edge of the guide groove 256. At this time, the housing 254 receives a large abutting force for pivoting it clockwise when viewed from the driver's seat 230 in FIG. 38 about the right side edge of its bottom surface. More specifically, the left side edge of the bottom surface of the housing 254 receives a lift-up force from the mounting surface 252a.

In this embodiment, however, since the left side edge of the housing 254 is securely mounted on the mounting surface 252a through the mounting boss portion 254e, the housing 254 can maintain a mounting state to the mounting surface 252a against the large abutting force generated when the travel range position is changed.

The housing 254 is located in front of the left side portion of the steering wheel 238 when viewed from the driver's seat. When a vehicle comes into a head-on collision, a steering shaft (not shown) axially contracts to absorb a shock, and the steering wheel is displaced forward. As a result, the left side portion of the steering wheel 254 which is displaced forward is brought into contact with the right side portion of the central bulge portion 234A of the instrument panel 234, thus crashing the above-mentioned crash absorption space 258.

No problem is posed when the crash of the right side portion of the central bulge portion 234A is absorbed by only the crash absorption space 258. However, when a shock beyond a crash absorption performance of the crash absorption space 258 acts, the steering wheel 238 directly hits against the right side portion of the housing 254, and the housing 254 receives a force for displacing it to the left in the widthwise direction.

In this embodiment, however, the right side surface 254b of the housing 254 is mounted on the mounting surface 252a of the mounting member 252 in such a manner that the bolt 280 which is inserted in the through hole 282a of the L-shaped bracket 282 fixed to the mounting surface 252a is screwed in the screw hole 254c of the housing 254. Therefore, the mounting strength of the housing 254 is relatively low. On the other hand, the left side edge of the housing 254 is strongly mounted on the mounting surface 252a via the mounting boss portion 254e. As a result, upon reception of the force for displacing the housing 254 to the left in the widthwise direction, the housing 254 is pivoted counterclockwise about the left side edge when viewed from the driver's seat 230. More specifically, the mounting state of the right side edge of the bottom surface of the housing 254 is destroyed, and the right side edge collapses to the left.

In this manner, when the steering wheel 238 operates to shorten its axial length to absorb a shock upon a head-on collision, the presence of the lever mounting mechanism 220 of the operation lever 218, more specifically, the presence of the housing 254 does not disturb the shock absorption operation, and the steering wheel 238 can reliably execute a shock absorption operation toward a front side, thus guaranteeing safety.

The interlock mechanism 290 is arranged in the housing 254 to inhibit a change operation of the operation lever 218 from the parking range "P" to the reverse range "R" unless the brake pedal is kept depressed. The interlock mechanism 290 comprises an electromagnetic solenoid 292 attached near the parking range "P" position, and a lock pin 294 reciprocally arranged on the electromagnetic solenoid 292, as shown in FIGS. 38 and 40. The lock pin 294 is kept biased in a direction to project by a spring (not shown). Only when the electromagnetic solenoid 292 is energized, the lock pin 294 is retracted inwardly against the biasing force of this spring.

The arranging position of the lock pin 294 is determined as follows. That is, when the lock segment 272c of the mounting bracket 272 integrally connected to the lower end of the lever main body 218a of the operation lever 218 located at the parking range "P" position, i.e., the left end portion in the widthwise direction of the third lateral groove portion 256e is moved to the right in the widthwise direction along the third lateral groove portion 256e, the lock segment 272c is brought into contact with the lock pin 294. As a result, when the electromagnetic solenoid 292 is energized upon reception of a control signal from the control unit 228 which is output only while the brake pedal (not shown) is kept depressed and a brake switch (not shown) is kept on, the lock pin 294 is pulled down, and the operation lever 218 is allowed to be shifted from the parking range "P" to another travel range.

On the other hand, when the brake pedal is not depressed and the brake switch is turned off, the control unit 228 does not output a control signal. As a result, the electromagnetic solenoid 292 is kept deenergized, and the lock pin 294 is kept projecting by the biasing force of the spring. Therefore, the projecting lock pin 294 inhibits a shift operation of the operation lever 218 from the parking range "P" to another travel range.

Figure 42:
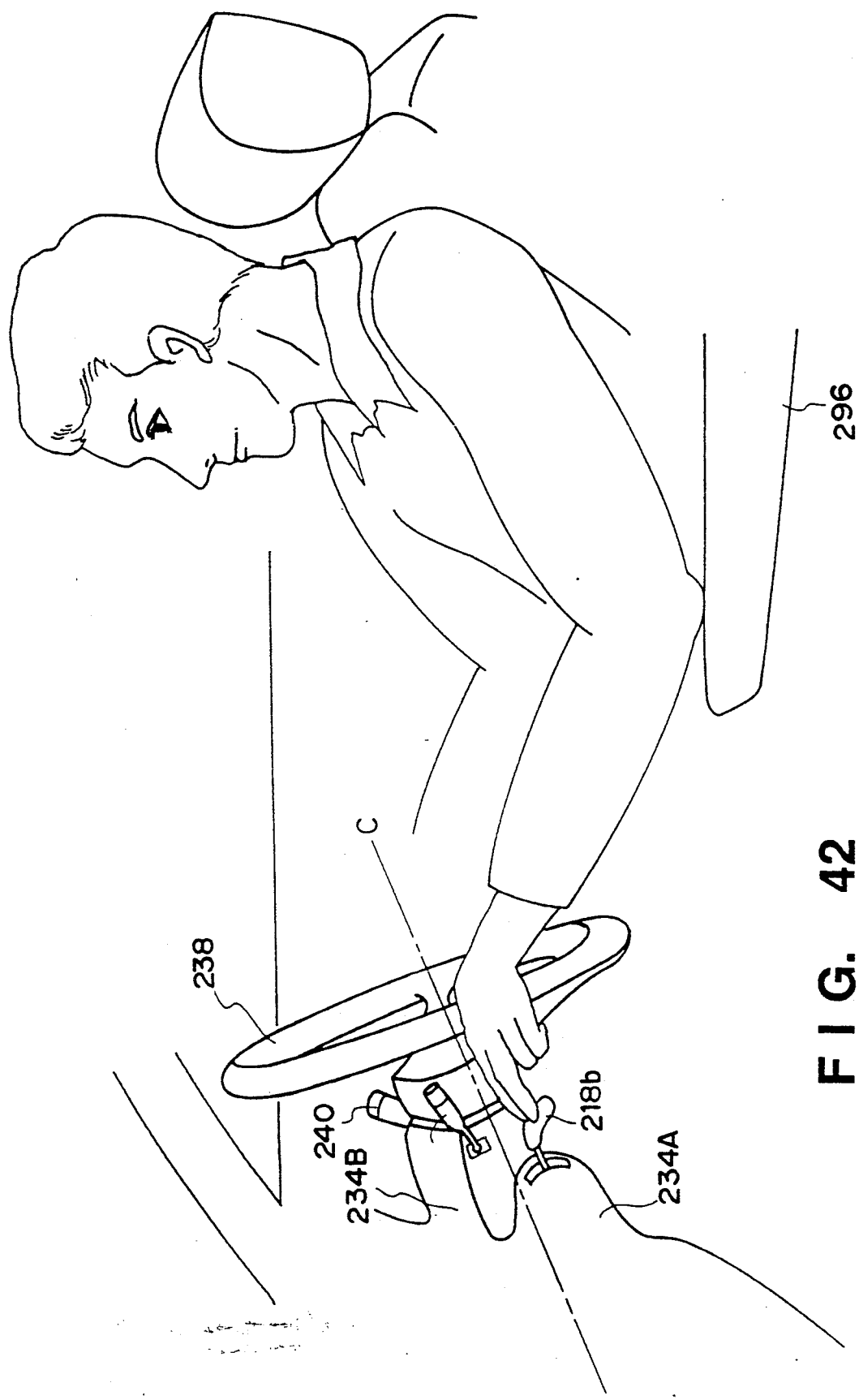
FIG. 42 is a side view showing an operation state of the operation lever by a driver sitting at the driver's seat.
Figure 43:
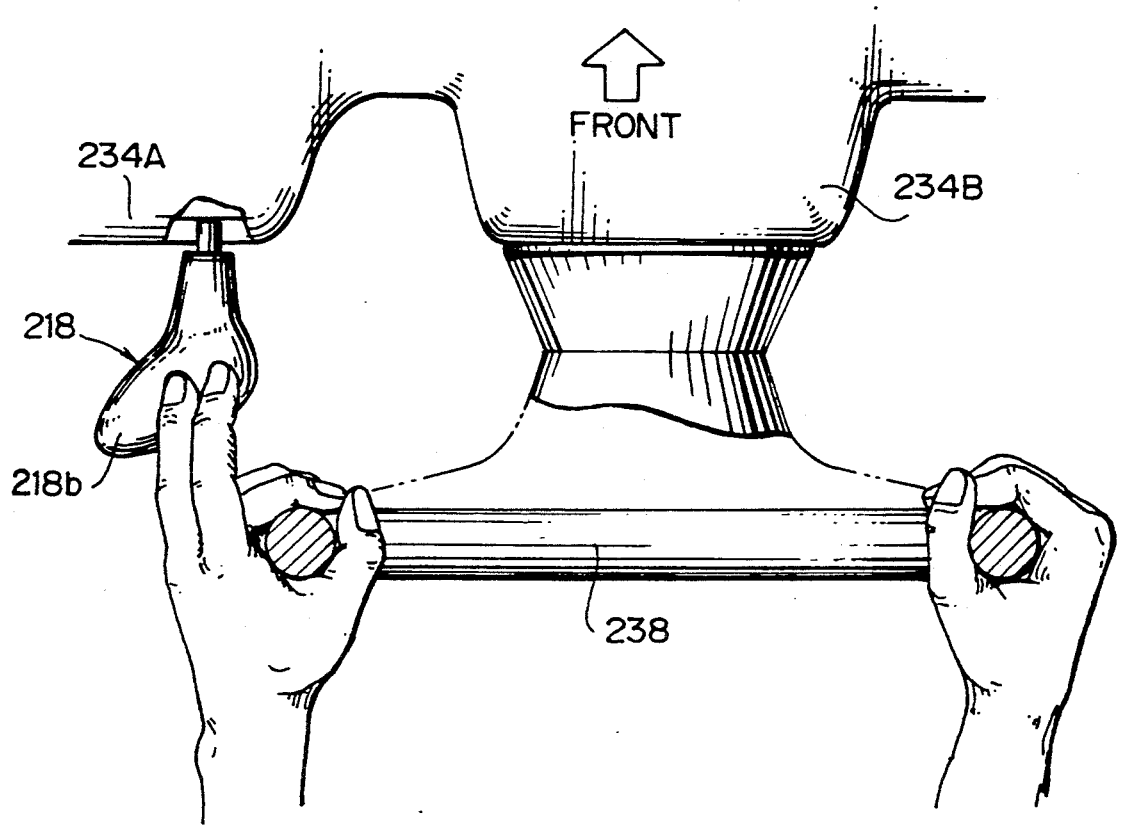
FIG. 43 is a top view showing an operation state of the operation lever.

The operation lever 218 with the above-mentioned structure is attached to the right side of the central bulge portion 234A of the instrument panel 234 when viewed from the driver. More specifically, in a driving state shown in FIG. 42, i.e., in a state wherein the driver rests his or her elbows on armrests 296 and holds the so-called 8 o'clock 20 minute positions of the steering wheel 238 with both hands in a relaxed position to drive the vehicle, the finger operation portion 218b located within a range of the forward 2nd-speed range "2" to the neutral range "N" is set at a position where the driver can access the finger operation portion 218b by stretching the middle finger of his or her left hand, as shown in FIG. 43.

Figure 44:
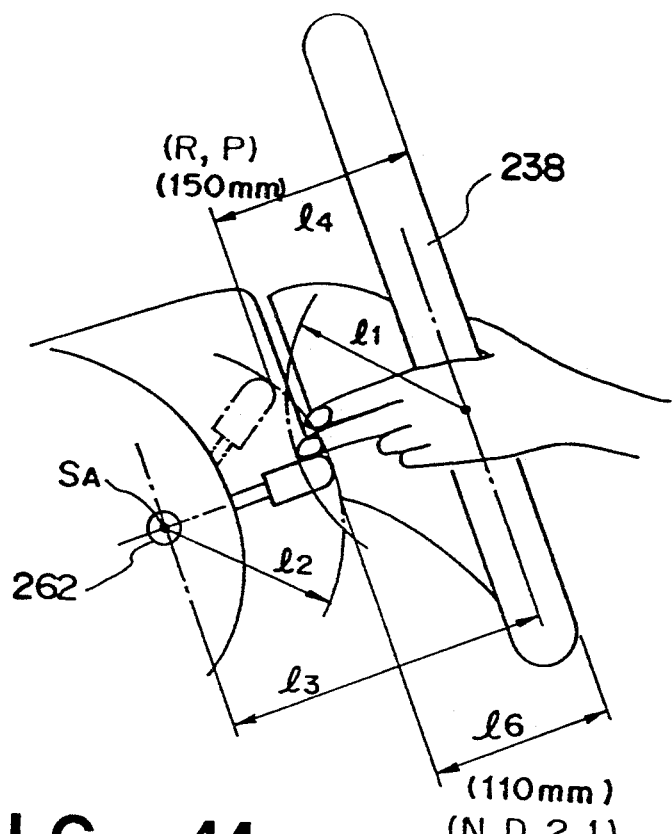
FIG. 44 is a side view showing a relative positional relationship between the steering wheel and an operation switch.

In other words, as shown in FIG. 44, in the above-mentioned driving state (i.e., a seating position), if a pivot radius of the middle finger of the left hand is represented by $l_1$ (e.g., 130 mm) and a pivot radius of the finger operation portion 218b is represented by $l_2$, a distance $l_3$ between the pivot center of the operation lever 218 and the left hand grip position of the steering wheel 238 is determined so that a pivot path of the distal end of the middle finger crosses that of the distal end of the finger operation portion 218b located within a range of the forward 2nd-speed range "2" to the neutral range "N". More specifically, the distance $l_3$ is determined to fall within a range satisfying the following inequality (3):

$$l_3 < l_1 + l_2 \tag{3}$$

When inequality (3) is defined as described above, in this embodiment, as shown in FIG. 44, a distance $l_6$ between the distal end of the finger operation portion 218b located at the forward drive range position "D" and the steering wheel 238 is set to be 110 mm.

As shown in FIG. 44, if a distance between the distal end of the finger operation portion 218b located at the reverse range position "R" and the steering wheel 238 is represented by $l_4$, the distance $l_4$ is defined to fall within a range wherein the following inequality (4) is satisfied, and is set to be 150 mm in this embodiment:

$$l_4 \geq l_1 \tag{4}$$

The interval $d_2$ between the neutral range "N" and the reverse range "R" is defined to satisfy the above-mentioned inequality (4).

In this embodiment, since the arranging position of the operation lever 218 is defined in this manner, the driver stretches the middle finger of his or her left hand while holding the steering wheel 238, and taps the finger operation portion 218b of the operation lever 218 downward or upward, thereby desirably and instantaneously switching the operation lever 218 between the forward 2nd-speed range "2" and the neutral range "N". As a result, the driver can switch the travel range position during travel while holding the steering wheel 238 with both hands, thus guaranteeing a safety drive state.

In this embodiment, since the reverse range position "R" is located outside an operation enable range of the finger operation portion 218b even if the driver stretches his or her middle finger while holding the steering wheel 238 with the left hand, he or she cannot switch the travel range position from the neutral range "N" to the reverse range "R". As a result, while the driver desirably switches the travel range position between the forward 2nd-speed range "2" and the neutral range "N" by tapping the finger operation portion 218b with his or her middle finger during forward travel, he or she can reliably avoid an erroneous operation for setting the reverse range "R". Thus, safety in the travel range switching operation can be guaranteed together with the above-mentioned requirement of the two-step operations.

In order to switch the travel range position to the reverse range "R", the parking range "P", or the forward 1st-speed range "1", the driver must release his or her left hand from the steering wheel 238. Therefore, the switching operation to the reverse range "R", the parking range "P", or the forward 1st-speed range "1" is mentally controlled, and an erroneous operation upon the switching operation to the reverse range "R", the parking range "P", or the forward 1st-speed range "1" can be prevented, thus guaranteeing safety travel from this point of view.

Figure 45:
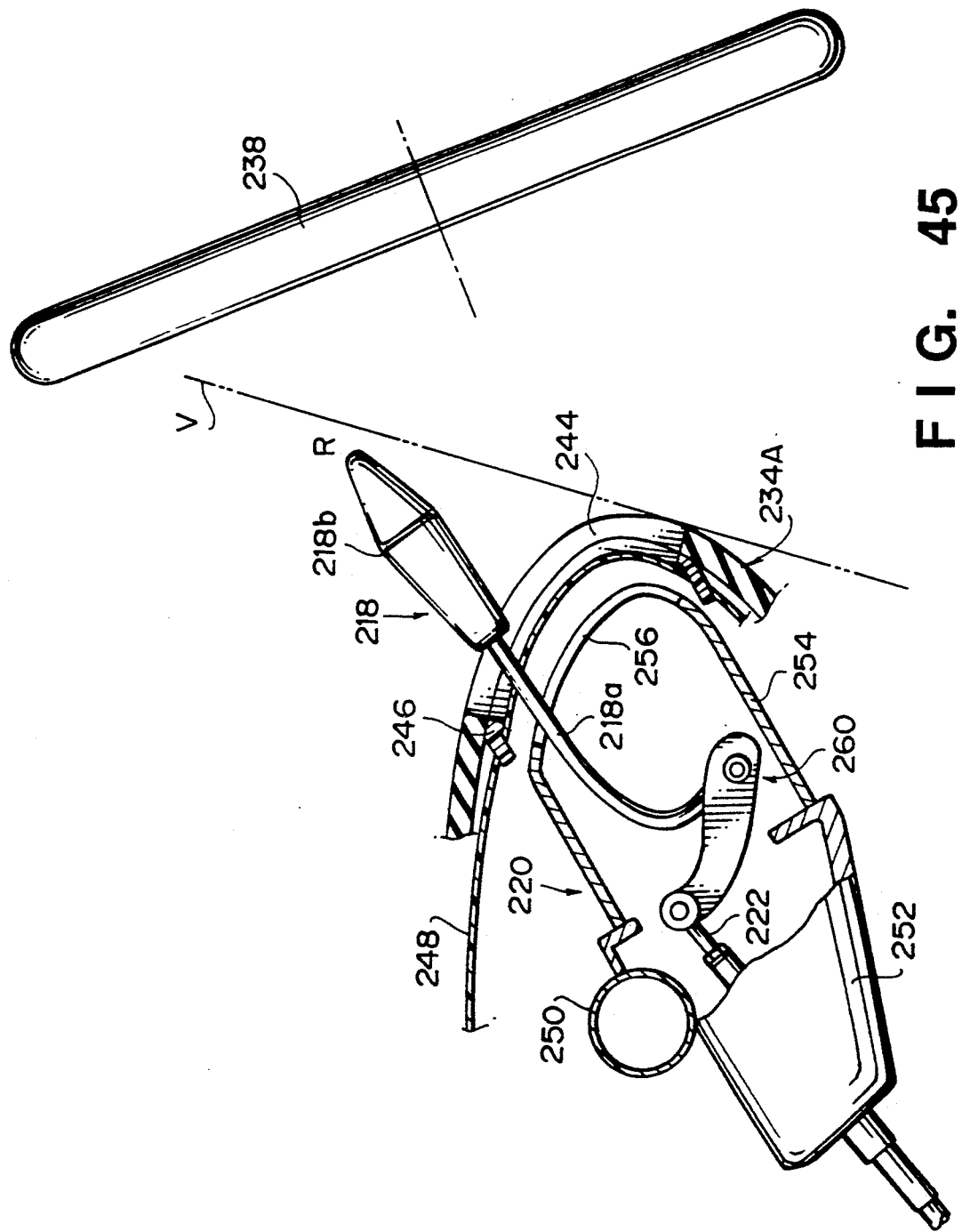
FIG. 45 is a longitudinal sectional view for explaining an arranging position of an operation lever set at a reverse range position "R"

Furthermore, in this embodiment, as shown in FIG. 45, the reverse range position "R" is defined by the position of the operation lever 218 which is located at least in front of a tangent V at a position where a knee contacts the central bulge portion 234A when the driver bends his or her knee at an acute angle and forcibly inserts it between the steering wheel 238 and the central bulge portion 234A. In other words, the reverse range position "R" is defined by pivoting the operation lever 218 via the finger operation portion 218b to a position which can never be accessed by a knee which enters between the operation lever 218 and the steering wheel 238 in an up state (i.e., bent at an acute angle). That is, the reverse range "R" is arranged at a position which satisfies both the condition given by the above-mentioned inequality (4) and a condition for setting a position which cannot be accessed by the knee as described above.

Figure 46:
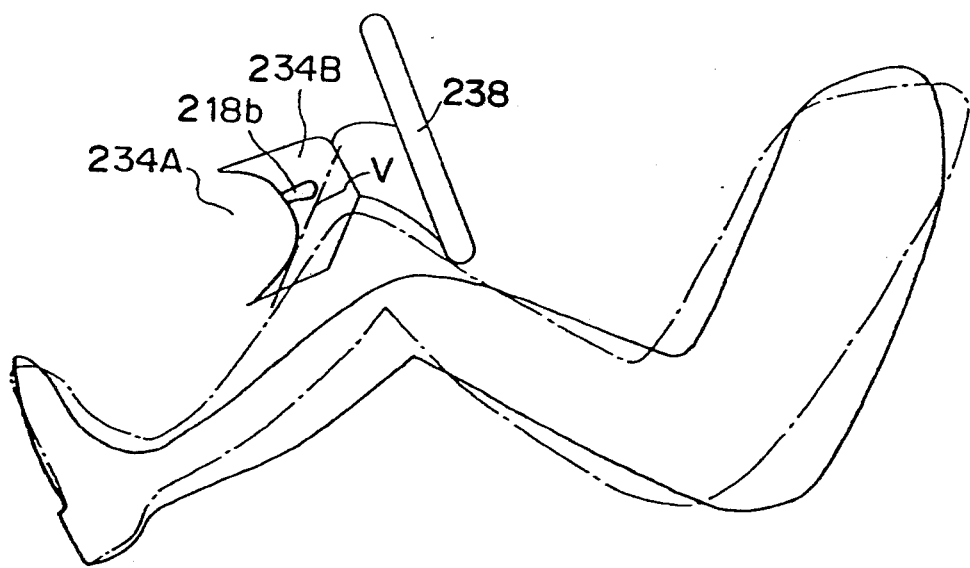
FIG. 46 is a side view showing a relative positional relationship between the operation lever and a driver's knee when he or she draws up his knee at an acute angle.

In a normal drive position, as indicated by a solid line in FIG. 46, the knee of the left leg will never access the operation lever 218. However, if the driver does not wear a seat belt in a head-on collision state or an abrupt braking state, his or her body is pushed forward by an immediate acceleration acting on him, and he or she may be forced to draw up his or her knee of the left leg between the operation lever 218 and the steering wheel 238, as indicated by an alternate long and short dashed line in FIG. 46. With this knee, the finger operation portion 218b of the operation lever 218 may be pushed upward, and the operation lever 218 may be forcibly pivoted from, e.g., the forward drive range "D" to the reverse range "R".

In this case, as described above, although the travel range position can be switched from the forward drive range "D" to the neutral range "N" by only a pivot operation of the operation lever 218, the switching operation from the neutral range "N" to the reverse range "R" cannot be attained by merely pivoting the operation lever 218. That is, two-step operations are required, i.e., the operation lever 218 must be swung while being pushed to the right along the widthwise direction. For this reason, in a normal knee up state, the lever main body 218a is in contact with only the end wall for defining the first lateral groove portion 256b of the guide groove 256, and the operation lever 218 is held in position for defining the neutral range "N" but cannot be switched to the reverse range "R".

However, in the above-mentioned head-on collision state or the abrupt braking state, since the above knee up state is attained with a strong force, in some cases, the operation lever 218 may be pivoted to accidentally set the reverse range "R".

As a result, when the abrupt braking is made, if the operation lever 218 is forcibly pivoted by the up knee from the neutral range "N" to the reverse range "R" by only the pivot operation, the vehicle is temporarily stopped by braking, and subsequently begins to move backward based on setting of the reverse range "R", resulting in danger.

However, in this embodiment, since the reverse range "R" is set at a position which cannot be accessed by the up knee, as described above, even if an immediate acceleration acts on the driver to force him or her to draw up a knee, the neutral range "N" is set in the worst case, and the reverse range will never be set. Thus, a safety travel state can be assured.

The travel range switching operation by operating the operation lever 218 by the driver in the operation apparatus 210 with the above arrangement will be described below.

In a state wherein the parking range "P" is set by the operation lever 218, and the vehicle stands still, a driver opens a door (not shown), enters the passenger room, slowly sits on a driver's seat, as shown in FIG. 37, and turns an ignition switch (not shown) with his or her right hand to start the engine 14 while depressing the brake pedal (not shown). Thereafter, the driver holds the finger operation portion 218b of the operation lever 218 with his or her left hand without gripping the steering wheel 238, and pushes it to the right in the widthwise direction against the biasing force of the torsion coil spring 278.

With this push-in operation, the lever main body is moved to the right along the third lateral groove portion 256e, and abuts against the end defining the right end portion of the coupling groove portion 256f, thus stopping the push-in operation. Thereafter, when the operation lever 218 is pushed downward, the lock lever is disengaged from a detent hole corresponding to the parking range "P" position in the hydraulic valve 16 of the automatic transmission mechanism 12. The lever main body 218a is moved downward along the first coupling groove portion 256f, and abuts against the edge defining the inner end portion of the second lateral groove portion 256d, thus stopping the push-down operation.

Thereafter, when the push-in force of the operation lever 218 is released, the operation lever 218 is entirely displaced to the left in the widthwise direction by the biasing force of the torsion coil spring 278. As a result, the lever main body 218a is moved to the left along the second lateral groove 256d. The lock lever in the hydraulic valve 16 is then fitted in the detent hole corresponding to the reverse range position "R", thus stopping movement of the lever main body 218a. In this manner, the travel range position is switched to the reverse range "R".

When the vehicle is to be moved backward, the driver releases his or her foot from the brake pedal while the reverse range "R" is set, and depresses an accelerator pedal.

On the other hand, when the vehicle is to be moved forward, the driver holds the finger operation portion 218b of the operation lever 218 with his or her left hand, and pushes it downward, so that the lock lever in the hydraulic valve 16 is disengaged from the detent hole corresponding to the reverse range "R", and the lever main body 218a is moved along the oblique groove portion 256c and abuts against and is stopped at the edge defining the inner end portion of the first lateral groove portion 256b.

Subsequently, when the push-in force of the operation lever 218 is released, the operation lever 218 is displaced to the left in the widthwise direction by the biasing force of the torsion coil spring 278. As a result, the lever main body 218a is moved to the left along the first lateral groove 256b. In the hydraulic valve 16, the lock lever is fitted in a detent hole corresponding to the neutral range "N", thus stopping the movement of the lever main body 218a. In this manner, the travel range position is switched to the neutral range "N".

In a state wherein the neutral range "N" is set in this manner, the driver rests both elbows on the armrests 296, and grips the so-called 8 o'clock 20 minute direction positions of the steering wheel 238 to take a driving position. As described above, the travel range switching operation between the neutral range "N" and the forward 2nd-speed range "2" can be attained by only tapping the finger operation portion 218b of the operation lever 218 upward or downward to turn the operation lever 218 vertically. That is, the driver maintains a state wherein he or she grips the steering wheel 238 with his or her both hands, and stretches the middle finger of the left hand to tap the finger operation portion 218b downward from the set position of the neutral range "N".

With this tap-down operation, the lock lever in the hydraulic valve 16 is disengaged from the detent hole corresponding to the neutral range "N", and the lever main body 218a is moved downward along the linear groove portion 256a. When the lock lever in the hydraulic valve 16 is fitted in a detent hole corresponding to the forward drive range "D", the movement of the lever main body 218a is stopped. In this manner, the travel range position is switched to the forward drive range "D".

When the forward drive range "D" is set in this manner, the driver releases his or her foot from the brake pedal, and depresses the accelerator pedal, thus driving the vehicle forward in an automatic transmission state.

When the travel range position is switched to the neutral range while the vehicle is stopped at, e.g., an intersection, the driver stretches the middle finger of his or her left hand while gripping the steering wheel 238 with both hands, and taps the finger operation portion 218b of the operation lever 218 upward, so that the lock lever in the hydraulic valve 16 is lightly disengaged from the detent hole corresponding to the drive range "D", and the lever main body 218a is moved upward along the linear groove portion 256a. When the lock lever in the hydraulic valve 16 is fitted in the detent hole corresponding to the neutral range "N", the lever main body 218a is stopped. In this manner, the travel range position is switched to the neutral range "N" again.

During forward travel with the drive range "D", for example, when the vehicle reaches a long down slope, and requires an engine brake, the driver stretches the middle finger of his or her left hand while gripping the steering wheel 238 with both hands, and taps the finger operation portion 218b of the operation lever 218 downward, so that the lock lever in the hydraulic valve 16 is lightly disengaged from the detent hole corresponding to the drive range "D", and the lever main body 218a is moved downward along the linear groove portion 256a. When the lock lever in the hydraulic valve 16 is fitted in the detent hole corresponding to the forward 2nd-speed range "2", the lever main body 218a is stopped. In this manner, the travel range position is switched to the forward 2nd-speed range "2".

During forward travel while effecting the engine brake in the forward 2nd-speed range "2", for example, when the vehicle reaches a further steep down slope, and requires a stronger engine brake, the driver stretches at least the middle finger of his or her left hand while gripping the steering wheel 238 with both hands, and pushes the finger operation portion 218b of the operation lever 218 to the right in the widthwise direction against the biasing force of the torsion coil spring 278. With this push-in operation, the lever main body 218a slides along the fourth lateral groove portion 256g, and abuts against the edge defining the upper end portion of the second coupling groove portion 256h, thus stopping the push-in operation.

Thereafter, when the finger operation portion 218b is pushed down, the lock lever in the hydraulic valve 16 is disengaged from the detent hole corresponding to the forward 2nd-speed range "2", and the lever main body 218a is moved downward along the second coupling groove portion 256h. When the lock lever in the hydraulic valve 16 is fitted in a detent hole for defining the forward 1st-speed range "1", the lever main body 218a is stopped. In this manner, the travel range position is switched to the forward 1st-speed range "1".

In this manner, when the forward 1st-speed range "1" is set, a strong engine brake can be attained. However, when the strong engine brake is erroneously set during high-speed travel, a stable travel state may be disturbed. For this reason, in this embodiment, as described above, when the travel range position is switched from the forward 2nd-speed range "2" to the forward 1st-speed range "1", two-step operations, i.e., widthwise push-in and vertical turn operations of the finger operation portion 218b of the operation lever 218 are required although the left hand keeps holding the steering wheel 238. Thus, the forward 1st-speed range "1" cannot be set by only turning the finger operation portion 218b.

As a result, in a state wherein the travel range switching operation is executed among the forward 2nd-speed range "2" and the neutral range "N" with a light operation force, the forward 1st-speed range "1" cannot be easily set. In addition, in order to switch the travel range position from the forward 2nd-speed range "2" to the forward 1st-speed range "1", a special attention is required, and it can be effectively prevented to erroneously set the forward 1st-speed range "1".

More specifically, in this embodiment, during forward travel of the vehicle, when the driver changes the travel range position among the forward 2nd-speed range "2" and the neutral range "N" while he or she keeps holding the steering wheel 238 with both hands, he or she stretches the middle finger of his or her left hand and lightly taps the finger operation portion 218b of the operation lever 218 downward or upward to pivot the operation lever 218, thereby executing the travel range switching operation during forward travel without releasing the left hand from the steering wheel 238, i.e., while holding the steering wheel 238 with both hands. Thus, high-level safety upon operation of the steering wheel 238 can be attained.

When the travel range position is switched from the forward 2nd-speed range "2" to the forward 1st-speed range "1", the driver stretches the middle finger of his or her left hand, temporarily pushes in the finger operation portion 218b of the operation lever 218 in the widthwise direction, and then strongly taps the finger operation portion 218b downward to pivot the operation lever 218. As a result, the driver can execute the travel range switching operation for effecting a strong engine brake without releasing the left hand from the steering wheel 238, i.e., while holding the steering wheel 238 with both hands. Thus, high-level safety upon operation of the steering wheel 238 can be similarly attained.

When the travel direction of the vehicle is to be reversed from a forward travel state, after the travel range position is temporarily switched to the neutral range "N" by the above-mentioned operations, the driver releases his or her left hand from the steering wheel 238, and pushes the finger operation portion 218b to the right in the widthwise direction against the biasing force of the torsion coil spring 278 with the released left hand. With this push-in operation, the lock lever in the hydraulic valve 16 is disengaged from the detent hole corresponding to the neutral range "N". The lever main body 218a slides along the first lateral groove portion 256b, and abuts against the edge defining the lower end portion of the oblique groove portion 256c, thus stopping the push-in operation.

Thereafter, when the finger operation portion 218b is tapped upward, the lever main body 218a slides along the oblique groove portion 256c, and reaches its upper end portion. When the lock lever in the hydraulic valve is fitted in the detent hole corresponding to the reverse range "R", the lever main body 218a is stopped. In this manner, the travel range position is switched to the reverse range "R" again.

When the travel range position is to be switched from the reverse range "R" to the parking range "P", operations quite opposite to those for switching the travel range position from the parking range "P" to the reverse range "R" are executed.

More specifically, in conventional vehicles, when a transmission operation in a manual transmission mechanism or a travel range switching operation in an automatic transmission mechanism is to be performed regardless of the type of transmission mechanism (manual or automatic transmission) or type of shift lever (column or floor shift lever type), a driver must release his or her left hand from the steering wheel 238 to perform the operation, a so-called single-hand driving state occurs, and it is not preferable in terms of safety. According to this embodiment, however, this problem can be solved, and the travel range switching operation can be performed without releasing the left hand from the steering wheel 238, i.e., while holding the steering wheel 238 with both hands. As a result, a greatly improved novel driving operation in terms of safety can be realized.

According to this embodiment, the operation lever 218 for switching the transmission range position is mounted on the right side portion of the central bulge portion 234A of the instrument panel 234, and a front-wheel driving system is employed. As a result, a floor between the driver's seat and the front passenger's seat can be formed to be almost flat, and a space around the driver's seat can be "neatly" arranged. In this manner, gorgeous circumstances as if the driver's seat were placed on the floor of a reception room can be attained, and the circumstances in the passenger room create a very "leisurely" atmosphere in addition to the fact that the driver can rest elbows of both arms on the armrests 296 and can take a relaxed driving position. As a result, a comfortable, safety driving condition can be naturally attained.

The structure of the motorized driver's seat 30 described above will be described in detail below with reference to FIGS. 47 and 48.

Figure 47:
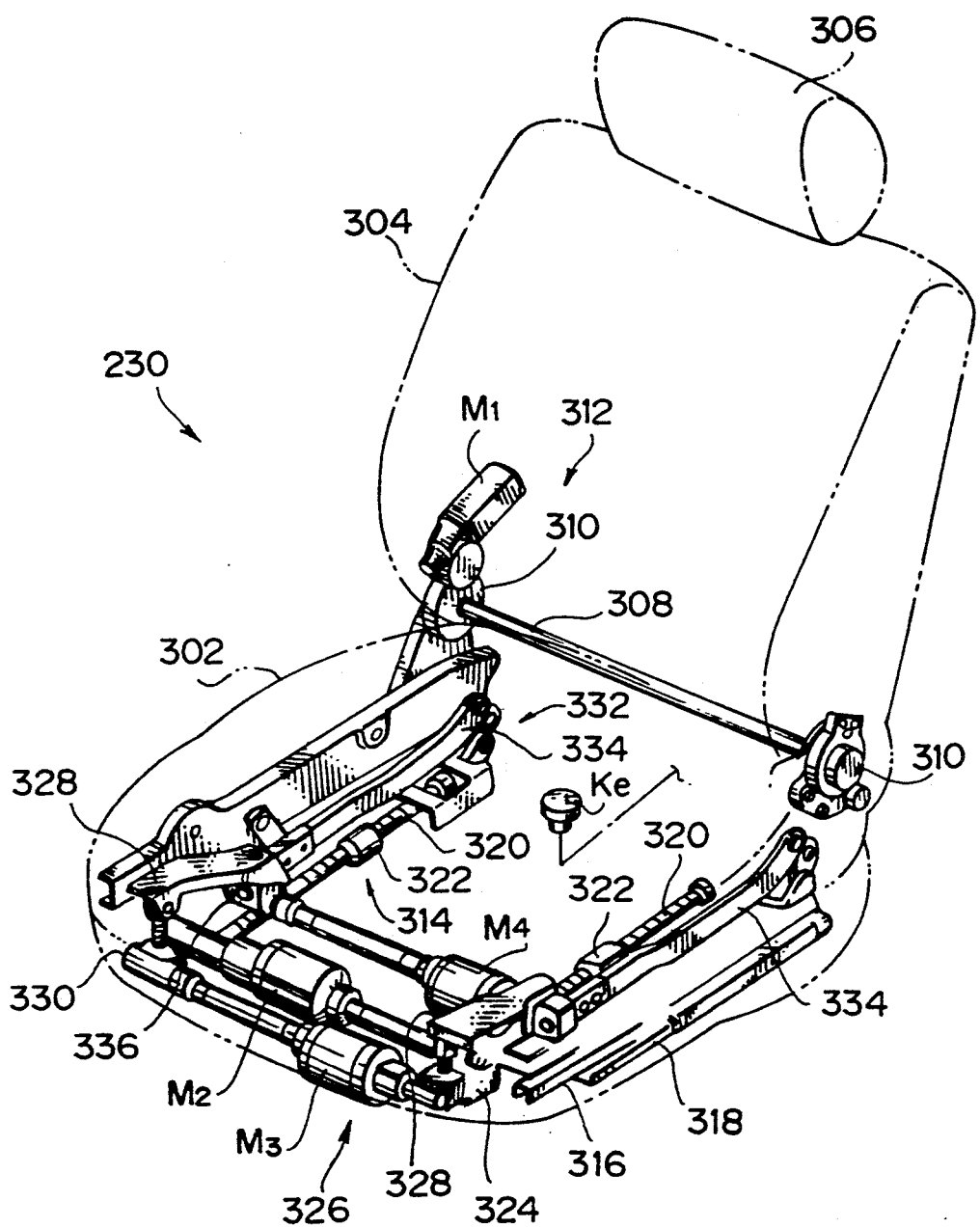
FIG. 47 is a perspective view showing a structure of a motorized driver's seat.

As shown in FIG. 47, the driver's seat 230 comprises a seat cushion 302 forming a seating surface of a passenger, and a seat back 304, standing upright on the trailing end portion of the seat cushion 302, for supporting a back of the passenger. A headrest 306 for supporting a head of the passenger is arranged on an upper portion of the seat back 304.

The seat back 304 is reclinably coupled to the seat cushion 302 via a motorized reclining device 312 which is mainly constituted by a pair of right and left reclining knuckles 310, a motor $M_1$, and the like. More specifically, in this motorized reclining device 312, when the motor $M_1$ (reclining motor) provided to one reclining knuckle 310 is driven, a meshing state of a gear train (not shown) incorporated in each reclining knuckle 310 is changed, so that an inclination angle of the seat back 304 with respect to the seat cushion 302 can be desirably adjusted.

A back-and-forth slide device 314 for sliding the driver's seat 230 in the back-and-forth direction is arranged below the seat cushion 302. The back-and-forth slide device 314 is mainly constituted by a pair of right and left upper rails 316 (only left one is illustrated in FIG. 47), a pair of right and left lower rails 318 (only left one is illustrated in FIG. 47), a pair of right and left screw shafts 320 extending in the back-and-forth direction of the vehicle body, screw nuts 322 fixed to the corresponding lower rails 318 and meshing with the corresponding screw shafts 320, a motor $M_2$ for rotating these screw shafts 320 via gear trains (not shown) of gear boxes 324 joined to the upper rails 316, and the like.

When this motor $M_2$ (slide motor) is driven, the screw shafts 320 are moved in the back-and-forth direction while being rotated, and the upper rails 316 (i.e., the entire driver's seat 230) slide along the corresponding lower rails 318, so that the back-and-forth position of the driver's seat can be adjusted.

Furthermore, the seat cushion 302 is connected to a front lifter device 326 for independently lifting the front portion of the driver's seat 230. The front lifter device 326 is mainly constituted by a pair of right and left front lifter brackets 328 for lifting the front portion of the seat cushion 302, a motor $M_3$ for operating the two front lifter brackets 328 through a gear box 330, and the like. The seat cushion 302 is also connected to a rear lifter device 332 for independently lifting the rear portion of the driver's seat 230. The rear lifter device 332 is mainly constituted by a pair of right and left rear lifter brackets 334 for lifting the rear portion of the seat cushion 302, a motor $M_4$ for operating the two rear lifter brackets 334 through a gear box 336, and the like.

When the motor $M_3$ (front lifter motor) or the motor $M_4$ (rear lifter motor) is driven, the lifter brackets 328 or 334 are selectively operated, and the front or rear portion of the seat cushion 302 is vertically moved. As a result, the vertical position, and an inclination in the back-and-forth direction of the seat cushion 302 can be adjusted by operating a single button.

Moreover, a load sensor K1 as a seating switch for detecting whether or not a passenger sits on the driver's seat 230 is embedded in substantially the central portion of the seat cushion 302.

The motors $M_1$, $M_2$, $M_3$, and $M_4$ of the driving devices for driving the respective portions of the driver's seat 230, and the load sensor K1 are connected to a driving control unit 340 of a controller 338 mainly comprising, e.g., a microcomputer to be able to exchange signals therebetween, as shown in FIG. 48. The driving control unit 340 is connected to a timer circuit 342 for measuring the lapse time after a passenger sits on the driver's seat.

The driving control unit 340 is further connected to motor rotational angle sensors $K_1$, $K_2$, $K_3$, and $K_4$ for detecting the rotational angles of the output shafts of the motors $M_1$, $M_2$, $M_3$, and $M_4$, and a door sensor $K_D$ for detecting an open/closed state of a door on the driver's seat 230 side. The control unit 340 can detect operation states of the respective driving devices according to detection signals from these rotational angle sensors $K_1$, $K_2$, $K_3$, and $K_4$. The driving control unit 340 is connected to manual driving switches $SW_1$, $SW_2$, $SW_3$, and $SW_4$ for independently driving the reclining device 312, the back-and-forth slide device 314, the front lifter device 326, and the rear lifter device 332, respectively.

The driving control unit 340 is connected to a memory unit 344 for prestoring a setup position of the driver's seat 230, and a switch 246 for switching a driving motor of the driver's seat 230 between a manual mode and an automatic mode. When the switch 346 is switched to the manual mode side, the position of the driver's seat 230 can be desirably changed by appropriately driving these switches $SW_1$, $SW_2$, $SW_3$, and $SW_4$. When the switch 346 is switched to the automatic mode, the motors $M_1$, $M_2$, $M_3$, and $M_4$ are controlled to attain the driving position prestored in the memory unit 344. Position information of the driver's seat 230 to the memory unit 344 is defined by a position sate of the driver's seat 230 when the switch 246 is switched from the manual mode to the automatic mode.

The control operation of the driving control unit 340 in a state wherein the automatic mode is set in the driver's seat 230 with the above-mentioned structure will be described below.

In a state wherein the load sensor K1 is kept OFF, and does not detect that the driver sits on the driver's seat 230, when the door on the driver's seat side is opened and the door sensor $K_D$ is turned off, the driving control unit 340 outputs driving signals to the motors $M_1$, $M_2$, $M_3$, and $M_4$ to keep a predetermined space between the driver's seat 230 and a steering wheel, so that the driver can easily sit on the driver's seat. More specifically, the control unit 340 outputs a driving signal to the motor $M_1$, so that the seat back 304 is inclined at a predetermined angle with respect to the seat cushion 302; it outputs a driving signal to the motor $M_2$ so that the seat cushion 302 is moved downward to its lowermost position; and it outputs driving signals to the motors $M_3$ and $M_4$ so that the front and rear portions of the seat cushion 302 are moved downward to their lowermost positions.

Thereafter, when the load sensor K1 is turned on, and detects that the driver sits on the driver's seat, it outputs a seating signal to the driving control unit 340. Upon reception of this seating signal, the driving control unit 340 outputs an operation signal to the timer circuit 342, and the timer circuit 342 starts measurement of a time elapsed after the driver sits on the seat. When a predetermined period of time has passed after the driver sits on the seat, a time-up signal is output from the timer circuit 342 to the driving control unit 340. Upon reception of the time-up signal, the driving control unit 340 outputs operation signals to the motors $M_1$, $M_2$, $M_3$, and $M_4$ to attain the prestored position. In this manner, a predetermined driving position of the driver's seat 230 can be satisfactorily set.

When the manual mode is set by the switch 346, the position of the driver's seat 230 can be changed by only the manual driving switches $SW_1$, $SW_2$, $SW_3$, and $SW_4$ without executing the above-mentioned driving control of the driver's seat 230.

As described above, the relative positional relationship between the steering wheel 238 and the operation lever 218 is fixed, and a state wherein a driver can stretch a finger of his or her left hand to operate the operation lever while holding the steering wheel 218 can always be attained. Since this driver's seat 230 is of a motorized type, the driver's seat 230 is appropriately driven to set an optimal driving position with respect to the steering wheel 238 even if the steering wheel 238 cannot be tilted.

In the embodiment described above, as shown in FIG. 42, the wiper switch 242 is arranged on the left side surface of the steering column 234B, i.e., on the same side as the operation lever 218 to have the center of the steering column 234B as a boundary. The direction indication lever 240 is arranged on the right side surface of the steering column 234B, i.e., on a side opposite to the operation lever 218 to have the steering column 234B as the center. In the above embodiment, the operation lever 218 and the wiper switch 242 are arranged on the left side to have the center of the steering column 234B as a boundary. For this reason, as described above, in order to prevent an operation of one member from causing an erroneous operation of the other member, the operation lever 218 is arranged to be swingable about an axis extending along the widthwise direction, and the wiper switch 242 is arranged to be pivotal about its own central axis.

Figure 49:
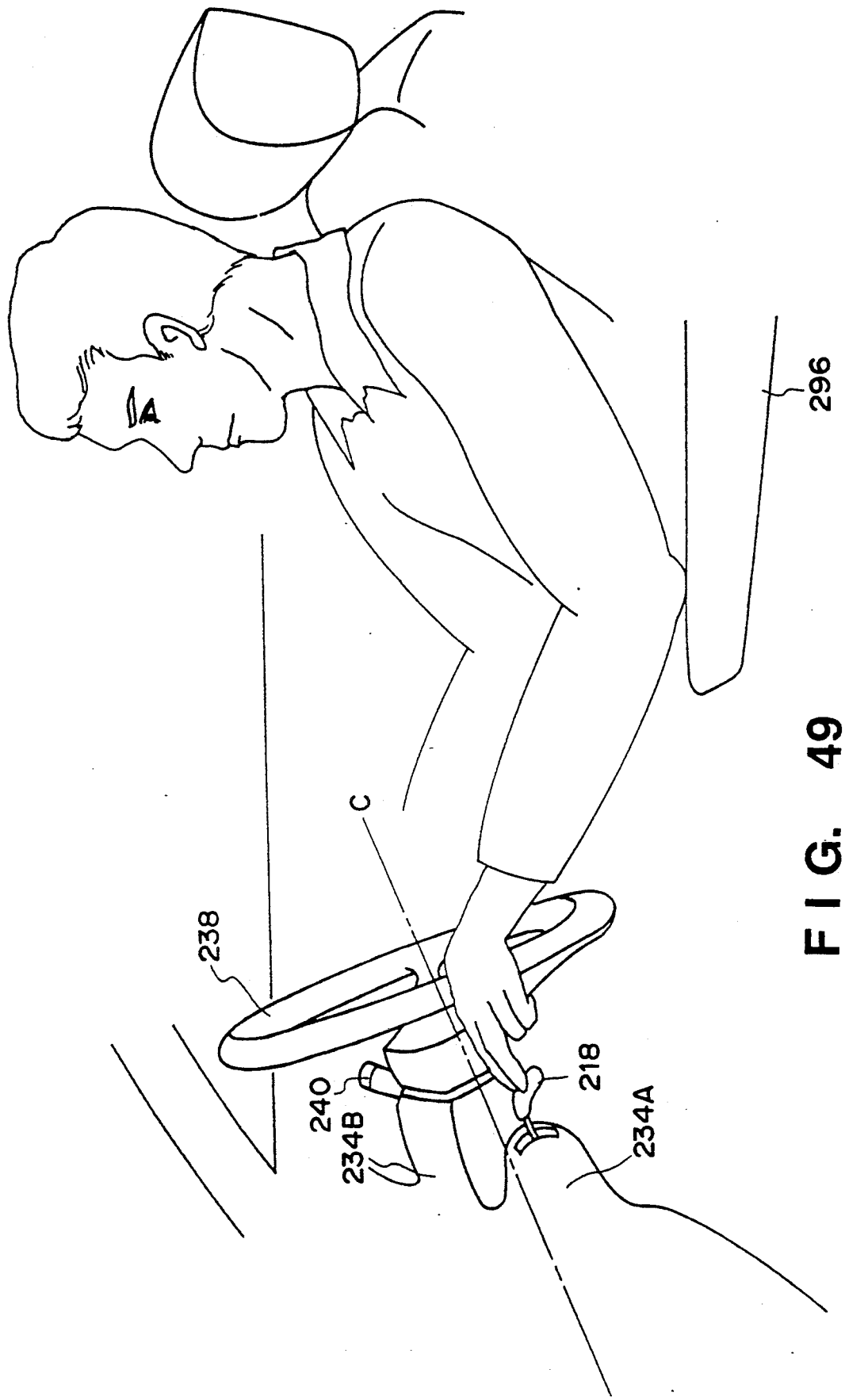
FIGS. 49 and 50 are respectively a side view and a front view showing another arranging states of auxiliary equipments other than an operation lever in an operation apparatus according to the present invention.
Figure 50:
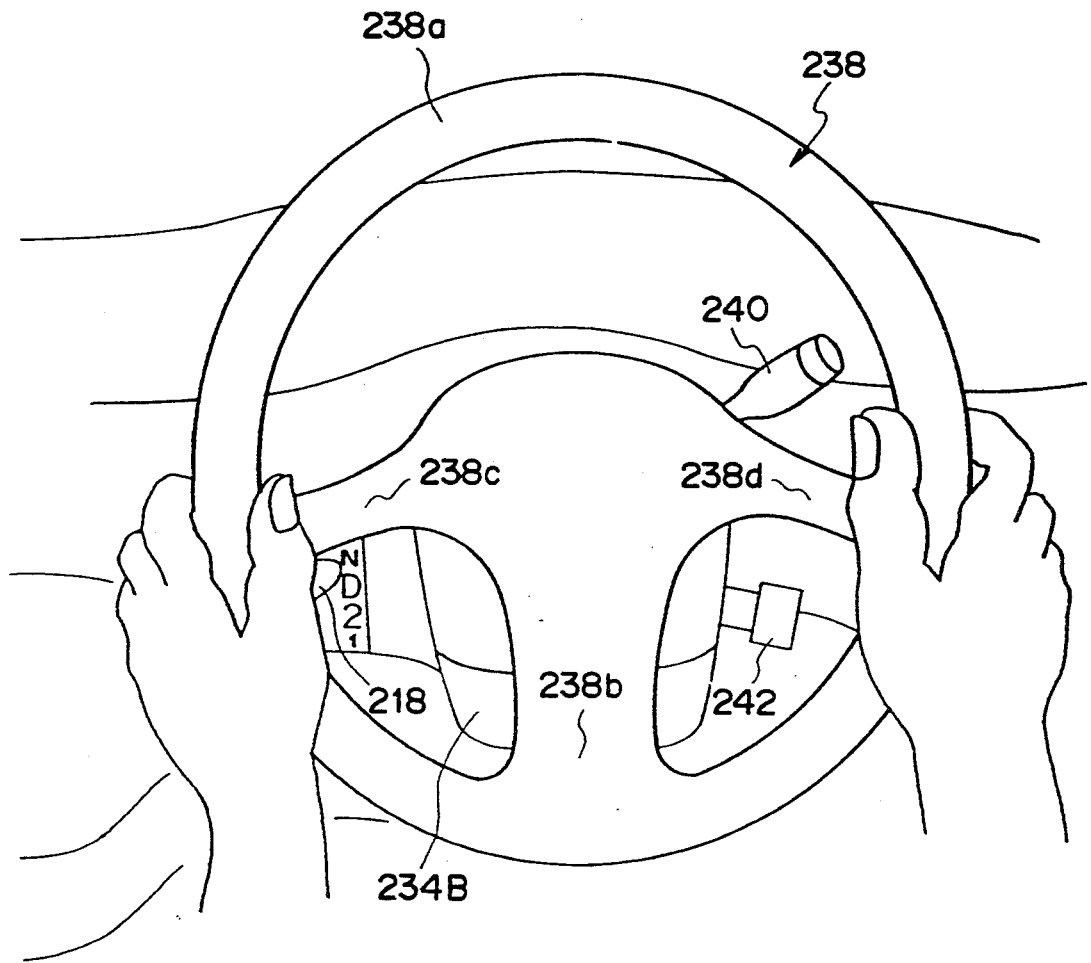

In a state wherein the operation lever is arranged on the central bulge portion 234A of the instrument panel 234, however, the arranging position of the wiper switch 242 is not limited to this position. For example, as shown in FIGS. 49 and 50, the wiper switch 242 may be arranged on the right side surface of the steering column 234B, i.e., on the right side to have the center of the steering column 234B as a boundary. With this arrangement, none of auxiliary equipments are present on the left side surface of the steering column 234B, and an operation of the operation lever 218 never cause an erroneous operation of other auxiliary equipments.

Figure 13:
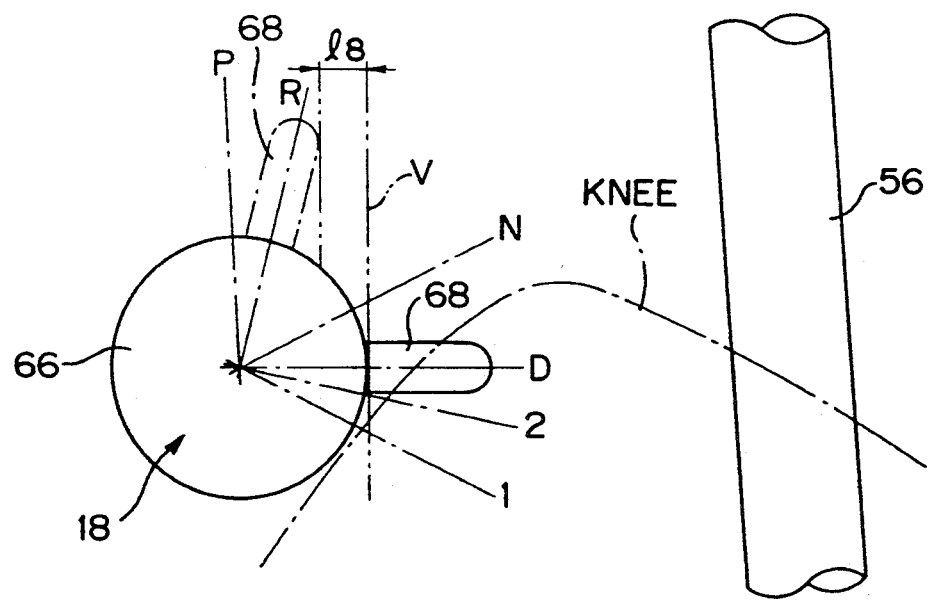
FIG. 13 is a side view for explaining a set position of a reverse range.

The above preferred embodiment of the invention illustrated in FIGS. 11-13 and as described above, and the preferred embodiment of the invention illustrated in FIGS. 44-45 of the drawings and as described above, have been optimally designed for a vehicle driver of an average size as is known in automotive human engineering. However, such embodiments can be operated by vehicle drivers of different heights and sizes within known normal size ranges. Furthermore, as illustrated in FIGS. 47-50 of the drawings and as described above, depending upon the height and size of the vehicle driver, the optimal driving and operational position for the invention with respect to the steering wheel can be achieved by use of the driver's motorized seat even if the steering wheel cannot be tilted or adjusted. As would also be known by those having ordinary skill in the art from the disclosure of this invention, and as specifically illustrated in FIG. 11, the location of the operational switch designated by the distance $l_3$, as well as the distances $l_4$ and $l_5$ could be adjusted in accordance with the parameters $l_1$ and $l_2$ for vehicle drivers of sizes outside the normal vehicle driver size range. Accordingly, the present invention is not intended to be limited to specific distances or dimensions as provided for the above preferred embodiments nor to a specific size or height of a vehicle driver.

As many apparently widely different embodiments of the present invention can be made without departing from the spirit and scope thereof, it is to be understood that the invention is not limited to the specific embodiments thereof except as defined in the appended claims.

What is claimed is:

1. An operation apparatus for an automatic transmission mechanism of a vehicle, which comprises:
   an actuator for driving a hydraulic valve for switching a travel range of an automatic transmission mechanism;
   control means for controlling said actuator; and
   transmission operation means for outputting a range switching instruction to said control means,
   wherein said transmission operation means includes a stroke contact type operation switch mounted on a side surface of a steering column, and
   said operation switch is arranged on said steering column so that at least forward travel ranges can be switched by only a stretched middle finger of a hand of a vehicle driver while the driver continues to maintain his grip on a steering wheel with the same hand.

2. The apparatus according to claim 1, wherein said operation switch includes:
   a switch main body which is stroke-movable along a moving path along which a parking range, a reverse range, a neutral range, a forward drive range, a forward 2nd-speed range, and a forward 1st-speed range are sequentially defined; and
   a finger operation portion projecting from said switch main body and capable of being engaged with the finger of the hand holding said steering wheel.

3. The apparatus according to claim 2, wherein said operation switch is arranged such that the parking range and the reverse range are set by moving the finger operation portion of said operation switch to positions falling outside an operation enable range of the finger of the hand holding said steering wheel.

4. The apparatus according to claim 2, wherein said operation switch is arranged such that the neutral range is set by moving said finger operation portion to a position within an operation enable range of the finger of the hand holding said steering wheel.

5. The apparatus according to claim 1, wherein
   said operation switch comprises a rotary switch, and
   said rotary switch is mounted to be pivotal about a pivot axis extending along a widthwise direction of a vehicle.

6. The apparatus according to claim 1, wherein
   said operation switch comprises a slide switch,
   said slide switch is arranged to be slidable along an oblique moving axis,
   the moving axis of said slide switch is obliquely set so that an upper end thereof is inclined forward, and
   a parking range and a reverse range are set at upper positions.

7. The apparatus according to claim 1, wherein
   said operation switch is arranged on the side surface of said steering column opposite to a side where a direction indication lever is arranged.

8. The apparatus according to claim 1, wherein
   said operation switch is arranged on the side surface of said steering column at a position where said operation switch can be directly seen by a driver through said steering wheel set in a straight travel state.

9. The apparatus according to claim 8, wherein
   said steering wheel is formed such that at least a left spoke of the steering wheel is removed to allow said operation switch arranged on the side surface of said steering column to be directly seen.

10. The apparatus according to claim 9, wherein
    said steering wheel is formed to have an asymmetrical pattern.

11. The apparatus according to claim 8, wherein
    a parking range, a reverse range, a neutral range, a forward drive range, a forward 2nd-speed range, and a forward 1st-speed range are sequentially defined on said operation switch, and symbols for representing these travel ranges are marked in accordance with set positions of these ranges, and
    of these symbols, the symbols of the reverse range and the parking range are marked at positions where the symbols cannot be seen from a driver who sits at a driver's seat and looks at said operation switch.

12. The Apparatus according to claim 1, wherein
    said operation switch is arranged to be offset from an operation lever arranged on the side surface of said steering column in a vertical direction and a back-and-fourth direction.

13. The apparatus according to claim 1, wherein
    said operation switch is arranged on the side surface of said steering column to be offset upward, and an operation lever is arranged on the side surface of said steering column to be offset downward.

14. The apparatus according to claim 13, wherein
    said operation switch is arranged on the side surface of said steering column to be offset toward a driver's seat side, and a wiper operation lever is arranged on the side surface of said steering column to be offset toward an engine room side.

15. The apparatus according to claim 13, wherein said operation switch is arranged on the side surface of said steering column to be offset toward an engine room side, and a wiper operation lever is arranged on the side surface of said steering column to be offset toward a driver's seat side.

16. The apparatus according to claim 2, wherein said operation switch further includes regulation means for regulating at least a switching operation to the reverse range along one direction by the finger of the hand holding said steering wheel.

17. The apparatus according to claim 16, wherein said operation switch supports said switch main body to be able to be pushed in along an axial direction, and
said regulation means allows a switching operation to the parking range and the reverse range when said switch main body is operated along said one direction while being temporarily kept displaced in the axial direction.

18. The apparatus according to claim 16, wherein said operation switch can switch a travel range position between the neutral range and the forward 2nd-speed range by operating said switch main body along said one direction.

19. The apparatus according to claim 16, wherein said regulation means defines an operation force required for switching the travel range position to the parking range and the reverse range to be higher than that required for switching the travel range position between the neutral range and the forward 2nd-speed range.

20. The apparatus according to claim 2, wherein said operation switch comprises a rotary switch, said switch main body is formed in a substantially round shape to which two vertical lines contacting an outer periphery thereof are supposed, and said finger operation portion sets the reverse range at a position where said finger operation portion is rotated in an area which is defined between said two vertical lines.

21. The apparatus according to claim 20, wherein said finger operation portion sets the neutral range and the forward drive range at positions where said finger operation portion is stopped in an area which is defined as the driver's side from the side of said steering wheel in the two vertical lines.

22. The apparatus according to claim 1, wherein said control means detects an operation direction of said operation switch, and outputs a drive signal corresponding to the detected operation direction to said actuator, and
said actuator starts a travel range switching operation of said automatic transmission mechanism along the corresponding operation direction in response to the input drive signal.

23. The apparatus according to claim 22, wherein said control means includes:
operation direction detection means for detecting the operation direction of said operation switch and outputting the drive signal corresponding to the detected operation direction to said actuator;
switch position detection means for detecting a present position of said operation switch;
setting position detection means for detecting a travel range setting position of said automatic transmission mechanism; and
position control means for controlling to cause the travel range setting position detected by setting position detection means to coincide with the present position detected by said switch position detection means.

24. The apparatus according to claim 23, wherein said operation switch includes:
a common contact arranged to extend all over the travel range setting positions along a predetermined path, and applied with a predetermined voltage;
first contacts aligned along the operation direction to be located aside said common contact in an independent state in units of the travel range setting positions;
second contacts which are independently arranged aside said first contacts and front and rear edges of which are offset from those of the first contact at corresponding travel range positions by a predetermined distance in the same direction; and
a slide terminal which slides along said common contact, said first contacts, and said second contacts on the basis of a travel range switching operation by said operation switch, and is in contact with said common contact, a corresponding one of said first contacts, and a corresponding one of said second contacts at each travel range position, and
said operation direction detection means determines the operation direction of said operation switch in accordance with a difference in a contact order of said slide terminal to said first contacts and said second contacts at each travel range position.

25. The apparatus according to claim 23, wherein said operation switch includes:
a slit plate integrally moved upon operation of said operation switch;
first slits sequentially formed in said slit plate along the predetermined path in an independent state in units of the travel range setting positions;
second slits having at least one slit array for generating a code signal for uniquely defining a travel range, and in which front and rear edges of all the slits in the slit array are offset from those of the first slits at the corresponding travel range positions by a predetermined distance in the same direction;
a first photocoupler whose light-receiving state is attained by each of said first slits; and
second photocouplers whose light-receiving states are attained by said second slits, and
said operation direction detection means determines the operation direction of said operation switch in accordance with a difference in an order of generation of light-receiving states of said first photocoupler and said second photocouplers at each travel range position.

26. The apparatus according to claim 1, wherein said control means includes:
first detection means for detecting a travel range position set by said operation switch;
second detection means for detecting a travel range position in said automatic transmission mechanism;
timer means for measuring a time from when detection results from said first and second detection means coincide with each other until an operation of said actuator is stopped; and
abnormality determination means for, when the time measured by said timer means exceeds a predetermined period of time, determining an abnormal state of a travel range setting state in said automatic transmission mechanism.

27. The apparatus according to claim 1, wherein said control means includes:

first detection means for detecting an operation direction of said operation switch;

second detection means for detecting an operation direction of said actuator; and abnormality determination means for comparing detection results from said first and second detection means, and for, when the operation direction detected by said first detection means does not coincide with the operation direction of said actuator, determining an abnormal state.

28. The apparatus according to claim 1, wherein said control means comprises:

direction detection means for detecting an operation direction of said operation switch;

first travel range detection means for detecting a travel range position of said automatic transmission mechanism;

second travel range detection means for detecting a travel range position set by said operation switch;

main control means for, when said direction detection means detects the operation direction of said operation switch, outputting a drive signal to said actuator in accordance with the operation direction detected by said direction detection means while a stop position of said operation switch is unknown, and for, when detection results from said first and second travel range detection means coincide with each other, outputting a stop signal to said actuator; and holding control means for temporarily holding the travel range in said automatic transmission mechanism at an immediately preceding travel range position detected by said second travel range detection means in a state wherein said operation switch is located within a range between adjacent travel ranges where a travel range detection condition cannot be established.

29. The apparatus according to claim 28, wherein said main control means cancels the holding control by said holding control means when the travel range detection condition is established in said second travel range detection means, and controls said actuator to cause the detection results from said first and second travel range detection means to coincide with each other.

30. The apparatus according to claim 1, wherein said operation switch comprises signal generation means for outputting a multi-level signal having a phase difference according an operation thereof as a range switching instruction, and said control means includes:

phase time detection means for measuring a time during which the phase difference occurs; and abnormality determination means for, when the time detected by said phase time detection means exceeds a predetermined period of time, determining that an abnormal state occurs in an operation of said operation switch.

31. The apparatus according to claim 30, wherein said signal generation means outputs the signal to generate a phase difference at a falling timing of the signal, and said phase time detection means comprises first phase time detection means for measuring a time during which the phase difference set at the falling timing of the signal is generated.

32. The apparatus according to claim 30, wherein said signal generation means outputs the signal to generate a phase difference at a rising timing of the signal, and said phase time detection means comprises first phase time detection means for measuring a time during which the phase difference set at the rising timing of the signal is generated.

33. The apparatus according to claim 1, wherein said operation switch includes signal generation means for outputting a multi-level signal which has a phase difference in correspondence with a change from a true level to a false level or a change from a false level to a true level in units of travel ranges as a range switching instruction upon an operation thereof, and said control means includes:

operation direction determination means for determining a forward/reverse direction of an operation direction of said operation switch on the basis of an order of generation of the change from true level to false level and the change from false level to true level;

phase time detection means for measuring a time during which the phase difference is generated; and abnormality determination means for, when the time detected by said phase time detection means exceeds a predetermined period of time, determining that an abnormal state occurs in an operation of said operation switch.

34. The apparatus according to claim 33, wherein said operation direction determination means determines the forward/reverse direction of the operation direction of said operation switch on the basis of an order of a rising timing from false level to true level of the signal.

35. The apparatus according to claim 1, wherein said operation switch comprises signal generation means for outputting multi-level signals which has a phase difference in correspondence with a change from a true level to a false level or a change from a false level to a true level in units of travel ranges as a range switching instruction upon an operation thereof, and said control means includes:

travel range determination means for determining a travel range set by said operation switch on the basis of the signals having true levels;

operation direction determination means for determining a forward/reverse direction of an operation direction of said operation switch on the basis of an order of generation of the change from true level to false level and the change from false level to true level;

false time detection means for measuring a time during which the signals have false levels; and abnormality determination means for, when the time detected by said false time detection means exceeds a predetermined period of time, determining that an abnormal state occurs in an operation of said operation switch.

36. The apparatus according to claim 35, wherein said control means includes:

travel range detection means for detecting a travel range position in said automatic transmission mechanism; and stop means for comparing the travel range position determined by said travel range determination means and the travel range position detected by said travel range detection means, and for, when the two positions coincide with each other, outputting a stop signal for stopping a drive operation of said actuator.

37. An operation apparatus for a vehicle automatic transmission mechanism, which comprises a stroke contact type operation switch for switching a travel range in said automatic transmission mechanism, and wherein
said operation switch is arranged on the side surface of a steering column at a position where said operation switch can be directly seen from a driver through a steering wheel set in a straight travel state, so that at least forward travel ranges can be switched by only a stretched middle finger of a hand of a vehicle driver while the driver continues to maintain his grip on said steering wheel with the same hand.

38. An operation apparatus for a vehicle automatic transmission mechanism, which comprises:
a transmission wire one end of which is connected to a hydraulic valve for switching a travel range in said automatic transmission mechanism; and
an operation lever, connected to the other end of said transmission wire, for switching a travel range in said hydraulic valve through said transmission wire when said operation lever is swung along a predetermined path along which travel ranges to be set sequentially defined,
wherein said operation lever is swingably arranged on an instrument panel opposing a steering wheel, so that at least forward travel ranges can be switched by only a stretched middle finger of a hand of a vehicle driver while the driver continues to maintain his grip on said steering wheel with the same hand.

39. The apparatus according to claim 38, wherein said steering wheel is rotatably mounted on a steering column fixed to said instrument panel.

40. A room inside structure of a vehicle which comprises:
an operation apparatus for a vehicle automatic transmission mechanism including a transmission wire one end of which is connected to a hydraulic valve for switching a travel range in said automatic transmission mechanism, and an operation lever, connected to the other end of said transmission wire, for switching a travel range in said hydraulic valve through said transmission wire when said operation lever is swung along a predetermined path along which travel ranges to be set are sequentially defined, wherein said operation lever is swingably arranged on an instrument panel opposing a steering wheel, so that at least forward travel ranges can be switched by only a stretched middle finger of a hand of a vehicle driver while the driver continues to maintain his grip on a steering wheel with the same hand; and
a driver's seat which is slidable in a back-and-forth direction, a seat cushion which is reclinable with respect to a floor, and a seat back which is reclinable with respect to said seat cushion so as to arbitrarily set a seating position of a driver with respect to said steering wheel which is fixed in position on said instrument panel.

41. The vehicle structure according to claim 40, wherein
said driver's seat is of a motorized type, and
said driver's seat includes manual switches for setting an optimal seating position with respect to said steering wheel.

42. The apparatus according to claim 38, wherein
a parking range, a reverse range, a neutral range, a forward drive range, a forward 2nd-speed range, and a forward 1st-speed range are sequentially defined as the travel ranges, and
the neutral range, the forward drive range, the forward 2nd-speed range, and the forward 1st-speed range are set by moving said operation lever within an operation enable range of the finger of the hand holding said steering wheel.

43. The apparatus according to claim 42, wherein
the parking range and the reverse range are set by moving said operation lever to positions falling outside the operation enable range of the finger of the hand holding said steering wheel.

44. The apparatus according to claim 39, wherein
a wiper switch is arranged on one side surface of said steering column where said operation lever is arranged,
a direction indication lever is arranged on the opposite side surface of said steering column,
said wiper switch is arranged to be pivotal about its own central axis, and
said operation lever is vertically swingably arranged.

45. The apparatus according to claim 44, wherein
said wiper switch is arranged on a side surface of said steering column on a side where said operation lever is arranged.

46. The apparatus according to claim 39, wherein
a wiper switch and a direction indication lever are arranged on one side surface of said steering column opposite to the other side where said operation lever is arranged.

47. The apparatus according to claim 46, wherein
a light switch is arranged on said one side surface of said steering column where said wiper switch and said direction indication lever are arranged.

48. An operation apparatus for a vehicle automatic transmission mechanism, which comprises:
a transmission wire one end of which is connected to a hydraulic valve for switching a travel range in said automatic transmission mechanism;
an operation lever, connected to the other end of said transmission wire, for switching a travel range in said hydraulic valve through said transmission wire when said operation lever is moved along a predetermined path along which travel ranges to be set are sequentially defined;
a housing, arranged inside an instrument panel, for swingably supporting said operation lever; and
a panel member mounted on an inner surface of said instrument panel to be separated from said housing by a predetermined distance,
a space between said housing and said panel member being defined as a crash absorption space.

49. The apparatus according to claim 48, wherein
said operation lever is swingably arranged on said instrument panel opposing a steering wheel, so that at least forward travel ranges can be switched by only a stretched middle finger of a hand of a vehicle driver while the driver continues to maintain his grip on said steering wheel with the same hand.

50. The apparatus according to claim 49, wherein
a mounting member to which said housing is mounted is fixed in said instrument panel,
a surface facing a passenger room of said mounting member is defined by a flat surface, and said housing is fixed on said flat surface.

51. The apparatus according to claim 50, wherein said surface to which said housing is fixed of said mounting member is substantially parallel to an extending plane of said steering wheel.

52. The apparatus according to claim 48, which further comprises:
joint means, arranged in said housing, for supporting said operation lever to be vertically swingable and to be horizontally movable; and
interlock means, arranged in said housing, for, only while when a brake pedal is kept depressed, allowing disengagement of said operation lever from the parking range.

53. The apparatus according to claim 48, wherein said housing integrally has a mounting boss portion, which is strongly fixed on a mounting surface of said mounting member, at an opposing edge thereof with respect to a disengagement direction of said operation lever from the parking range.

54. The apparatus according to claim 48, wherein said housing is mounted on a mounting surface of said mounting member through an L-shaped bracket at an edge thereof located on a disengagement direction side of said operation lever from the parking range.

55. The apparatus according to claim 48, wherein said housing has a guide groove for defining a moving path of said operation lever on a surface thereof facing a passenger room.

56. The apparatus according to claim 55, wherein said panel member has a gate groove which is formed in the same pattern as said guide groove on a surface thereof facing the passenger room.

57. The apparatus according to claim 56, wherein said instrument panel has a slit for inclusively exposing said guide groove, and
alphanumeric characters representing corresponding travel ranges are drawn on a portion of said panel member aside a formation portion of said guide groove and exposed through said slit at positions corresponding to respective travel ranges.

* * * * *

UNITED STATES PATENT AND TRADEMARK OFFICE
CERTIFICATE OF CORRECTION

PATENT NO. : 5,156,243
DATED : October 20, 1992
INVENTOR(S) : HIDEMI AOKI, et al.

It is certified that error appears in the above-identified patent and that said Letters Patent is hereby corrected as shown below:

Col. 1, line 25, "sterring" s/b --steering--.

Col. 7, line 14, "$S_N, S_2,$" s/b --$S_N, S_D, S_2,$--.

Col. 17, line 21, "is set is at a" s/b --is set at a--.

Col. 21, line 12, "FIGS. 16 to 27." s/b --FIGS. 16 through 27.--.

Col. 27, line 27, "108a to 108f goes through "H"" s/b --108a through 108f goes to "H"--.

Col. 36, line 38, "travel he" s/b --travel again, he--.

Col. 45, line 12, "238d;" s/b --238d,--.

Col. 62, line 52 (claim 12), "Apparatus" s/b --apparatus--.

UNITED STATES PATENT AND TRADEMARK OFFICE
CERTIFICATE OF CORRECTION

PATENT NO. : 5,156,243
DATED : October 20, 1992
INVENTOR(S) : Hidemi Aoki, et al.

It is certified that error appears in the above-indentified patent and that said Letters Patent is hereby corrected as shown below:

Col. 65, line 53 (claim 30), "according an" should be --according to--

Signed and Sealed this

Eighteenth Day of January, 1994

Attest:

BRUCE LEHMAN

Attesting Officer

Commissioner of Patents and Trademarks